(12) United States Patent
Oikawa et al.

(10) Patent No.: US 8,169,588 B2
(45) Date of Patent: May 1, 2012

(54) LIQUID CRYSTAL DISPLAY DEVICE AND METHOD FOR MANUFACTURING THE SAME

(75) Inventors: Yoshiaki Oikawa, Tochigi (JP); Shingo Eguchi, Tochigi (JP); Mitsuo Mashiyama, Tochigi (JP); Masatoshi Kataniwa, Tochigi (JP); Hironobu Shoji, Tochigi (JP); Masataka Nakada, Tochigi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 477 days.

(21) Appl. No.: 12/498,589

(22) Filed: Jul. 7, 2009

(65) Prior Publication Data

US 2010/0007829 A1    Jan. 14, 2010

(30) Foreign Application Priority Data

Jul. 10, 2008    (JP) .................................. 2008-180804

(51) Int. Cl.
*G02F 1/1333*    (2006.01)
(52) U.S. Cl. ........................................ 349/159; 349/138
(58) Field of Classification Search .................. 349/159, 349/158, 122, 153, 138, 139, 123
See application file for complete search history.

(56) References Cited

U.S. PATENT DOCUMENTS

| | | | |
|---|---|---|---|
| 5,075,166 A | 12/1991 | Sikorski et al. | |
| 5,597,631 A | 1/1997 | Furumoto et al. | |
| 5,757,456 A | 5/1998 | Yamazaki et al. | |
| 5,770,313 A | 6/1998 | Furumoto et al. | |
| 5,821,138 A | 10/1998 | Yamazaki et al. | |
| 6,015,724 A | 1/2000 | Yamazaki | |
| 6,118,502 A | 9/2000 | Yamazaki et al. | |
| 6,224,965 B1 | 5/2001 | Haas et al. | |
| 6,376,333 B1 | 4/2002 | Yamazaki et al. | |
| 6,403,221 B1 | 6/2002 | Nakamura et al. | |
| 6,491,228 B1 | 12/2002 | Ueda et al. | |
| 6,762,508 B1 | 7/2004 | Kiso et al. | |
| 6,933,533 B2 | 8/2005 | Yamazaki et al. | |
| 6,953,951 B2 | 10/2005 | Yamazaki et al. | |
| 6,998,282 B1 | 2/2006 | Yamazaki et al. | |
| 7,049,178 B2 | 5/2006 | Kim et al. | |
| 7,050,138 B1 | 5/2006 | Yamazaki et al. | |
| 7,061,083 B1 | 6/2006 | Usami et al. | |

(Continued)

FOREIGN PATENT DOCUMENTS

EP    0 939 441    9/1999
(Continued)

*Primary Examiner* — Thoi Duong
(74) *Attorney, Agent, or Firm* — Eric J. Robinson; Robinson Intellectual Property Law Office, P.C.

(57) ABSTRACT

A flexible and highly reliable liquid crystal display device which is not easily damaged even if subjected to external pressure is provided. A method for manufacturing, with high yield, a flexible and highly reliable liquid crystal display device which is not easily damaged even if subjected to external pressure is also provided. A liquid crystal display device including a first structure body including a first fibrous body and a first organic resin, a second structure body including a second fibrous body and a second organic resin, a liquid crystal interposed between the first and second structure bodies, and a seal member for fixing the first and second structure bodies and for enclosing the liquid crystal. The first and second fibrous bodies are impregnated with the first and second organic resins, respectively, and the first structure body and the second structure body are in contact with each other.

28 Claims, 30 Drawing Sheets

U.S. PATENT DOCUMENTS

| | | |
|---|---|---|
| 7,242,453 B2 | 7/2007 | Saida et al. |
| 7,361,519 B2 | 4/2008 | Yamazaki et al. |
| 7,374,977 B2 | 5/2008 | Yamazaki et al. |
| 7,378,137 B2 * | 5/2008 | Saida et al. ............... 428/1.51 |
| 7,459,352 B2 | 12/2008 | Yamazaki et al. |
| 7,485,489 B2 | 2/2009 | Björbell |
| 7,487,373 B2 | 2/2009 | Koyama |
| 2003/0032210 A1 | 2/2003 | Takayama et al. |
| 2003/0071953 A1 | 4/2003 | Yamazaki et al. |
| 2004/0016939 A1 | 1/2004 | Akiba et al. |
| 2004/0229404 A1 | 11/2004 | Kiso et al. |
| 2005/0070038 A1 | 3/2005 | Yamazaki et al. |
| 2005/0085034 A1 | 4/2005 | Akiba et al. |
| 2005/0162578 A1 | 7/2005 | Yamazaki et al. |
| 2005/0200301 A1 | 9/2005 | Yamazaki et al. |
| 2005/0233122 A1 | 10/2005 | Nishimura et al. |
| 2006/0011288 A1 | 1/2006 | Watanabe et al. |
| 2007/0004125 A1 | 1/2007 | Watanabe et al. |
| 2007/0004202 A1 | 1/2007 | Fujii |
| 2007/0020932 A1 | 1/2007 | Maruyama et al. |
| 2007/0026580 A1 | 2/2007 | Fujii |
| 2007/0044303 A1 | 3/2007 | Yamano |
| 2007/0181875 A1 | 8/2007 | Yamazaki et al. |
| 2007/0259585 A1 | 11/2007 | Yamazaki et al. |
| 2007/0278563 A1 | 12/2007 | Takano et al. |
| 2008/0012126 A1 | 1/2008 | Dozen et al. |
| 2008/0044940 A1 | 2/2008 | Watanabe et al. |
| 2008/0093464 A1 | 4/2008 | Dairiki et al. |
| 2008/0224941 A1 | 9/2008 | Sugiyama et al. |
| 2008/0225214 A1 | 9/2008 | Kinoshita et al. |
| 2008/0252531 A1 | 10/2008 | Hanaoka et al. |
| 2008/0280033 A1 | 11/2008 | Yamazaki et al. |
| 2008/0303140 A1 | 12/2008 | Ohtani et al. |
| 2008/0309581 A1 | 12/2008 | Fujii et al. |

FOREIGN PATENT DOCUMENTS

| | | |
|---|---|---|
| EP | 1092739 | 4/2001 |
| EP | 1589797 | 10/2005 |
| EP | 1 758 438 | 2/2007 |
| EP | 1 970 951 | 9/2008 |
| JP | 05-190582 | 7/1993 |
| JP | 08-250745 | 9/1996 |
| JP | 08-288522 | 11/1996 |
| JP | 10-092980 | 4/1998 |
| JP | 10-302027 | 11/1998 |
| JP | 2000-231619 | 8/2000 |
| JP | 2001-277726 | 10/2001 |
| JP | 2003-174153 | 6/2003 |
| JP | 2004-118255 | 4/2004 |
| JP | 2004-362341 | 12/2004 |
| JP | 2006-139802 | 6/2006 |
| JP | 2007-241999 | 9/2007 |
| WO | WO 96/09158 | 3/1996 |
| WO | 01/01740 | 1/2001 |
| WO | 2004/001848 | 12/2003 |

* cited by examiner

LIQUID CRYSTAL DISPLAY DEVICE AND METHOD FOR MANUFACTURING THE SAME

BACKGROUND OF THE INVENTION

1. Field of the Invention

The present invention relates to a liquid crystal display device having flexibility and a method for manufacturing the liquid crystal display device.

2. Description of the Related Art

In recent years, technology for forming thin film transistors (TFTs) using a thin semiconductor film (with a thickness of about several tens of nanometers to several hundreds of nanometers) formed over a substrate having an insulating surface has been attracting attention. Thin film transistors are applied to a wide range of electronic devices such as ICs or electro-optical devices, and prompt development of thin film transistors that can be used as switching elements in display devices, in particular, is being pushed.

Glass substrates and quartz substrates are often used as substrates of such display devices; however, there are disadvantages to using glass substrates and quartz substrates in that they are heavy as well as breakable. In addition, increasing the size of glass substrates and quartz substrates is difficult, and glass substrates and quartz substrates are thus not suitable for mass production. For these reasons, forming display devices using flexible substrates, typically, flexible plastic films, is being attempted.

Thus, technology in which an element formation layer including thin film transistors that is formed over a glass substrate is separated from the glass substrate and transferred to another substrate, for example, to a plastic film or the like, has been proposed.

Separation and transfer techniques are proposed in References 1 and 2. In Reference 1, a separation technique in which a silicon oxide layer that is to serve as a separation layer is removed by wet etching is disclosed. In Reference 2, a separation technique in which a silicon layer that is to serve as a separation layer is removed by dry etching is disclosed.

A separation and transfer technique is also proposed in Reference 3. In Reference 3, a technique where a metal (Ti, Al, Ta, W, Mo, Cu, Cr, Nd, Fe, Ni, Co, Ru, Rh, Pd, Os, or Ir) layer is formed over a substrate, an oxide layer is formed and stacked thereover, a metal oxide layer of the metal layer is formed in the interface between the metal layer and the oxide layer, and separation from the substrate is performed during a subsequent step using this metal oxide layer is disclosed.

[Reference 1] Japanese Published Patent Application No. H8-288522

[Reference 2] Japanese Published Patent Application No. H8-250745

[Reference 3] Japanese Published Patent Application No. 2003-174153

SUMMARY OF THE INVENTION

However, a substrate of a flexible liquid crystal display device has flexibility; thus, an element formation layer including semiconductor elements easily cracks by local pressure applied from the outside or by local linear pressure applied due to bending of the liquid crystal display device. There are also problems caused by these, such as defective operation and uneven display of the liquid crystal display device. In addition, the adhesion between the element formation layer and the flexible substrate is poor, and the flexible substrate is easily separated from the element formation layer. Thus, there is a problem of low yield.

In view of the above problems, the present invention provides a flexible and highly reliable liquid crystal display device which is not easily damaged even if subjected to external pressure. The present invention also provides a method for manufacturing, with high yield, a flexible and highly reliable liquid crystal display device which is not easily damaged even if subjected to external pressure.

An embodiment of the present invention is a liquid crystal display device including a first structure body and a second structure body which are disposed to face each other with a liquid crystal interposed therebetween, and a seal member for fixing the first structure body and the second structure body and enclosing the liquid crystal. The first structure body and the second structure body, in each of which a fibrous body is impregnated with an organic resin, are fixed in contact with each other outside the seal member.

An embodiment of the present invention is a liquid crystal display device including a first structure body and a second structure body which are disposed to face each other with a liquid crystal interposed therebetween, a first impact relaxation layer in contact with the first structure body, a second impact relaxation layer in contact with the second structure body, and a seal member for fixing the first structure body and the second structure body and enclosing the liquid crystal. The first structure body and the second structure body, in each of which a fibrous body is impregnated with an organic resin, are fixed in contact with each other outside the seal member.

An example of the organic resin included in each of the first structure body and the second structure body is a thermoplastic resin or a thermosetting resin. The first structure body and the second structure body are fixed such that the organic resins included therein are in direct contact with each other. Thus, the adhesion between the first structure body and the second structure body is good and high yield can be obtained.

An example of the fibrous body included in each of the first structure body and the second structure body is a woven fabric or a nonwoven fabric using high-strength fibers of an organic compound or an inorganic compound. A high-strength fiber is specifically a fiber with a high tensile modulus of elasticity or a fiber with a high Young's modulus. When high-strength fibers are used for the fibrous body, even if local pressure is applied to the liquid crystal display device or even if linear pressure is applied to the liquid crystal display device due to bending, the pressure can be dispersed throughout the fibrous body.

A conductive layer may be formed over a surface of the first structure body or/and the second structure body. In the case where a conductive layer is formed over each of the first structure body and the second structure body, the conductive layers are electrically connected to each other and are at the same potential.

When a conductive layer is formed over a surface of the first structure body or/and the second structure body to have a thickness through which light passes, damage to the liquid crystal display device by local charging can be reduced without causing a decrease in image quality.

The first structure body and the second structure body preferably have the same thickness. The first impact relaxation layer and the second impact relaxation layer also preferably have the same thickness. In addition, the total thickness of the first structure body and the first impact relaxation layer and the total thickness of the second structure body and the second impact relaxation layer are preferably larger than the total thickness of the element formation layer and a liquid crystal layer. In that case, the element formation layer and the liquid crystal layer are located in the middle of a cross section of the liquid crystal display device; thus, stress due to bending can be reduced.

A flexible liquid crystal display device which is not easily damaged even if subjected to external pressure can be obtained, and the reliability of a liquid crystal display device can be increased. In addition, a highly reliable liquid crystal display device which is not easily damaged even if subjected to external pressure can be manufactured with high yield.

DETAILED DESCRIPTION OF THE INVENTION

Figure 1A:
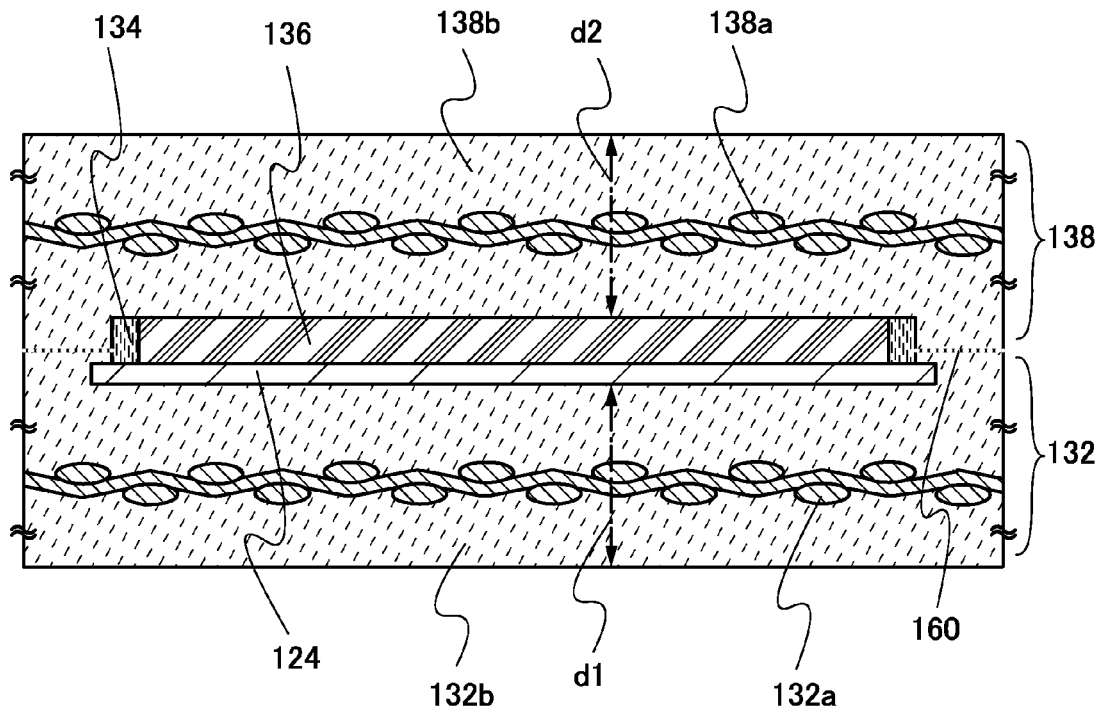
FIGS. 1A and 1B are cross-sectional views each illustrating a liquid crystal display device of the present invention.

Embodiments of the present invention are hereinafter described with reference to the drawings. Note that the present invention can be carried out in many different modes, and it is easily understood by those skilled in the art that modes and details of the present invention can be changed in various ways without deviating from the spirit and scope of the present invention. Thus, the present invention should not be interpreted as being limited to the description in the following embodiments. Note that in all drawings illustrating embodiments, the same portions or portions having similar functions are denoted by the same reference numerals, and repeated description thereof will be omitted.

(Embodiment 1)

In this embodiment, a flexible and highly reliable liquid crystal display device which is not easily damaged by external pressure or bending is described with reference to FIGS. 1A and 1B.

A liquid crystal display device described in this embodiment has a liquid crystal layer 136, a first structure body 132 and a second structure body 138 facing each other with the liquid crystal layer 136 interposed therebetween, a seal member 134 for enclosing the liquid crystal layer 136, and an element formation layer 124 including a pixel electrode, a semiconductor element, a capacitor element, a wiring, and the like. A feature of the liquid crystal display device is that the first structure body 132 and the second structure body 138 are fixed in contact with each other outside the seal member 134 as indicated with a broken line 160 (see FIG. 1A). Note that the broken line 160 indicating a region where the first structure body 132 and the second structure body 138 are in close contact with each other is approximately in the middle of the liquid crystal display device in FIG. 1A, but the region may be located closer to one of the first structure body 132 and the second structure body 138 as indicated with a broken line 162 in FIG. 1 B.

In the first structure body 132 and the second structure body 138, fibrous bodies 132a and 138a are impregnated with organic resins 132b and 138b, respectively, and the first and second structure bodies 132 and 138 are also called prepregs. A prepreg is specifically formed in the following manner: after a fibrous body is impregnated with a varnish in which a matrix resin is diluted with an organic solvent, drying is performed so that the organic solvent is volatilized and the matrix resin is semi-cured or cured. The first structure body 132 and the second structure body 138 each preferably have a thickness of 10 μm to 100 μm, more preferably, 10 μm to 60 μm. By using a structure body having such a thickness, a liquid crystal display device which is thin and can be curved can be manufactured.

A thermosetting resin such as an epoxy resin, an unsaturated polyester resin, a polyimide resin, a bismaleimide-triazine resin, or a cyanate resin can be used as the organic resins 132b and 138b. Alternatively, a thermoplastic resin such as a polyphenylene oxide resin, a polyetherimide resin, or a fluorine resin may be used. When the above-described organic resin is used, the fibrous body can be fixed to the element formation layer or the seal member by heat treatment. The higher the glass transition temperature of the organic resins 132b and 138b is, the less easily the organic resins 132b and 138b are damaged by local pressure; thus, the organic resins 132b and 138b preferably have high glass transition temperature.

Highly thermally conductive filler may be dispersed in the organic resins 132b and 138b or yarn bundles of the fibrous bodies 132a and 138a. Examples of the highly thermally conductive filler include aluminum nitride, boron nitride, silicon nitride, alumina, and metal particles of silver, copper, or the like. When the highly thermally conductive filler is included in the organic resins or the yarn bundles, heat generated in the liquid crystal display device can be easily released to the outside. Accordingly, thermal storage in the liquid crystal display device can be suppressed, and damage to the liquid crystal display device can be reduced.

The fibrous bodies 132a and 138a are woven or nonwoven fabrics including high-strength fibers of an organic compound or an inorganic compound and are provided so as to overlap. A high-strength fiber is specifically a fiber with a high tensile modulus of elasticity or a fiber with a high Young's modulus. As typical examples of a high-strength fiber, a polyvinyl alcohol fiber, a polyester fiber, a polyamide fiber, a polyethylene fiber, an aramid fiber, a polyparaphenylene benzobisoxazole fiber, a glass fiber, and a carbon fiber can be given. As the glass fiber, a glass fiber formed using E glass, S glass, D glass, Q glass, or the like can be used. Note that the fibrous bodies 132a and 138a may be formed from one or more kinds of the above-described high-strength fibers.

The fibrous bodies 132a and 138a may be woven fabrics which are woven using bundles of fibers (single yarns) (hereinafter, the bundles of fibers are referred to as yarn bundles) for warp yarns and weft yarns, or nonwoven fabrics obtained by stacking yarn bundles of plural kinds of fibers in a random manner or in one direction. In the case of a woven fabric, a plain-woven fabric, a twilled fabric, a satin-woven fabric, or the like can be used as appropriate.

The yarn bundle may have a circular shape or an elliptical shape in cross section. As the yarn bundle, a yarn bundle may be used which has been subjected to fiber opening with a high-pressure water stream, high-frequency vibration using liquid as a medium, continuous ultrasonic vibration, pressing with a roller, or the like. A yarn bundle which is subjected to fabric opening has a larger width, has a smaller number of single yarns in the thickness direction, and has an elliptical shape or a flat shape in its cross section. Further, by using a loosely twisted yarn as the yarn bundle, the yarn bundle is easily flattened and has an elliptical shape or a flat shape in cross section. By using a yarn bundle having a cross section of an elliptical shape or a flat shape as described above, it is possible to make the fibrous bodies 132a and 138a thinner. Accordingly, the first structure body 132 and the second structure body 138 can be made thin, and thus, a thin liquid crystal display device can be manufactured.

The fibrous bodies 132a and 138a are woven using warp yarns spaced at regular intervals and weft yarns spaced at regular intervals. Such a fibrous body has regions without the warp yarns and the weft yarns. Such a fibrous body is further impregnated with an organic resin; thus, the adhesion between the fibrous body and the element layer can be increased.

Further, in order to enhance permeability of an organic resin into the inside of the yarn bundle, the yarn bundle may be subjected to surface treatment. For example, as the surface treatment, corona discharge, plasma discharge, or the like for activating a surface of the yarn bundle can be given. Further, surface treatment using a silane coupling agent or a titanate coupling agent can be given.

Figure 29A:
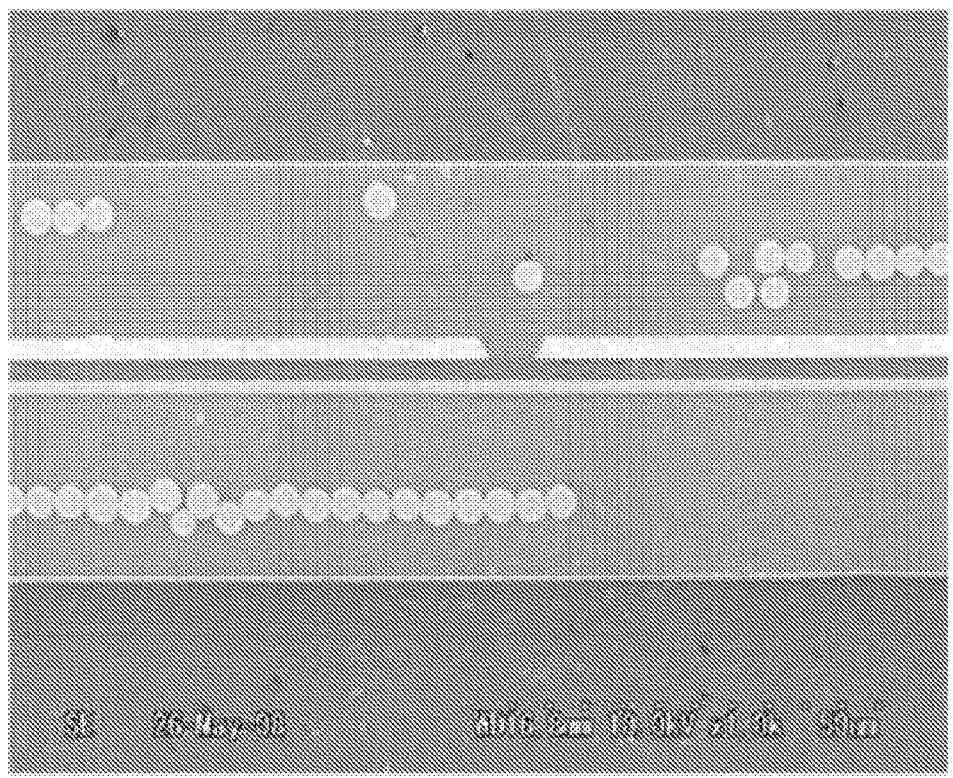
FIGS. 29A and 29B are views illustrating an example of a structure body in which a fibrous body is impregnated with an organic resin.
Figure 29B:
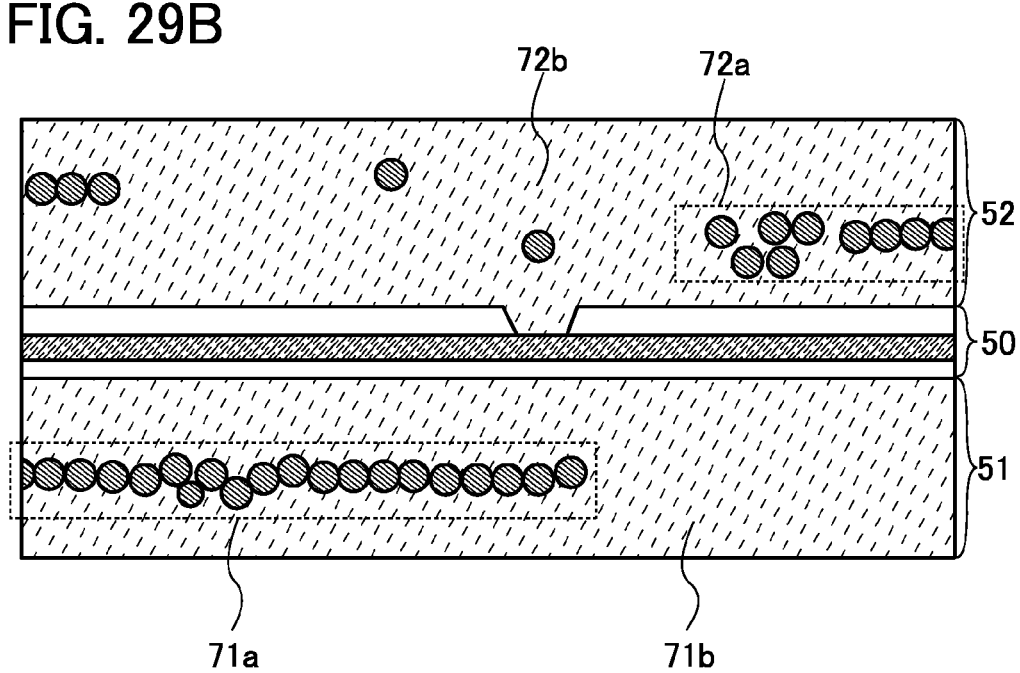
Figure 30:
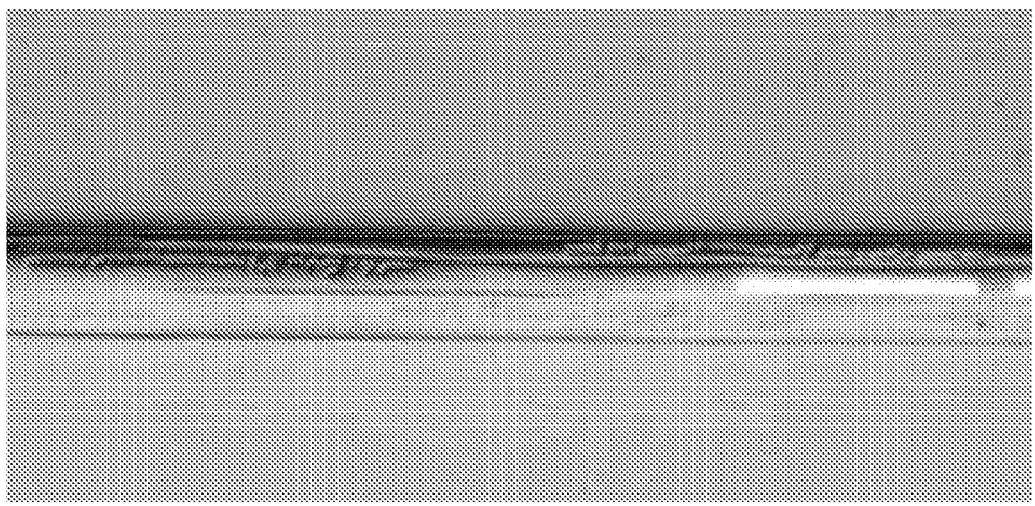
FIG. 30 is a view illustrating an example of a structure body in which a fibrous body is impregnated with an organic resin.

FIGS. 29A and 29B and FIG. 30 illustrate an example in which a fibrous body is impregnated with an organic resin. Note that FIG. 29A is a SEM image (magnified 1000 times) of a cross-section of a sample actually manufactured, and FIG. 29B is a schematic view of FIG. 29A. FIG. 30 shows an image (magnified 20 times) of the cross-section of the sample actually manufactured, which was observed by an optical microscope.

FIGS. 29A and 29B shows the case in which a first structure body 51 in which a fibrous body 71a is impregnated with an organic resin 71b and a second structure body 52 in which a fibrous body 72a is impregnated with an organic resin 72b are provided with a transistor portion 50 interposed therebetween. Although the cross-sectional views of FIGS. 29A and 29B show only one of the warp yarns and the weft yarns as the fibrous body 71a and the fibrous body 72a, the other fibrous body intersecting the one of the warp yarns and the weft yarns exists depending on the direction of the cross-section observed.

The cross-sectional view of FIG. 30 shows that warp yarns and weft yarns each including a bundle of fibers intersect each other.

As described above, the fibrous bodies are woven in fabric form so that the warp yarns and the weft yarns cross each other, and the woven fabric is impregnated with an organic resin. Accordingly, expansion and contraction of the woven fabric in the direction of the surface of the fabric can be suppressed by the fibrous bodies, and flexibility in the direction perpendicular to the surface direction can be obtained.

Here, the first structure body 132 and the second structure body 138 are preferably transparent. Thus, the fibrous bodies 132a and 138a and the organic resins 132b and 138b are preferably materials having high visible light transmittance and approximately the same diffractive index and not having birefringence.

The thickness d1 of the first structure body 132 refers to the thickness of the first structure body 132 in a region overlapping the element formation layer 124 and the liquid crystal layer 136. In a similar manner, the thickness d2 of the second structure body 138 refers to the thickness of the second structure body 138 in a region overlapping the element formation layer 124 and the liquid crystal layer 136.

The liquid crystal display device described in this embodiment has the first structure body 132 and the second structure body 138 in each of which a fibrous body is impregnated with an organic resin, and the first structure body 132 and the second structure body 138 are in direct and close contact with each other outside the seal member 134. This is because the organic resins included in the first structure body 132 and the second structure body 138 are firmly fixed to each other after being fused. Thus, the adhesion between the first structure body and the second structure body is good, and detachment of the first structure body and the second structure body in the liquid crystal display device, defects of the liquid crystal display device due to the entry of moisture or the like from the outside, and the like can be reduced. Because the first structure body 132 and the second structure body 138 include fibrous bodies, external pressure or force generated by bending can be dispersed throughout the liquid crystal display device, and defects of the liquid crystal display device can be reduced.

In the element formation layer 124, elements for controlling the alignment of liquid crystal included in the liquid crystal layer 136, such as a pixel electrode, a semiconductor element, a capacitor element, and a wiring, are formed. Note that in the element formation layer 124, only a pixel portion may be formed. Alternatively, a pixel portion and a driver circuit for driving a liquid crystal element included in the pixel portion may be formed. Furthermore, a transmitting and receiving circuit and an antenna for receiving display information from an information transmitter provided outside the liquid crystal display device may be provided in the element formation layer 124. With such a structure, display information can be wirelessly exchanged between the information transmitter and the liquid crystal display device, and the peripheral portion of the liquid crystal display device can be completely sealed with the first structure body and the second structure body.

The element formation layer 124 and the liquid crystal layer 136 include a liquid crystal element. A liquid crystal element is an element which controls transmission or non-transmission of light by optical modulation action of a liquid crystal and includes a pair of electrodes and a liquid crystal material. By alignment of a liquid crystal material with a voltage generated between a pair of pixel electrodes, transmission or non-transmission of light is controlled.

As a liquid crystal material, a lyotropic liquid crystal, a thermotropic liquid crystal, a low molecular liquid crystal, a high molecular liquid crystal, a discotic liquid crystal, a ferroelectric liquid crystal, an anti-ferroelectric liquid crystal, or the like is used. The above liquid crystal materials exhibit a nematic phase, a cholesteric phase, a cholesteric blue phase, a smectic phase, a smectic blue phase, a cubic phase, a smectic D phase, a chiral nematic phase, an isotropic phase, or the like depending on conditions. A cholesteric blue phase and a smectic blue phase are seen in a liquid crystal material having a cholesteric phase or a smectic phase with a relatively short helical pitch of 500 nm or less. The alignment of the liquid crystal material has a double twist structure. Having the order of an optical wavelength or shorter, the liquid crystal material is transparent, and optical modulation action is generated through a change in alignment order by voltage application. A blue phase is optically isotropic and thus has no viewing angle dependence. Thus, an alignment film does not necessarily need to be formed; therefore, display image quality can be improved and cost can be reduced.

As a material of a pixel electrode, in the case of manufacturing a transmissive liquid crystal display device, indium tin oxide (ITO) in which indium oxide is mixed with tin oxide, indium tin silicon oxide (ITSO) in which indium tin oxide (ITO) is mixed with silicon oxide, indium zinc oxide (IZO) in which indium oxide is mixed with zinc oxide, zinc oxide (ZnO), tin oxide ($SnO_2$), or the like can be used. In the case of manufacturing a reflective liquid crystal display device, a reflective metal layer (such as a material layer containing aluminum or silver as its main component, or a stack thereof) can be used for a pixel electrode. In the case of manufacturing a transflective (semi-transmissive) liquid crystal display device, a reflective metal can be used in a reflective region of a pixel electrode and a light-transmitting material can be used in a transmissive region.

Note that a counter pixel electrode may be formed on the element formation layer 124 or/and the second structure body as appropriate for the display mode of the liquid crystal display device. For example, in the case where the driving method of liquid crystal is a twisted nematic (TN) mode, a guest-host mode, a polymer dispersed liquid crystal (PDLC) mode, a ferroelectric liquid crystal (FLC) mode, an anti-ferroelectric liquid crystal (AFLC) mode, a multi-domain vertical alignment (MVA) mode, a patterned vertical alignment (PVA) mode, an optically compensated bend (OCB) mode, or the like, a pair of pixel electrodes may be formed such that a pixel electrode is formed on the element formation layer 124 and a counter electrode is formed on the second structure body. In the case of an in-plane switching (IPS) mode, a pair of pixel electrodes may be formed such that a pixel electrode and a common electrode are formed on the element formation layer 124.

Note that the driving method and the liquid crystal material of the liquid crystal display device are not limited to those described above, and a variety of liquid crystal materials and driving methods can be used.

A semiconductor element included in the element formation layer 124 functions as a switching element for controlling voltage to be applied to the pixel electrode. Typical examples of semiconductor elements are as follows: a thin film transistor, a diode, a metal-insulator-metal (MIM), a micro electro mechanical system (MEMS), and the like. Examples of thin film transistors are as follows: a thin film transistor with a crystalline semiconductor, a microcrystalline semiconductor, or an amorphous semiconductor in a channel formation region; an organic semiconductor thin film transistor with an organic semiconductor in a channel formation region; a thin film transistor with an oxide semiconductor in a channel formation region; and the like.

As the seal member 134, a material containing a visible light curable resin, an ultraviolet curable resin, or a thermosetting resin can be used. For example, a bisphenol-A liquid resin, a bisphenol-A solid resin, a bromine-containing epoxy resin, a bisphenol-F resin, a bisphenol-AD resin, a phenol resin, a cresol resin, a novolac resin, a cycloaliphatic epoxy resin, an Epi-Bis type epoxy resin, a glycidyl ester resin, a glycidyl amine resin, a heterocyclic epoxy resin, a modified epoxy resin, or the like can be used. Note that when filler is dispersed in the seal member 134, the distance between the first structure body 132 and the second structure body 138 can be maintained constant.

A spacer may be provided in the liquid crystal layer 136 in order to keep a constant thickness of the liquid crystal layer 136. The spacer may be a pillar spacer or a spherical spacer. Note that a pillar spacer is also called a photolitho spacer, a post spacer, a scallop spacer, or a column spacer.

Figure 1B:
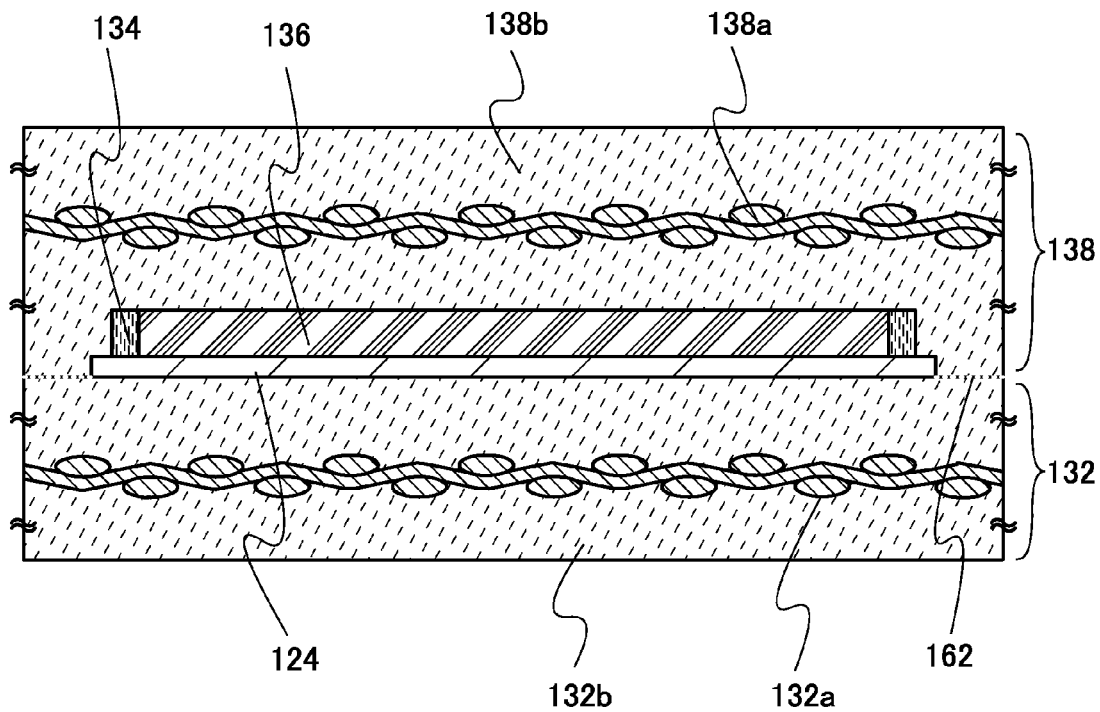

Although not illustrated in FIGS. 1A and 1B, a polarizing film is provided over a surface of the first structure body or/and the second structure body. With a polarizing film, contrast can be increased. Note that in the case of a reflective liquid crystal display device, a polarizing film may be provided over the first structure body or the second structure body. Note that in the case where a polarizing film is provided over the first structure body or/and the second structure body, when the polarizing axis and the axis of the fibrous body of the first structure body or/and the second structure body are set parallel or perpendicular to each other, light leakage can be reduced. Note that the axis of a fibrous body herein refers to a direction parallel to the longitudinal axis of the fibrous body.

In addition, besides the polarizing film, a color filter, a retardation film, an anti-reflection film, a viewing angle widening film, or the like may be provided as appropriate.

An effect of the liquid crystal display device described in this embodiment is described below.

If local pressure is applied to a conventional liquid crystal display device having a flexible substrate, the flexible substrate and an element formation layer are each stretched, and a curve with a small radius of curvature is generated in the pressure applied portion. Accordingly, a semiconductor element, a wiring, or the like included in the element formation layer is cracked, and the liquid crystal display device is damaged.

On the other hand, the liquid crystal display device described in this embodiment is provided with a structure body which includes a fibrous body impregnated with an organic resin. The fibrous body is formed with high-strength fibers, which have a high modulus of elasticity or a high Young's modulus. Thus, even if subjected to local pressure such as point pressure or linear pressure, the high-strength fibers are not stretched. The force applied is dispersed throughout the fibrous body, and the whole liquid crystal display device is curved. Thus, even if local pressure is applied, a curve with a large radius of curvature is generated in the liquid crystal display device, and the semiconductor element, the wiring, or the like included in the element formation layer is not cracked, and accordingly, damage to the liquid crystal display device can be reduced.

The liquid crystal display device described in this embodiment has the first structure body and the second structure body in each of which a fibrous body is impregnated with an organic resin, and the first structure body and the second structure body are in direct and close contact with each other outside the seal member. Accordingly, the adhesion between the first structure body and the second structure body is good, and detachment, defects, and the like in the liquid crystal display device can be reduced and reliability can be improved. In addition, external pressure and force generated by bending can be dispersed throughout the liquid crystal display device, and product defects can be reduced.

(Embodiment 2)

An object of this embodiment is to provide a liquid crystal display device which is not easily damaged even if subjected to planar pressure or linear pressure, and details are hereinafter described.

A liquid crystal display device described in this embodiment has a liquid crystal layer 136, a first structure body 132 and a second structure body 138 facing each other with the liquid crystal layer 136 interposed therebetween, a seal member 134 for enclosing the liquid crystal layer 136, and an element formation layer 124 including a pixel electrode, a semiconductor element, a capacitor element, a wiring, and the like. A feature of the liquid crystal display device is to have a first impact relaxation layer 151 outside the first structure body 132 and to have a second impact relaxation layer 153 outside the second structure body 138.

The first impact relaxation layer 151 and the second impact relaxation layer 153 are effective in dispersing and weakening force that is applied to the liquid crystal layer 136 or the element formation layer 124 from the outside. In addition, the first impact relaxation layer 151 and the second impact relaxation layer 153 make it possible to reduce damage to the liquid crystal display device due to large-area pressure such as planar pressure or linear pressure and to prevent a defect in characteristics or the like.

The first impact relaxation layer 151 and the second impact relaxation layer 153 preferably have lower elasticity and higher breaking strength than the first structure body 132 and the second structure body 138.

For the first impact relaxation layer 151 and the second impact relaxation layer 153, a material having low elasticity and high breaking strength is preferably used. For example, as the first impact relaxation layer 151 and the second impact relaxation layer 153, a layer having rubber elasticity with a modulus of elasticity of 5 GPa to 12 GPa and a modulus of rupture of 300 MPa or more can be used.

The first impact relaxation layer 151 and the second impact relaxation layer 153 are preferably formed with a high-strength material. Typical examples of high-strength materials are as follows: a polyvinyl alcohol resin, a polyester resin, a polyamide resin, a polyethylene resin, an aramid resin, a polyparaphenylene bonzobisoxazole resin, a glass resin, and the like.

Specifically, for the first impact relaxation layer 151 and the second impact relaxation layer 153, an aramid resin, a polyethylene naphthalate (PEN) resin, a polyethersulfone (PES) resin, a polyphenylene sulfide (PPS) resin, a polyimide (PI) resin, a polyethylene terephthalate (PET), or the like can be used. In this embodiment, an aramid resin film (with a modulus of elasticity of 10 GPa and a modulus of rupture of 480 MPa) is used as the second impact relaxation layer 153.

When the element formation layer 124 and the liquid crystal layer 136 are provided with a pair of structure bodies including fibrous bodies and a pair of impact relaxation layers symmetrically as described in this embodiment, force that is applied to the liquid crystal display device can be more evenly dispersed. Accordingly, the element formation layer 124 and the liquid crystal layer 136 can be further prevented from being damaged due to bending, warpage, or the like. This is because when the pair of structure bodies including fibrous bodies and the pair of impact relaxation layers are formed with the same material and the same thickness, the element formation layer 124 and the liquid crystal layer 136 are located in the middle of the liquid crystal display device and are resistant to bending stress. In addition, when the total thickness of the first structure body 132 and the first impact relaxation layer 151 and the total thickness of the second structure body 138 and the second impact relaxation layer 153 are each larger than the total thickness of the element formation layer 124 and the liquid crystal layer 136, the first structure body 132, the first impact relaxation layer 151, the second structure body 138, and the second impact relaxation layer 153 relax bending stress; thus, the element formation layer 124 and the liquid crystal layer 136 are not easily damaged.

Figure 2:
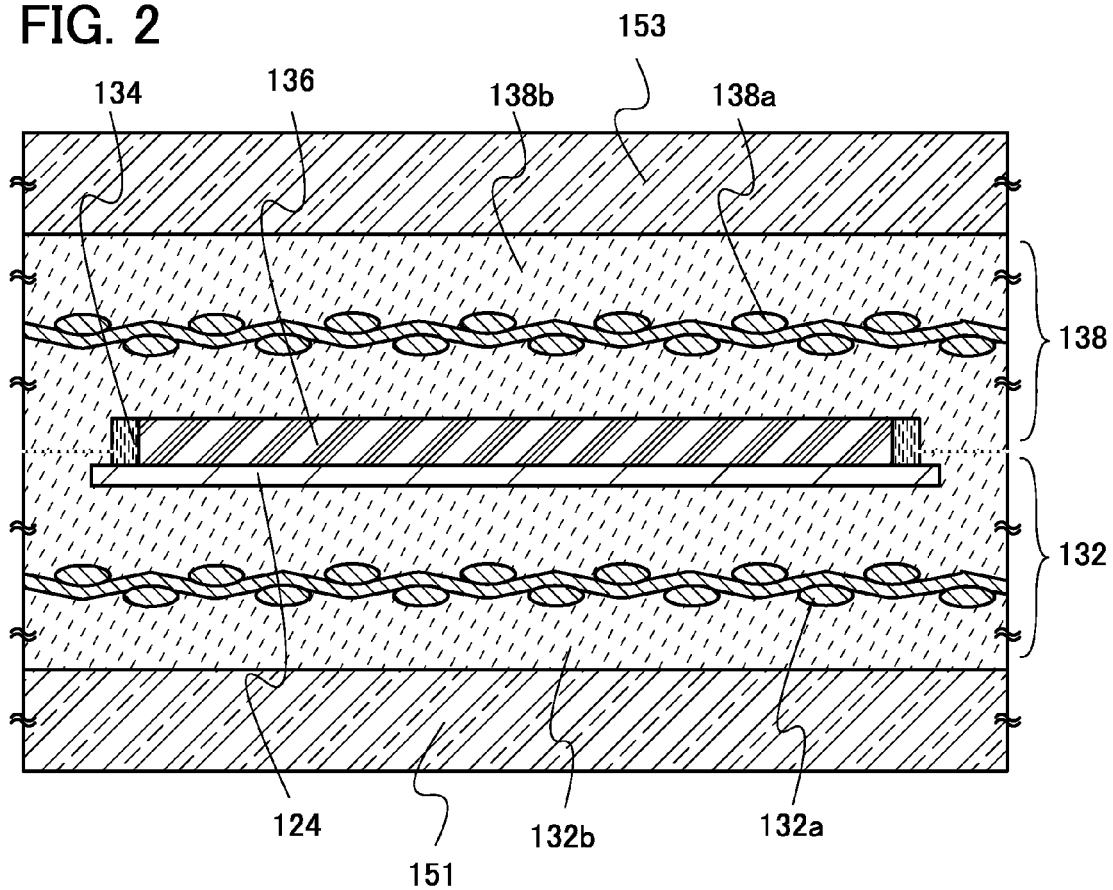
FIG. 2 is a cross-sectional view illustrating a liquid crystal display device of the present invention.

Note that although a mode where a pair of impact relaxation layers are provided on the outer sides of a liquid crystal display device is illustrated in FIG. 2, an impact relaxation layer may be provided outside a structure body on one side of a liquid crystal display device and a structure body may be provided outside an impact relaxation layer on the other side. In this case, the structure body and the impact relaxation layer are fixed in direct contact with each other.

(Embodiment 3)

An object of this embodiment is to reduce damage due to electrical stress such as static electricity to provide a highly reliable liquid crystal display device, and details are hereinafter described.

A feature of this embodiment is that a conductive layer is formed on the outermost surface of a liquid crystal display device.

A conductive layer 170 is formed on the outer surface of the first structure body 132 or the second structure body 138 (here, the first structure body 132 provided on the element formation layer 124 side). Note that when an impact relaxation layer is formed outside each of the first structure body 132 and the second structure body 138 as described in Embodiment 2, a conductive layer is formed on the outer surface of the impact relaxation layer.

The conductive layer 170 disperses static electricity that is to be applied to the liquid crystal display device due to electrostatic discharge or prevents local presence (localization) of charges (prevents a local potential difference from being generated); thus, the electrostatic breakdown of the liquid crystal display device can be prevented.

Figure 3A:
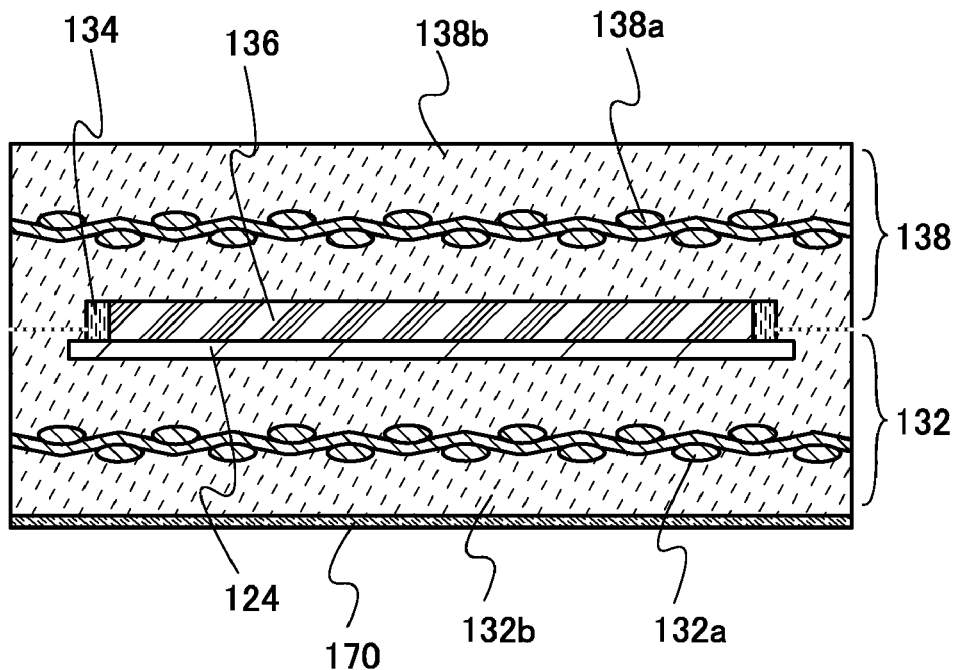
FIGS. 3A and 3B are cross-sectional views each illustrating a liquid crystal display device of the present invention.
Figure 3B:
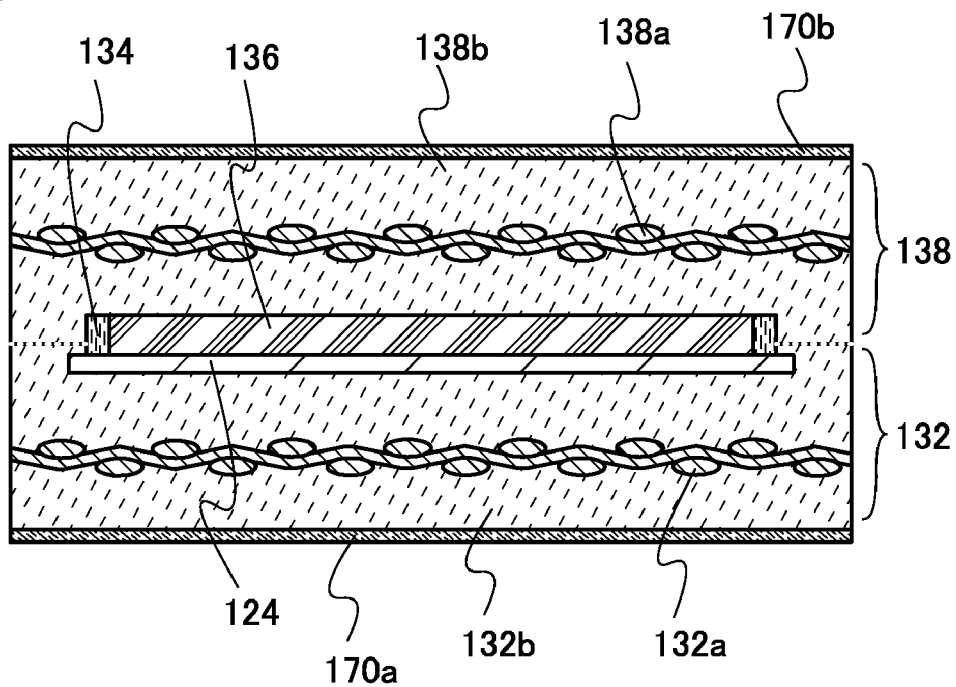

In addition, a mode in which conductive layers 170a and 170b are formed outside the first structure body 132 and the second structure body 138, respectively, is illustrated (see FIG. 3B). Note that in FIG. 3B, the conductive layers 170a and 170b are not electrically connected.

Alternatively, when a conductive layer is formed on each of a surface of the first structure body 132 and a surface of the second structure body 138, the conductive layers may be electrically connected to each other and may be at the same potential. The electrical connection may be achieved on part of a side surface of the liquid crystal display device or may be achieved with an electrode layer that penetrates the liquid crystal display device. Note that a side surface of a liquid crystal display device refers to a cut surface (division surface) produced when a single element formation layer is cut (divided) into separate element formation layers. The whole area of the cut surface may be covered with a conductive layer or part of the cut surface may be covered with a conductive layer. Specific modes are hereinafter described.

Figure 4A:
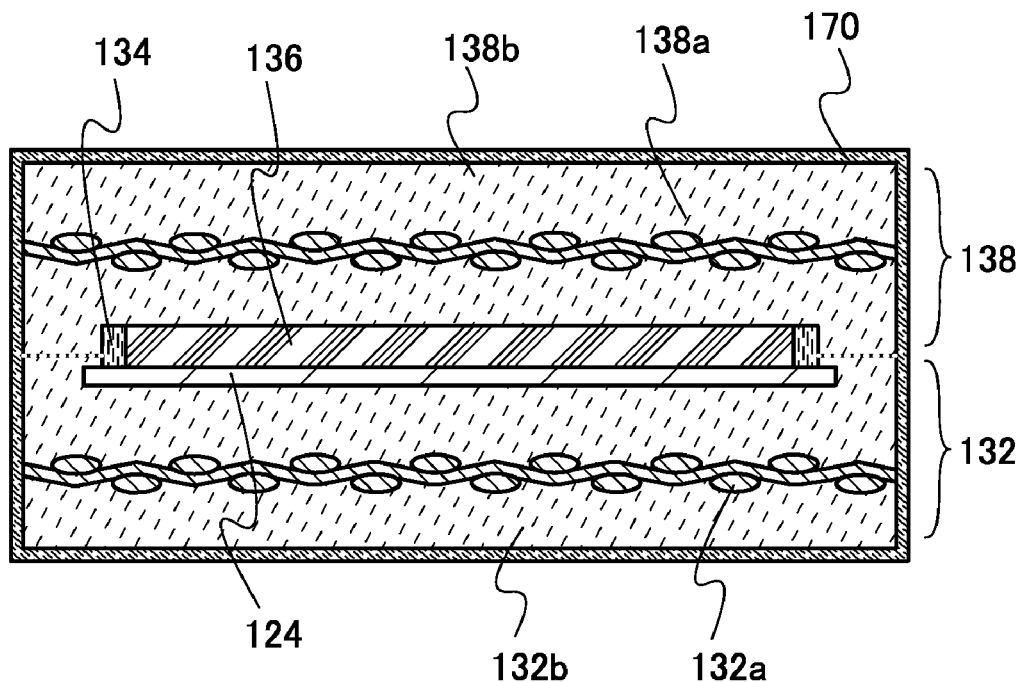
FIGS. 4A and 4B are cross-sectional views each illustrating a liquid crystal display device of the present invention.

A mode in which a conductive layer 170 is formed to cover the entire periphery (the upper surface, the lower surface, and the side surfaces) of the liquid crystal display device is illustrated (see FIG. 4A).

Figure 4B:
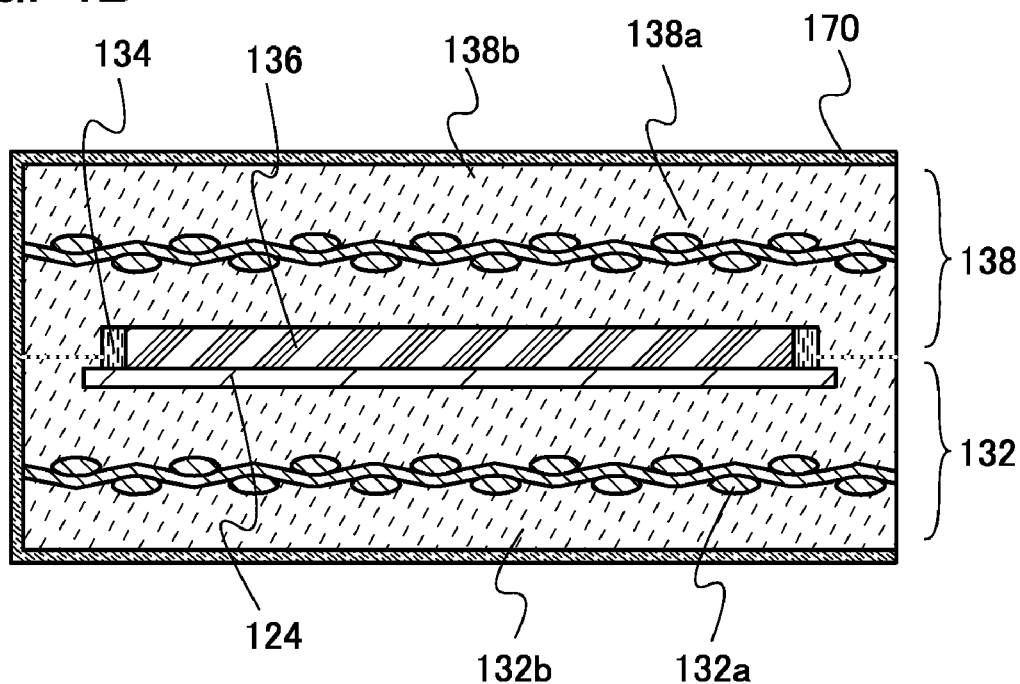

In addition, a mode in which a conductive layer 170 is formed on the upper surface, the lower surface, and at least one side surface of the liquid crystal display device is illustrated (see FIG. 4B).

Figure 5A:
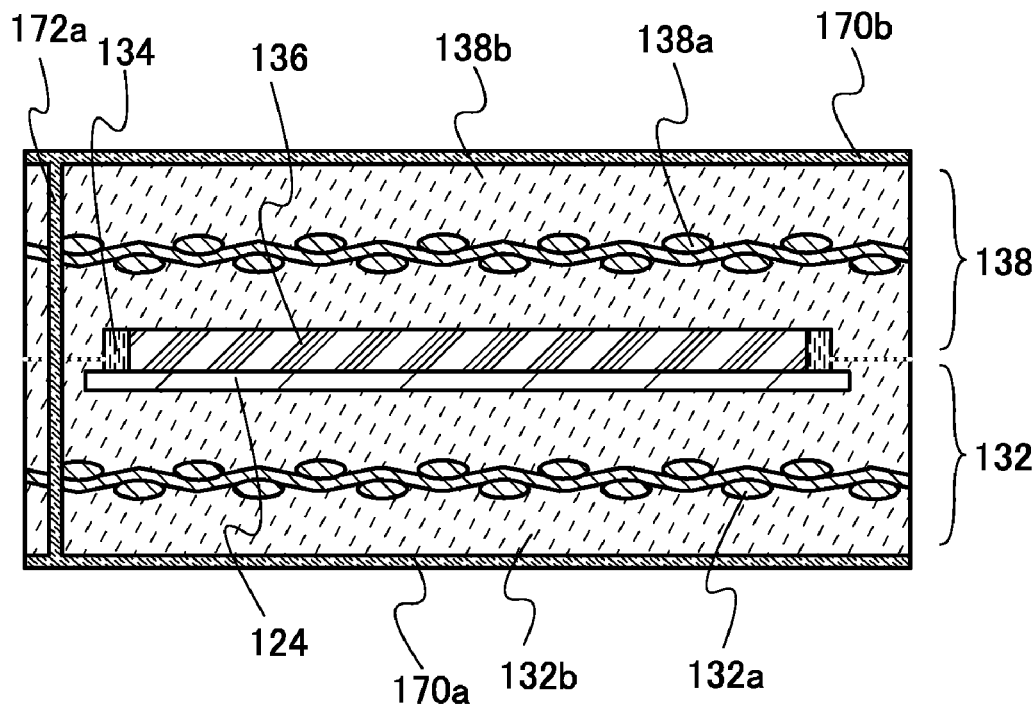
FIGS. 5A and 5B are cross-sectional views each illustrating a liquid crystal display device of the present invention.

In addition, a mode in which a conductive layer 170a formed on a surface of the first structure body 132 and a conductive layer 170b formed on a surface of the second structure body 138 are connected to each other with an electrode layer 172a that penetrates the liquid crystal display device is illustrated (see FIG. 5A).

Figure 5B:
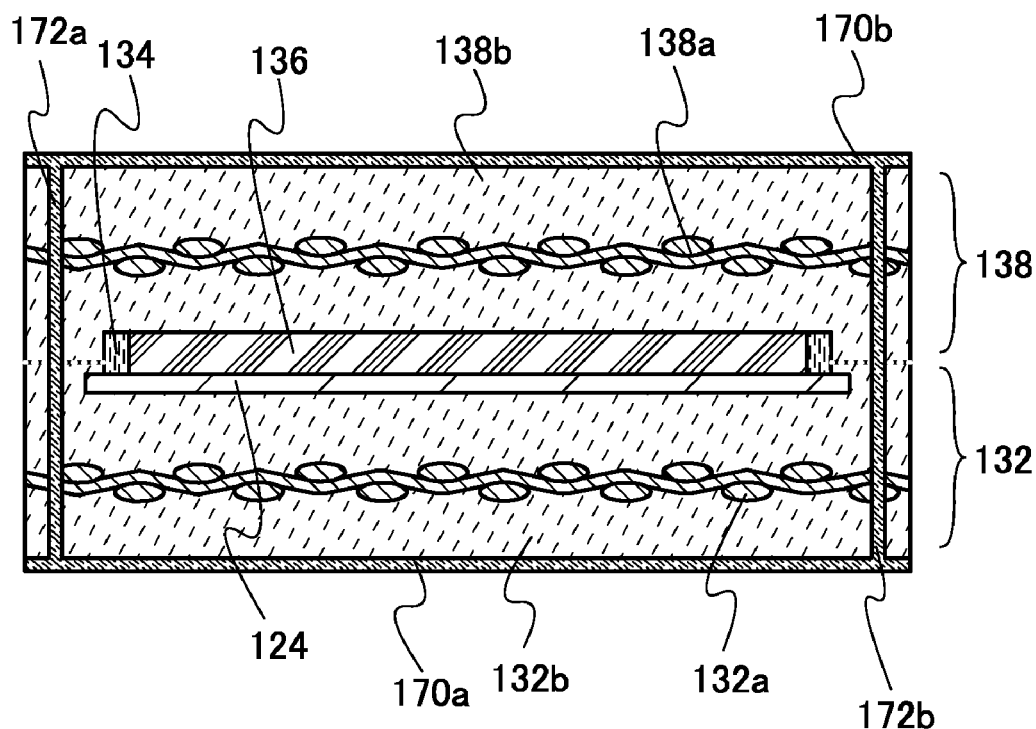

In addition, a mode in which a conductive layer 170a formed on a surface of the first structure body 132 and a conductive layer 170b formed on a surface of the second structure body 138 are electrically connected to each other with electrode layers 172a and 172b that penetrate the liquid crystal display device is illustrated (see FIG. 5B).

Through-holes in which the electrode layers 172a and 172b are formed may be processed by physical treatment with a needle, a drill, or the like or may be processed by chemical treatment such as etching. Alternatively, a laser beam may be used for processing.

In FIGS. 4A and 4B and FIGS. 5A and 5B, a large region of the element formation layer 124 is protected from external static electricity because the conductive layers that are electrically connected to each other are provided on the upper surface and the lower surface. This allows an electric current generated from static electricity to flow through the conductive layer formed on the upper surface and the conductive layer formed on the lower surface which are electrically connected to each other and are at the same potential, before the current flows through the liquid crystal display device and the liquid crystal display device is damaged. Thus, electrostatic breakdown can be prevented more effectively.

The conductive layers 170, 170a, and 170b may be any layers that have conductivity. Thus, as the conductive layers 170, 170a, and 170b, a layer formed with metal, metal nitride, or metal oxide or a stacked layer thereof can be used. Typically, the conductive layers 170, 170a, and 170b may be formed with an element selected from titanium, molybdenum, tungsten, aluminum, copper, silver, gold, nickel, platinum, palladium, iridium, rhodium, tantalum, cadmium, zinc, iron, silicon, germanium, zirconium, and barium or an alloy material, a compound material, a nitride material, or an oxide material containing any of the above elements as its main component.

As a nitride material, tantalum nitride, titanium nitride, or the like can be used. As an oxide material, indium tin oxide (ITO), indium tin oxide containing silicon oxide (ITSO), organoindium, organotin, zinc oxide, or the like can be used. Alternatively, indium zinc oxide (IZO) containing zinc oxide (ZnO), zinc oxide containing gallium (Ga), tin oxide ($SnO_2$), indium oxide containing tungsten oxide, indium zinc oxide containing tungsten oxide, indium oxide containing titanium oxide, indium tin oxide containing titanium oxide, or the like may be used.

Alternatively, as the conductive layers 170, 170a, and 170b, a semiconductor layer to which an impurity element or the like is added and conductivity is imparted, or the like can be used. For example, a polycrystalline silicon layer doped with an impurity element such as phosphorus can be used.

Still alternatively, a conductive high molecular compound (also referred to as a conductive polymer) may be used for the conductive layers 170, 170a, and 170b. As the conductive polymer, a so-called π-electron conjugated conductive polymer can be used. As examples, polyaniline and/or a derivative thereof, polypyrrole and/or a derivative thereof, polythiophene and/or a derivative thereof, and a copolymer of two or more kinds of those materials can be given.

In the case where the liquid crystal display device is of a transmissive or transflective type, the conductive layers 170, 170a, and 170b are formed with a material or a thickness to have a light transmitting property and conductivity. In the case where the conductive layers 170, 170a, and 170b are formed with metal, metal nitride, or metal oxide, the thickness is decreased such that a light transmitting property can be imparted.

In the case where the liquid crystal display device is of a reflective type, the conductive layer 170, 170a, or 170b that is provided on a display surface side preferably has a light transmitting property and conductivity. On the other hand, a conductive layer formed on a surface other than the display surface of the liquid crystal display device may be any layer that has conductivity and may have a light blocking property.

A protective layer may be stacked over the conductive layer. For example, a titanium layer may be formed as a conductive layer, and a titanium oxide layer may be formed as a protective layer over the titanium layer. With a protective layer, even when a conductive layer is provided on a surface of the liquid crystal display device, the protective layer is the outermost surface, and the deterioration of the conductive layer can be prevented.

With a conductive layer covering a liquid crystal display device, electrostatic breakdown (circuit malfunction or damage to a semiconductor element) due to electrostatic discharge of the liquid crystal display device is prevented. In addition, with a pair of structure bodies sealing a liquid crystal display device, a highly reliable liquid crystal display device having resistance while achieving a smaller thickness and a smaller size can be provided. In addition, defects in shape and characteristics due to external stress or electrostatic discharge can also be prevented during a manufacturing process, and a liquid crystal display device can be manufactured with high yield.

(Embodiment 4)

An object of this embodiment is to provide a method for manufacturing the liquid crystal display device described in Embodiment 1 with high yield.

Figure 6A:
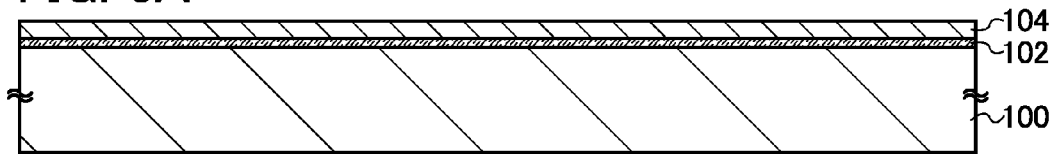
FIGS. 6A to 6E are cross-sectional views illustrating a manufacturing process of a liquid crystal display device of the present invention.

A release layer 102 is formed over a surface of a substrate 100, and then, an insulating layer 104 is formed (see FIG. 6A). The release layer 102 and the insulating layer 104 can be formed successively. When formed successively, the layers are not exposed to the air and thus mixture of an impurity can be prevented.

As the substrate 100, a glass substrate, a quartz substrate, a metal substrate, a stainless steel substrate, or the like may be used. For example, with the use of a rectangular glass substrate having a side of one meter or more, productivity can be drastically improved.

Note that although a case in which the release layer 102 is provided over an entire area of the substrate 100 is described in this embodiment, the release layer 102 may be selectively removed after being provided over an entire area of the substrate 100, such that a release layer is provided only in a region where needed. In addition, although the release layer 102 is formed in contact with the substrate 100, an insulating layer such as a silicon oxide layer, a silicon oxynitride layer, a silicon nitride layer, or a silicon nitride oxide layer may be formed in contact with the substrate 100, and the release layer 102 may be formed in contact with the insulating layer, if necessary.

The release layer 102 is formed having a single-layer structure or a stacked-layer structure of a layer with a thickness of 30 nm to 200 nm, which is formed using an element selected from tungsten (W), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), iridium (Ir), and silicon (Si), or an alloy material or a compound material containing any of the above elements as its main component by a sputtering method, a plasma CVD method, a coating method, a printing method, or the like. A crystalline structure of a layer containing silicon may be amorphous, microcrystalline, or polycrystalline. Note that in this embodiment, a coating method refers to a method in which a solution is discharged onto an object to form a film, and includes, for example, a spin coating method and a droplet discharging method in its category. Further, a droplet discharging method refers to a method in which droplets of a composition containing fine particles are discharged through a minute hole to form a pattern with a predetermined shape.

When the release layer 102 has a single-layer structure, a layer containing tungsten or a mixture of tungsten and molybdenum is preferably formed. Alternatively, a layer containing oxide or oxynitride of tungsten or a layer containing oxide or oxynitride of a mixture of tungsten and molybdenum is formed. Note that a mixture of tungsten and molybdenum corresponds to an alloy of tungsten and molybdenum, for example.

When the release layer 102 has a stacked-layer structure, it is preferable that a metal layer be formed as a first layer and a metal oxide layer be formed as a second layer. Typically, as the first-layer metal layer, a layer containing tungsten or a mixture of tungsten and molybdenum is formed. As the second layer, a layer containing oxide of tungsten or a mixture of tungsten and molybdenum, a layer containing nitride of tungsten or a mixture of tungsten and molybdenum, a layer containing oxynitride of tungsten or a mixture of tungsten and molybdenum, or a layer containing nitride oxide of tungsten or a mixture of tungsten and molybdenum is formed.

When the release layer 102 has a stacked-layer structure in which a metal layer is formed as a first layer and a metal oxide layer is formed as a second layer, the stacked-layer structure may be formed as follows: a layer containing tungsten is formed as the metal layer, and an insulating layer made of oxide is formed thereover, whereby a layer containing oxide of tungsten is formed as the metal oxide layer at the interface between the layer containing tungsten and the insulating layer. Moreover, the metal oxide layer may be formed in such a manner that the surface of the metal layer is subjected to thermal oxidation treatment, oxygen plasma treatment, treatment with a solution having strong oxidizability, such as ozone water, or the like.

The insulating layer 104 serves as a buffer layer and is provided to facilitate separation at the interface between the release layer 102 and the insulating layer 104 in a later separation step or to prevent a semiconductor element and a wiring from being cracked or damaged in a later separation step. For example, the insulating layer 104 is formed having a single-layer structure or a multi-layer structure, which is formed using an inorganic compound by a sputtering method, a plasma CVD method, a coating method, a printing method, or the like. As typical examples of the inorganic compound, silicon oxide, silicon nitride, silicon oxynitride, silicon nitride oxide, and the like can be given. Note that when silicon nitride, silicon nitride oxide, silicon oxynitride, or the like is used for the insulating layer 104, intrusion of moisture or gas such as oxygen from the outside into an element layer to be formed later can be prevented. The thickness of the insulating layer 104 serving as a buffer layer is preferably from 10 nm to 1000 nm, more preferably, from 100 nm to 700 nm.

Figure 6B:
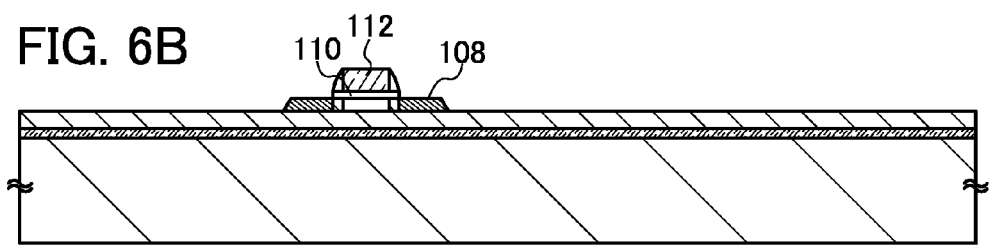

Next, a thin film transistor 106 is formed over the insulating layer 104 (see FIG. 6B). The thin film transistor 106 has at least a semiconductor layer 108 including a source region, a drain region, and a channel formation region, a gate insulating layer 110, and a gate electrode 112.

The semiconductor layer 108 is a layer formed using a non-single-crystal semiconductor with a thickness of 10 nm to 100 nm, more preferably, 20 nm to 70 nm. As a non-single-crystal semiconductor layer, a crystalline semiconductor layer, an amorphous semiconductor layer, a microcrystalline semiconductor layer, or the like can be given. As a semiconductor, silicon, germanium, a compound of silicon and germanium, or the like can be given. In particular, it is preferable to employ a crystalline semiconductor which is crystallized by laser beam irradiation, rapid thermal annealing (RTA), heat treatment using an annealing furnace, or a combination of these methods. In the heat treatment, a crystallization method with a metal element such as nickel which has an effect of promoting crystallization of a silicon semiconductor can be employed.

The gate insulating layer 110 is formed using an inorganic insulator such as silicon oxide or silicon oxynitride with a thickness of 5 nm to 200 nm, preferably, 10 nm to 100 nm.

The gate electrode 112 can be formed using a metal, or a polycrystalline semiconductor to which an impurity imparting one conductivity type is added. In the case of using a metal, tungsten (W), molybdenum (Mo), titanium (Ti), tantalum (Ta), aluminum (Al), or the like can be used. A metal nitride which is obtained by nitriding a metal can also be used. Alternatively, the gate electrode 112 may have a stacked-layer structure of a first layer made of the metal nitride and a second layer made of the metal. In that case, the first layer that is formed of the metal nitride can function as a barrier metal. In other words, the first layer can prevent the metal of the second layer from diffusing into the gate insulating layer or the semiconductor layer below the gate insulating layer. In the case of employing a stacked-layer structure, the gate electrode may have a shape in which the edge of the first layer extends beyond the edge of the second layer.

The thin film transistor 106 which includes a combination of the semiconductor layer 108, the gate insulating layer 110, the gate electrode 112, and the like can have various structures such as a single drain structure, an LDD (Lightly Doped Drain) structure, and a gate overlapped drain structure. In this embodiment, a thin film transistor of an LDD structure in which low-concentration impurity regions are provided using an insulating layer in contact with a side surface of the gate electrode 112 (also referred to as a "sidewall") is described. Alternatively, the thin film transistor can have a multigate structure where a plurality of transistors to which a gate voltage of the same potential is applied are connected in series, a dual gate structure where a semiconductor layer is interposed between upper and lower gate electrodes, or the like.

As the thin film transistor, a thin film transistor using a metal oxide or an organic semiconductor material for a semiconductor layer can also be used. As typical examples of the metal oxide, zinc oxide, oxide of zinc gallium indium (indium-gallium-zinc oxide), and the like can be given.

Figure 6C:
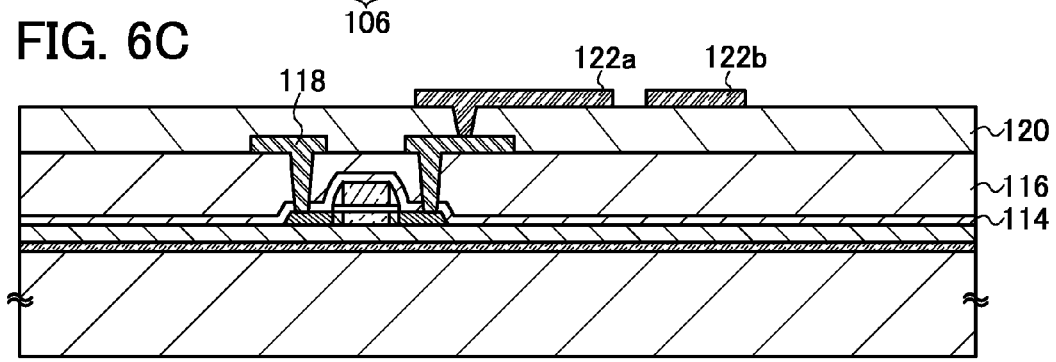

Next, wirings 118 are formed to be electrically connected to the source region and the drain region of the thin film transistor 106. Then, a pixel electrode 122a is formed to be electrically connected to the wiring 118, and a common electrode 122b is formed (see FIG. 6C).

In this embodiment, insulating layers 114 and 116 are formed to cover the thin film transistor 106, and the wirings 118 which can also function as a source electrode and a drain electrode are formed over the insulating layer 116. After that, an insulating layer 120 is formed over the wirings 118, and the pixel electrode and the common electrode are formed over the insulating layer 120.

The insulating layers 114 and 116 function as interlayer insulating layers. The insulating layers 114 and 116 are formed having a single-layer structure or a stacked-layer structure, which are formed using an inorganic material such as oxide of silicon or nitride of silicon, an organic material such as polyimide, polyamide, benzocyclobutene, acrylic, or epoxy, a siloxane material, or the like by a CVD method, a sputtering method, an SOG method, a droplet discharging method, a screen printing method, or the like. In this embodiment, a silicon nitride oxide layer can be formed as the insulating layer 114 that is the first layer, and a silicon oxynitride layer can be formed as the insulating layer 116 that is the second layer.

The wirings 118 are preferably formed using a combination of a low-resistance material such as aluminum (Al) and a barrier metal using a high-melting-point metal material such as titanium (Ti) or molybdenum (Mo), for example, a stacked-layer structure of titanium (Ti) and aluminum (Al) or a stacked-layer structure of molybdenum (Mo) and aluminum (Al).

The insulating layer 120 is formed having a single-layer structure or a stacked-layer structure, which is formed using an inorganic material such as oxide of silicon or nitride of silicon, an organic material such as polyimide, polyamide, benzocyclobutene, acrylic, or epoxy, a siloxane material, or the like by a CVD method, a sputtering method, an SOG method, a droplet discharging method, a screen printing method, or the like. In this embodiment, the insulating layer 120 is provided using epoxy by a screen printing method.

As a material of the pixel electrode 122a and the common electrode 122b, in the case of manufacturing a transmissive liquid crystal display device, a light-transmitting material such as indium tin oxide (ITO) in which indium oxide is mixed with tin oxide, indium tin silicon oxide (ITSO) in which indium tin oxide (ITO) is mixed with silicon oxide, indium zinc oxide (IZO) in which indium oxide is mixed with zinc oxide, zinc oxide (ZnO), or tin oxide ($SnO_2$) can be used. In the case of manufacturing a reflective liquid crystal display device, a reflective metal layer (such as a material layer containing aluminum or silver as its main component, or a stack thereof) can be used for the pixel electrode 122a and the common electrode 122b. In the case of manufacturing a transflective (semi-transmissive) liquid crystal display device, a reflective metal can be used for a pixel electrode in a reflective region, and a light-transmitting material can be used in a transmissive region.

In this embodiment, an IPS mode liquid crystal display device is formed as the liquid crystal display device; thus, a pair of the pixel electrode 122a and the common electrode 122b are formed over the insulating layer 120. Note that in the case of manufacturing a vertical electric field driving mode liquid crystal display device, the pixel electrode 122a may be formed over the insulating layer 120, and the common electrode 122b may be formed over a second structure body.

Next, insulating layers provided over an edge portion of the substrate 100 are removed by etching or the like. In this embodiment, at lest the insulating layers 114, 116, and 120 are removed such that the insulating layer 104 is exposed. Note that in the case of forming a plurality of liquid crystal display devices from one substrate, insulating layers are etched at an edge portion of each region where a panel is to be formed, whereby the elements of each panel are separated from those of the other panels.

Figure 6D:
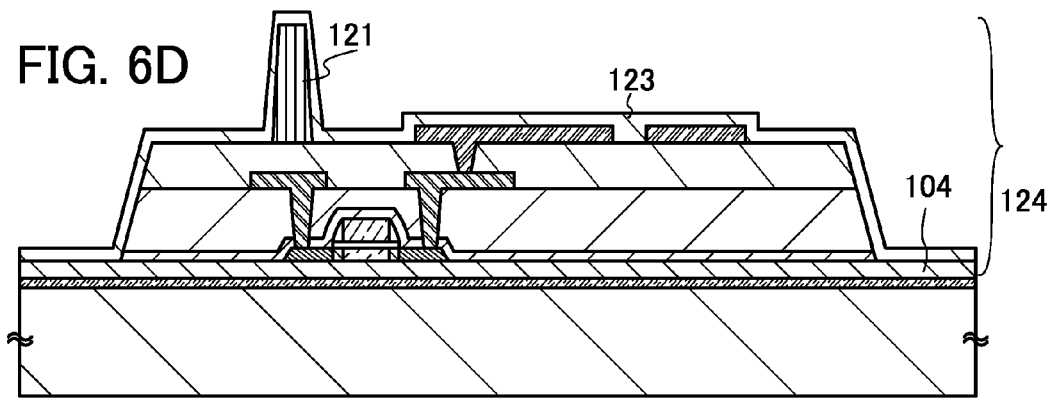

Next, a spacer 121 is formed over the insulating layer 120. Then, an alignment film 123 is formed over the pixel electrode 122a, the common electrode 122b, the insulating layer 120, and the insulating layer 104 to facilitate the alignment of a liquid crystal material (see FIG. 6D).

In this embodiment, a pillar spacer is used as the spacer 121. The pillar spacer may be formed by applying an organic insulating material such as photosensitive acrylic to an entire area of a substrate by a spin coating method and performing a series of photolithography steps. The photosensitive organic insulating material remaining over the substrate functions as a spacer. By this method, a place where a spacer is desired to be provided can be exposed to light depending on a mask pattern used for light exposure. Thus, when a pillar spacer is provided in a portion where a liquid crystal is not driven, the distance between the first structure body and the second structure body can be maintained constant and light leakage can also be prevented. The spacer 121 can also be formed by discharging a composition containing an organic insulating material by an ink-jet method and baking the composition.

Note that although the spacer 121 is formed over the insulating layer 120 in this embodiment, the spacer 121 may be formed over a second structure body that is not illustrated.

The alignment film 123 is formed by applying a solution in which polyimide or the like is dissolved to a substrate, baking the solution, and then performing rubbing treatment. Alternatively, the alignment film 123 is formed by applying a polymer which can undergo cis-trans isomerization by UV light irradiation or ion beam irradiation to a substrate and then performing cis-trans isomerization of the polymer by UV light irradiation or ion beam irradiation. Alternatively, the alignment film is formed by oblique deposition of silicon oxide onto a substrate.

Note that part of the release layer 102 can be embrittled by heat treatment in the step of crystallizing the semiconductor layer 108, the step of activating the source region and the drain region included in the semiconductor layer 108, the step of forming the insulating layers 114, 116, and 120, or the step of forming the alignment film 123. Accordingly, a later separation step can be easily carried out.

Figure 6E:
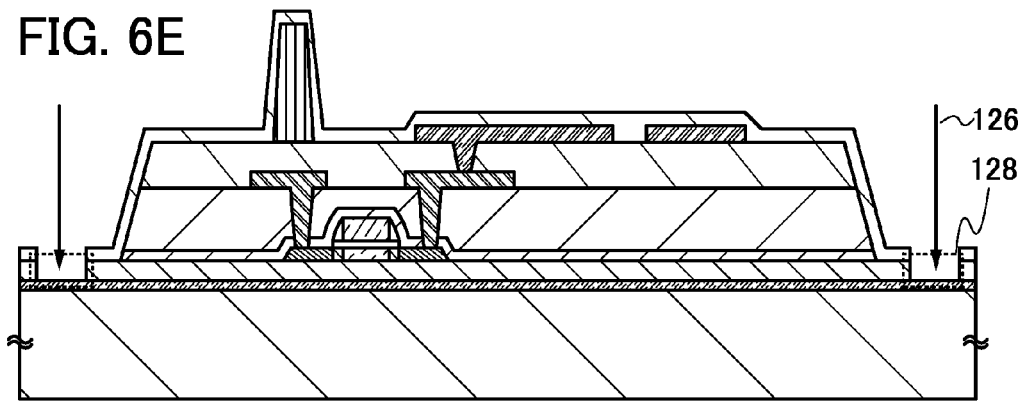

Next, in order to easily separate an element formation layer 124 including the thin film transistor 106 and the like from the substrate 100, a depressed portion is preferably formed by laser beam irradiation before the element formation layer 124 is separated from the substrate 100. In this embodiment, a depressed portion 128 is formed by irradiating the insulating layer 104 and the alignment film 123 that are exposed at the edge portion with a laser beam (see FIG. 6E).

Figure 7A:
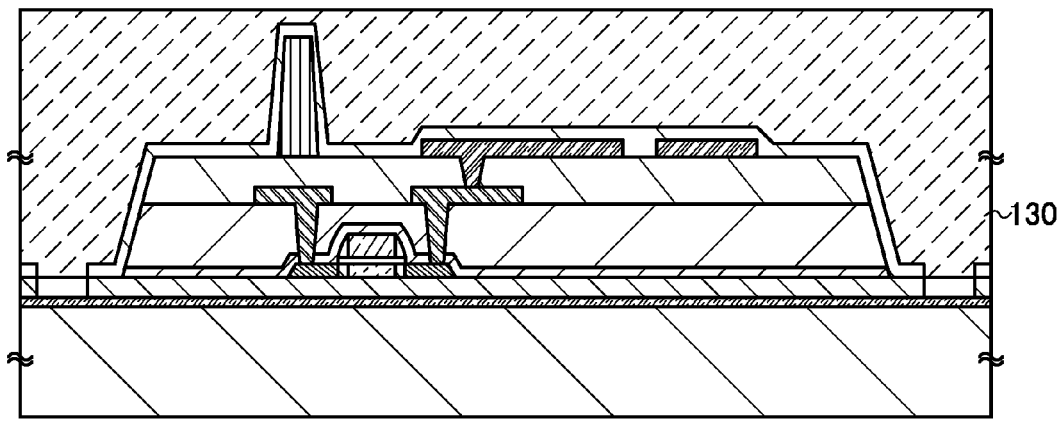
FIGS. 7A to 7C are cross-sectional views illustrating a manufacturing process of a liquid crystal display device of the present invention.

Next, as illustrated in FIG. 7A, an adhesive film 130 is attached to the element formation layer 124. As the adhesive film 130, a sheet that can be removed with light or heat is employed.

When the adhesive film 130 is attached, separation can be easily performed. In addition, stress to be applied to the element formation layer 124 before and after separation can be reduced, and damage to the thin film transistor 106 can be suppressed.

Figure 7B:
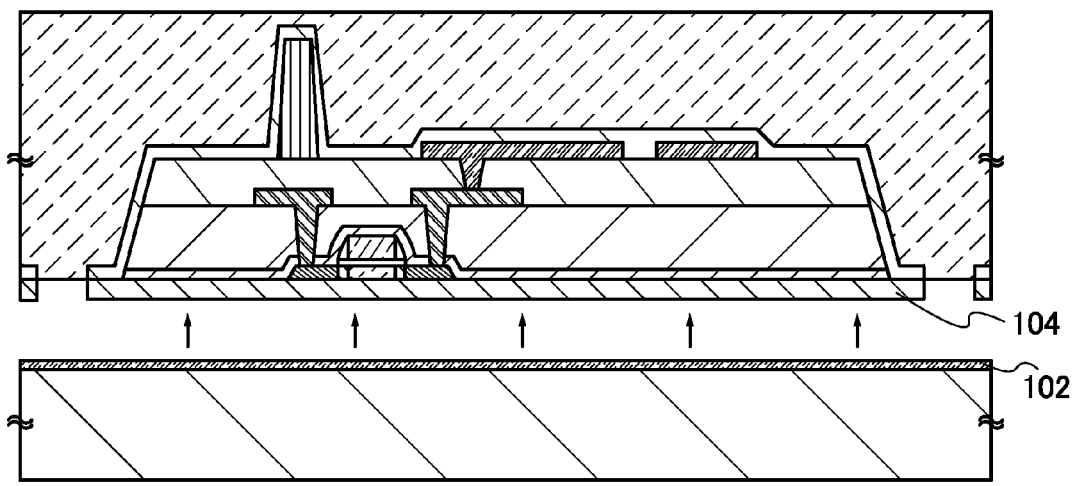

Next, by using the depressed portion 128 as a trigger, the element formation layer 124 is separated from the substrate 100 at the interface between the release layer 102 and the insulating layer 104 serving as a buffer layer (see FIG. 7B). The separation may be performed by, for example, applying mechanical force (by separation with a human hand or a gripper, by separation with a rotating roller, or the like).

Alternatively, the element formation layer 124 may be separated from the release layer 102 by dropping a liquid into the depressed portion 128 and infiltrating the liquid into the interface between the release layer 102 and the insulating layer 104. Still alternatively, the element formation layer 124 can be separated from a substrate having an insulating surface by a method in which a fluoride gas such as $NF_3$, $BrF_3$, or $ClF_3$ is introduced to the depressed portion 128 and the release layer is removed by etching with the use of the fluoride gas.

In this embodiment, a method is employed in which a metal oxide layer is formed as the release layer 102 in contact with the insulating layer 104 and the element formation layer 124 is separated by a physical means. However, the present invention is not limited to this method. A method may be employed in which a light-transmitting substrate is used as the substrate 100, an amorphous silicon layer containing hydrogen is used as the release layer 102, the release layer 102 is irradiated with a laser beam from the substrate 100 side to vaporize hydrogen contained in the amorphous silicon layer so that separation occurs between the substrate 100 and the release layer 102.

Alternatively, a method in which the substrate 100 is removed by being mechanically polished or a method in which the substrate 100 is removed by being dissolved using a solution such as HF can be employed. In this case, the release layer 102 is not necessarily used.

Figure 7C:
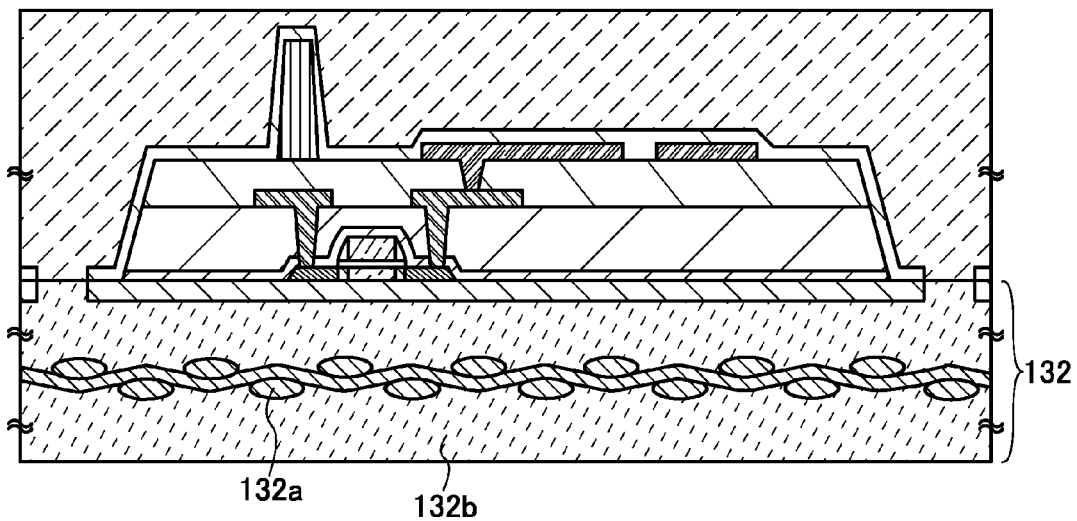

Next, a first structure body 132 in which a fibrous body 132a is impregnated with an organic resin 132b is provided over a separation surface of the element formation layer 124 after separation (over a surface of the insulating layer 104 which is exposed by separation) (see FIG. 7C). Such a structure body is also called a prepreg.

A prepreg is formed in the following manner: after a fibrous body is impregnated with a varnish in which a matrix resin is diluted with an organic solvent, drying is performed so that the organic solvent is volatilized and the matrix resin is semi-cured or cured. The structure body preferably has a thickness of 10 μm to 100 μm, more preferably, 10 μm to 30 μm. By using a structure body having such a thickness, a liquid crystal display device which is thin and can be curved can be manufactured.

A thermosetting resin such as an epoxy resin, an unsaturated polyester resin, a polyimide resin, a bismaleimide-triazine resin, or a cyanate resin can be used as the organic resin 132b. Alternatively, a thermoplastic resin such as a polyphenylene oxide resin, a polyetherimide resin, or a fluorine resin may be used. When the above-described organic resin is used, the fibrous body can be fixed to the element formation layer 124 by heat treatment. The higher the glass transition temperature of the organic resin 132b is, the less easily the organic resin 132b is damaged by local pressure; thus, the organic resin 132b preferably has high glass transition temperature.

Highly thermally conductive filler may be dispersed in the organic resin 132b or yarn bundles of the fibrous body 132a. Examples of the highly thermally conductive filler include aluminum nitride, boron nitride, silicon nitride, alumina, and metal particles of silver, copper, or the like. When the highly thermally conductive filler is included in the organic resin or the yarn bundles, heat generated can be easily released to the outside. Accordingly, thermal storage in the liquid crystal display device can be suppressed, and damage to the liquid crystal display device can be reduced.

The fibrous body 132a is a woven or nonwoven fabric using high-strength fibers of an organic compound or an inorganic compound and is provided so as to overlap. A high-strength fiber is specifically a fiber with a high tensile modulus of elasticity or a fiber with a high Young's modulus. As typical examples of a high-strength fiber, a polyvinyl alcohol fiber, a polyester fiber, a polyamide fiber, a polyethylene fiber, an aramid fiber, a polyparaphenylene benzobisoxazole fiber, a glass fiber, and a carbon fiber can be given. As the glass fiber, a glass fiber using E glass, S glass, D glass, Q glass, or the like can be used. Note that the fibrous body 132a may be formed from one or more kinds of the above-described high-strength fibers.

The fibrous body 132a may be a woven fabric which is woven using bundles of fibers (single yarns) (hereinafter, the bundles of fibers are referred to as yarn bundles) for warp yarns and weft yarns, or a nonwoven fabric obtained by stacking yarn bundles of plural kinds of fibers in a random manner or in one direction. In the case of a woven fabric, a plain-woven fabric, a twilled fabric, a satin-woven fabric, or the like can be used as appropriate.

The yarn bundle may have a circular shape or an elliptical shape in cross section. As the yarn bundle, a yarn bundle may be used which has been subjected to fiber opening with a high-pressure water stream, high-frequency vibration using liquid as a medium, continuous ultrasonic vibration, pressing with a roller, or the like. A yarn bundle which is subjected to fabric opening has a larger width, has a smaller number of single yarns in the thickness direction, and has an elliptical shape or a flat shape in its cross section. Further, by using a loosely twisted yarn as the yarn bundle, the yarn bundle is easily flattened and has an elliptical shape or a flat shape in cross section. By using a yarn bundle having a cross section of an elliptical shape or a flat shape as described above, it is possible to make the fibrous body 132a thinner. Accordingly, the first structure body 132 can be made thin, and thus, a thin liquid crystal display device can be manufactured.

Next, the first structure body is heated and subjected to pressure bonding so that the organic resin of the first structure body is plasticized or cured. In the case where the organic resin is a plastic organic resin, the organic resin which is plasticized is then cured by cooling to room temperature.

By heating and pressure bonding, the organic resin 132b is uniformly spread over the surface of the element formation layer 124 and is cured. A step in which the first structure body 132 is subjected to pressure bonding can be performed under an atmospheric pressure or a reduced pressure. By the above process, the first structure body 132 can be fixed to the element formation layer 124.

Figure 8A:
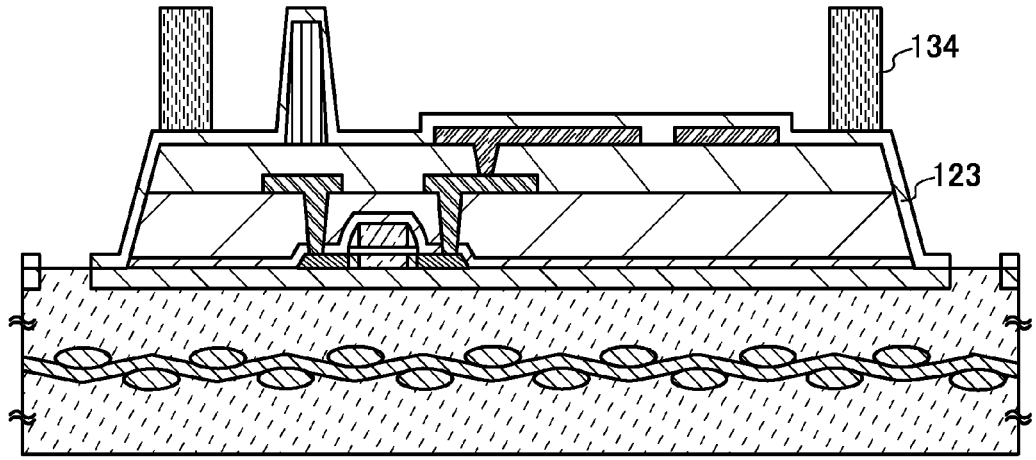
FIGS. 8A and 8B are cross-sectional views illustrating a manufacturing process of a liquid crystal display device of the present invention.

Next, a seal member 134 is formed over the alignment film 123 (see FIG. 8A). The seal member 134 is applied to the alignment film 123 or a second structure body using a screen printing method, an ink-jet apparatus, or a dispenser apparatus. As the seal member 134, typically, a material containing a visible light curable resin, an ultraviolet curable resin, or a thermosetting resin can be used. For example, a bisphenol-A liquid resin, a bisphenol-A solid resin, a bromine-containing epoxy resin, a bisphenol-F resin, a bisphenol-AD resin, a phenol resin, a cresol resin, a novolac resin, a cycloaliphatic epoxy resin, an Epi-Bis type epoxy resin, a glycidyl ester resin, a glycidyl amine resin, a heterocyclic epoxy resin, a modified epoxy resin, or the like can be used. The seal member may include filler (with a diameter of 1 μm to 24 μm).

Next, a liquid crystal material is discharged to the inside of the seal member 134. After that, a second structure body 137 is attached in a reduced pressure atmosphere and the seal member 134 is cured by UV light irradiation to fix the second structure body 137 (see FIG. 8B). By this fixing step, a liquid crystal layer 136 surrounded by the first structure body 132, the second structure body 137, and the seal member 134 is formed.

Figure 8B:
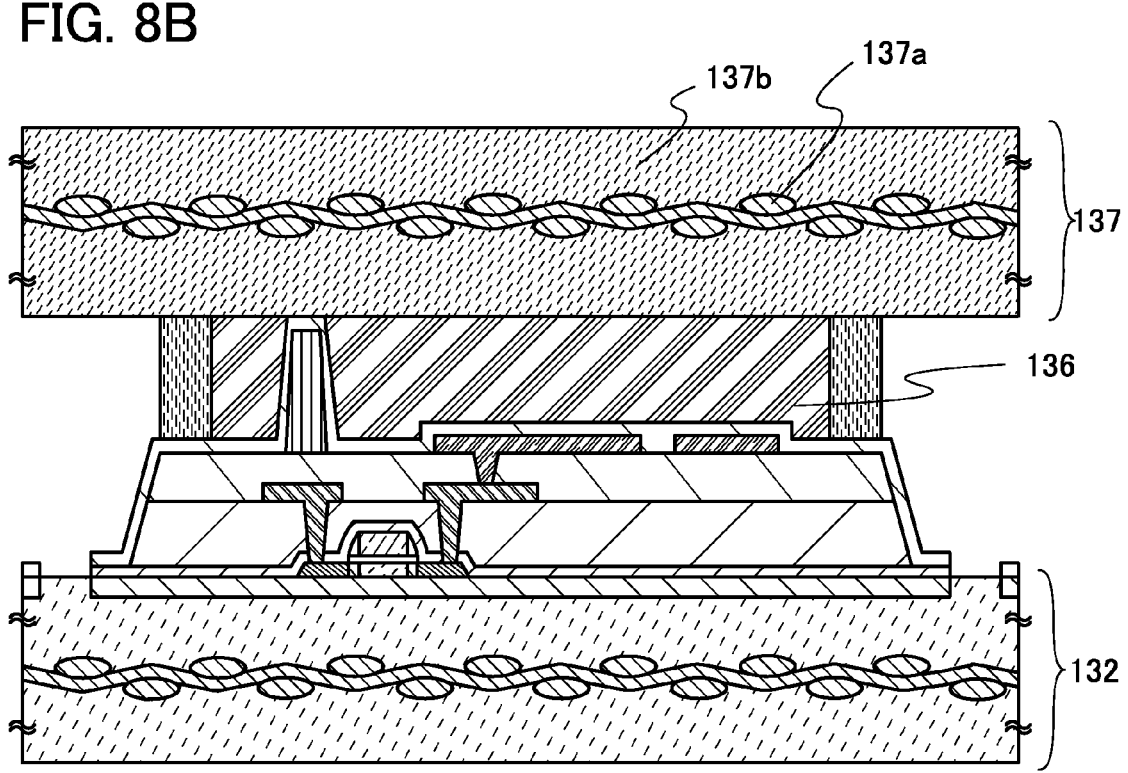

In the second structure body 137, as in the first structure body 132, a fibrous body 137a is impregnated with an organic resin 137b. In FIG. 8B, the second structure body 137 is formed in the following manner: after a fibrous body is impregnated with a varnish in which a matrix resin is diluted with an organic solvent, drying is performed so that the organic solvent is volatilized and the matrix resin is semi-cured. The resin is cured in a later heating step.

Figure 9:
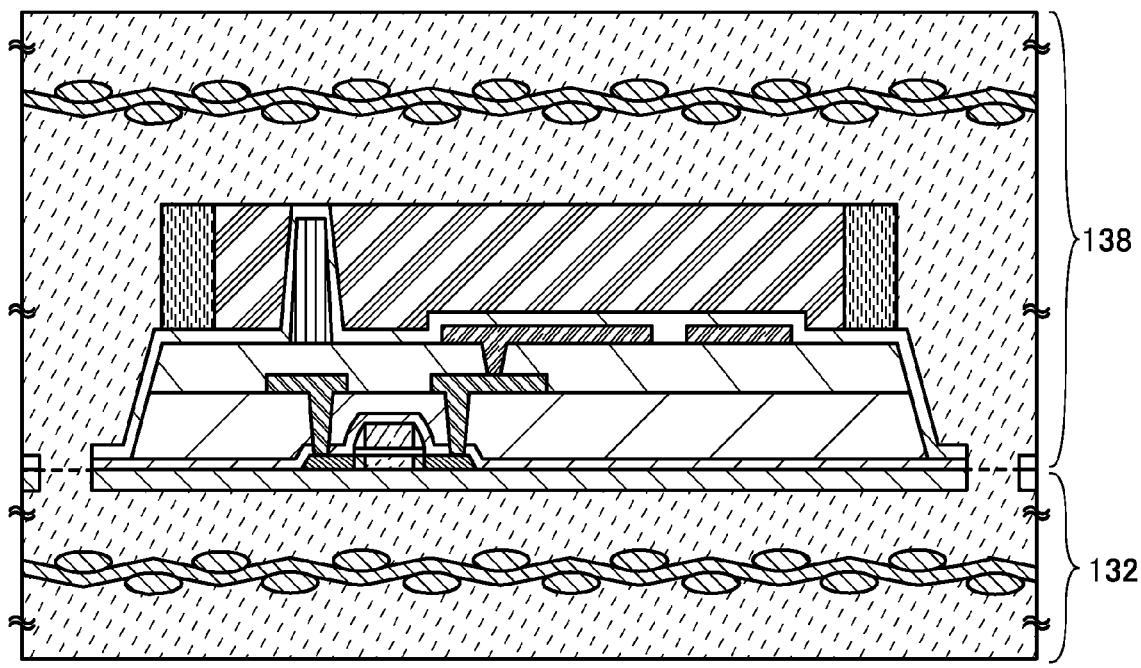
FIG. 9 is a cross-sectional view illustrating a manufacturing process of a liquid crystal display device of the present invention.

Next, the first structure body 132 and the second structure body 137 are heated and subjected to pressure bonding to form a second structure body 138 in which the organic resin is cured. In addition, when the organic resin of the second structure body 138 is cured, the first structure body 132 is fixed to the second structure body 138 (see FIG. 9). Through the above process, a liquid crystal display device having good adhesion between the first structure body and the second structure body is manufactured.

In this embodiment, in FIG. 7B, separation is caused with the release layer 102 after the adhesive film 130 is provided over the surface of the element formation layer 124. Alternatively, without this step, the following process may be employed. After the steps of FIGS. 6A to 6E, the seal member 134 is formed over the element formation layer 124, the liquid crystal material is applied to the inside of the seal member 134, and the element formation layer 124 and the second structure body are fixed using the seal member 134 to form the liquid crystal layer 136. Next, the element formation layer 124, the liquid crystal layer 136, and the second structure body 137 are separated from the release layer 102. Then, the element formation layer 124 is fixed to the first structure body 132, and in addition, the first structure body 132 and the second structure body 137 are fixed to each other.

Through the above steps, a flexible and highly reliable liquid crystal display device which is not easily damaged by external pressure can be manufactured.

(Embodiment 5)

In this embodiment, a method for manufacturing a liquid crystal display device which is different from that in the above embodiment is described with reference to drawings.

First, a release layer 102 is formed over a surface of a substrate 100, and then, an insulating layer 104 is formed. After that, a pixel electrode 150a and a common electrode 150b are formed over the insulating layer 104 (see FIG. 10A). Here, it is preferable that the insulating layer 104 have a stacked-layer structure and the uppermost layer of the insulating layer be formed with a silicon nitride layer.

As a material of the pixel electrode 150a and the common electrode 150b, in the case of manufacturing a transmissive liquid crystal display device, indium tin oxide (ITO) in which indium oxide is mixed with tin oxide, indium tin silicon oxide (ITSO) in which indium tin oxide (ITO) is mixed with silicon oxide, indium zinc oxide (IZO) in which indium oxide is mixed with zinc oxide, zinc oxide (ZnO), tin oxide ($SnO_2$), or the like can be used. In the case of manufacturing a reflective liquid crystal display device, a reflective metal layer (such as a material layer containing aluminum or silver as its main component, or a stack thereof) can be used for the pixel electrode 150a and the common electrode 150b. In the case of manufacturing a transflective (semi-transmissive) liquid crystal display device, a reflective metal can be used for a pixel electrode in a reflective region and a light-transmitting material can be used in a transmissive region.

In this embodiment, an IPS mode liquid crystal display device is formed as the liquid crystal display device; thus, a pair of the pixel electrode 150a and the common electrode 150b are formed over the insulating layer 104. Note that in the case of manufacturing a vertical electric field driving mode liquid crystal display device, the pixel electrode 150a may be formed over the insulating layer 104, and the common electrode 150b may be formed over a second structure body.

Next, an insulating layer 152 is formed over the pixel electrode 150a and the common electrode 150b, and a thin film transistor 106 is formed over the insulating layer 152. Insulating layers 114 and 116 are formed over the thin film transistor 106, and wirings 118 which can also function as a source electrode and a drain electrode are formed over the insulating layer 116 (see FIG. 10B).

For the thin film transistor 106, various kinds of structures such as a single drain structure, an LDD (lightly doped drain) structure, and a gate overlapped drain structure can be employed. In this embodiment, a thin film transistor of a single drain structure is described.

The wiring 118 and the pixel electrode 150a are electrically connected to each other. Here, the wiring 118 and the pixel electrode 150a are electrically connected through a conductive layer 154. The conductive layer 154 can be formed at the same time as (in the same step as) a gate electrode 112 of the thin film transistor 106.

Figure 10A:
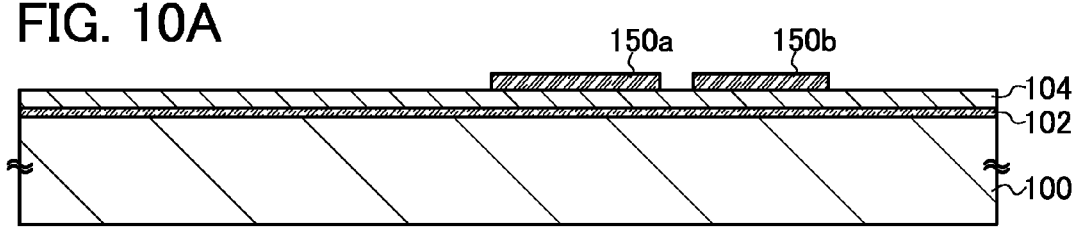
FIGS. 10A to 10D are cross-sectional views illustrating a manufacturing process of a liquid crystal display device of the present invention.
Figure 10B:
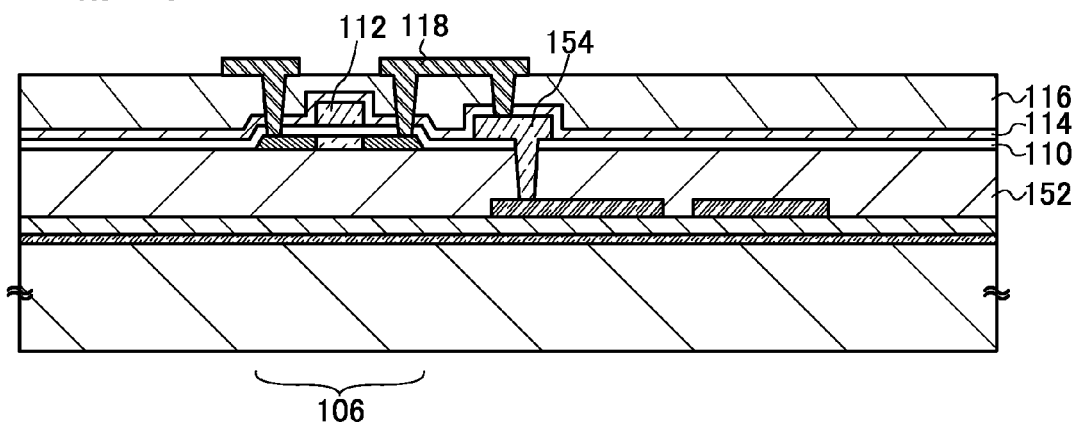
Figure 10C:
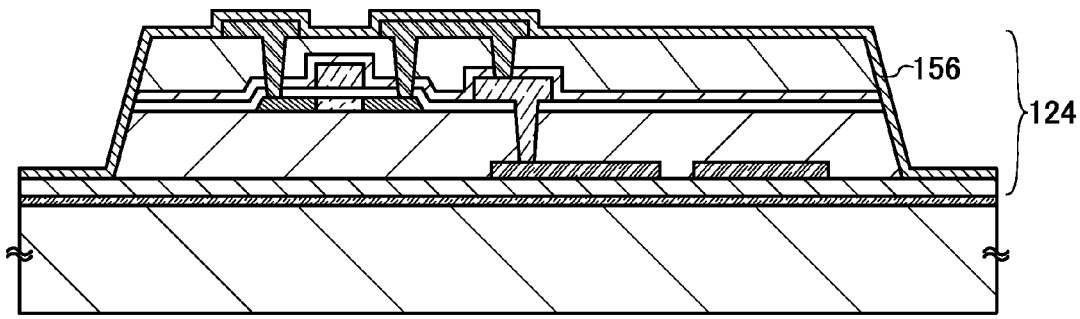

Next, insulating layers provided over an edge portion of the substrate 100 are removed by etching or the like, and then, an insulating layer 156 is formed to cover the wirings 118 (see FIG. 10C). In this embodiment, the insulating layer 152 and the like are removed such that at least the insulating layer 104 is exposed. Note that in the case of forming a plurality of liquid crystal display devices from one substrate, insulating layers are etched at an edge portion of each region where a panel is to be formed, whereby the elements of each panel are separated from those of the other panels.

Note that the insulating layer 156 is preferably formed with silicon nitride here. As a result, an element formation layer 124 can be sealed with the insulating layer 104 and the insulating layer 156; thus, moisture or the like can be prevented from entering the element formation layer 124 from the outside. Accordingly, the deterioration of the element formation layer 124 can be suppressed.

Figure 10D:
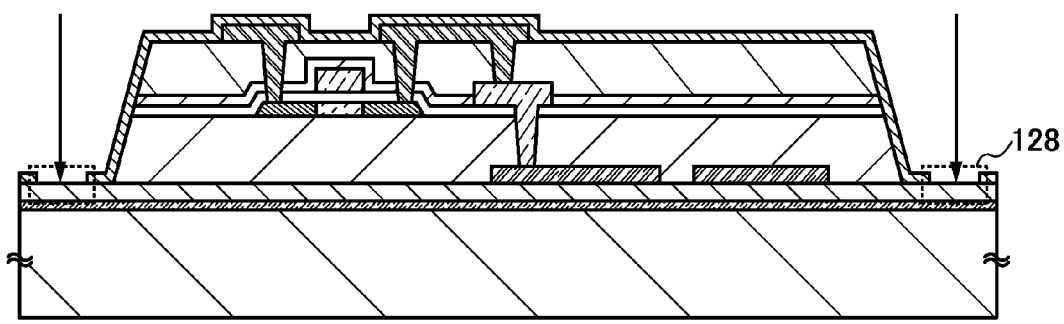

Next, in order to easily separate the element formation layer 124 including the thin film transistor 106 and the like from the substrate 100, a depressed portion 128 is preferably formed by laser beam irradiation before the element formation layer 124 is separated from the substrate 100. In this embodiment, the depressed portion 128 is formed by irradiating the insulating layers 156 and 104 at the edge portion with a laser beam (see FIG. 10D).

Figure 11A:
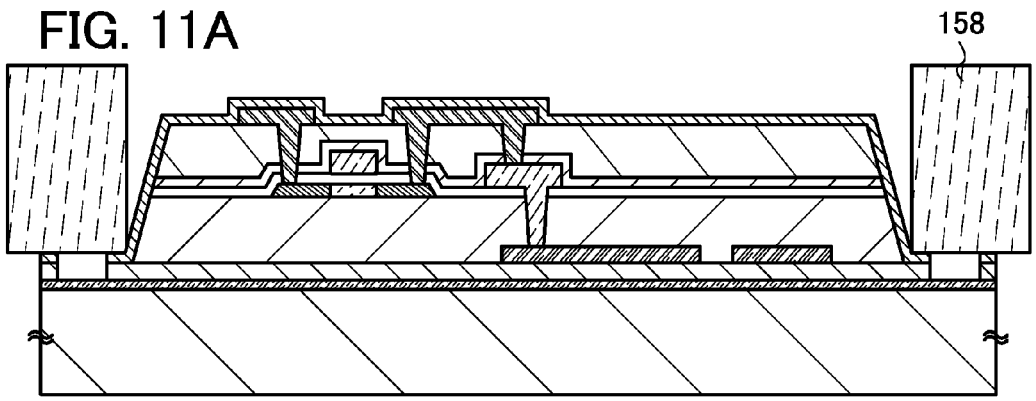
FIGS. 11A to 11C are cross-sectional views illustrating a manufacturing process of a liquid crystal display device of the present invention.

Next, a separate film 158 is provided to cover at least the depressed portion 128 (see FIG. 11A). An example of the separate film 158 is a film in which a silicone resin layer is formed over PET.

Figure 11B:
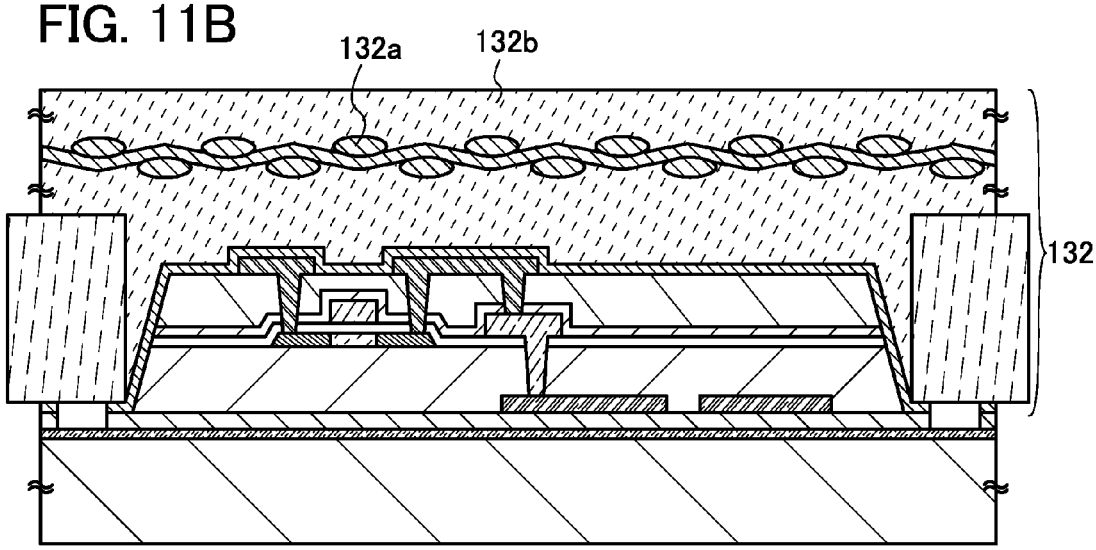

Then, a first structure body 132 in which a fibrous body 132a is impregnated with an organic resin 132b is provided over a surface of the insulating layer 156. Next, the first structure body is heated and subjected to pressure bonding so that the organic resin of the first structure body is plasticized or cured. By heating and pressure bonding, the organic resin 132b is uniformly spread over the surface of the element formation layer 124 and is cured. Thus, the first structure body 132 can be fixed to the element formation layer 124 (see FIG. 11B).

When the first structure body 132 is attached to the insulating layer 156, separation can be easily performed. In addition, stress to be applied to the element formation layer 124 before and after separation can be reduced, and damage to the thin film transistor 106 can be suppressed.

If the separate film 158 is provided before the first structure body 132 is attached, defective separation due to the entry of the organic resin 132b into the depressed portion 128 and attachment thereof to the release layer 102 can be suppressed.

Figure 11C:
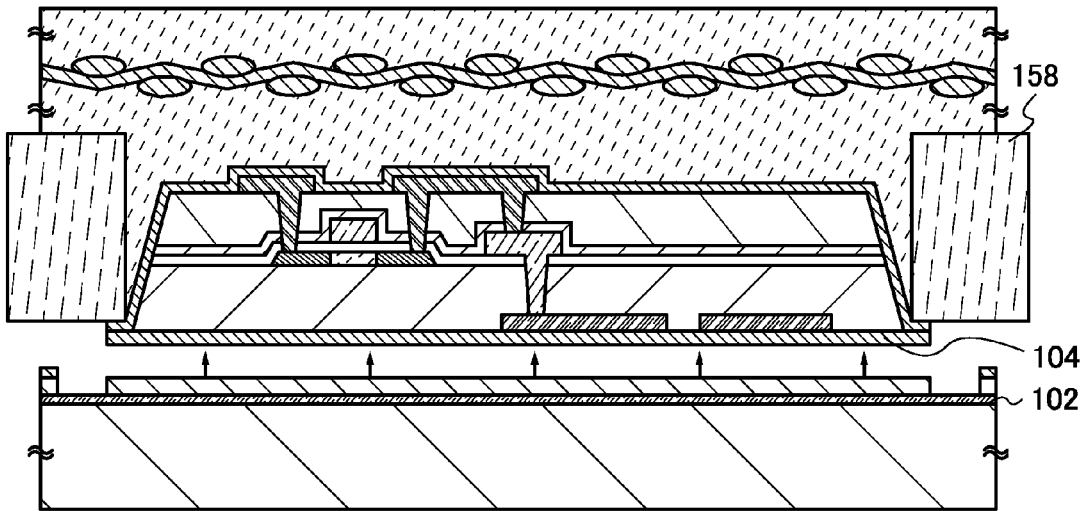

Next, by using the depressed portion 128 as a trigger, the element formation layer 124 is separated from the substrate 100 at the interface between the release layer 102 and the insulating layer 104 serving as a buffer layer (see FIG. 11C). After the separation, the separate film 158 is preferably removed.

Figure 12A:
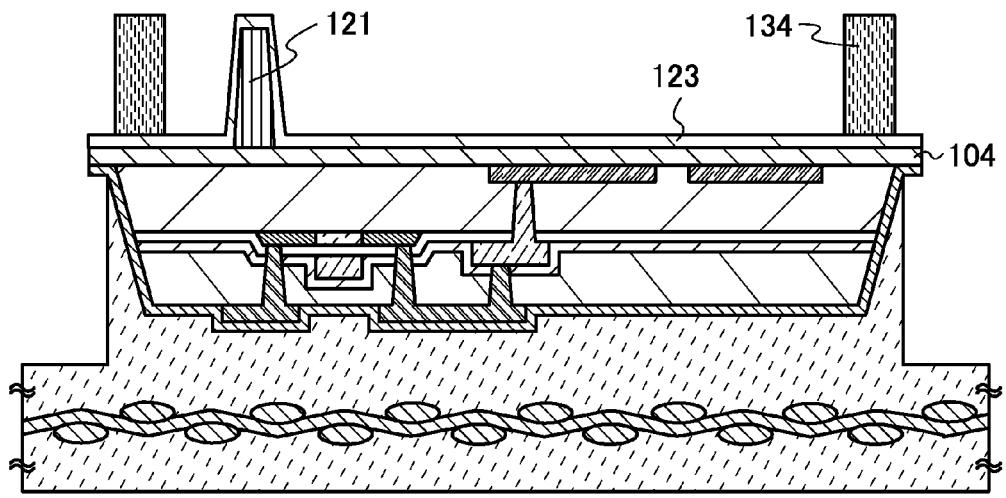
FIGS. 12A and 12B are cross-sectional views illustrating a manufacturing process of a liquid crystal display device of the present invention.

Next, a spacer 121 is formed over the insulating layer 104 as in Embodiment 4. Then, an alignment film 123 is formed over the surface of the spacer 121 and the insulating layer 104. Then, a seal member 134 is formed over the alignment film 123 (see FIG. 12A).

Figure 12B:
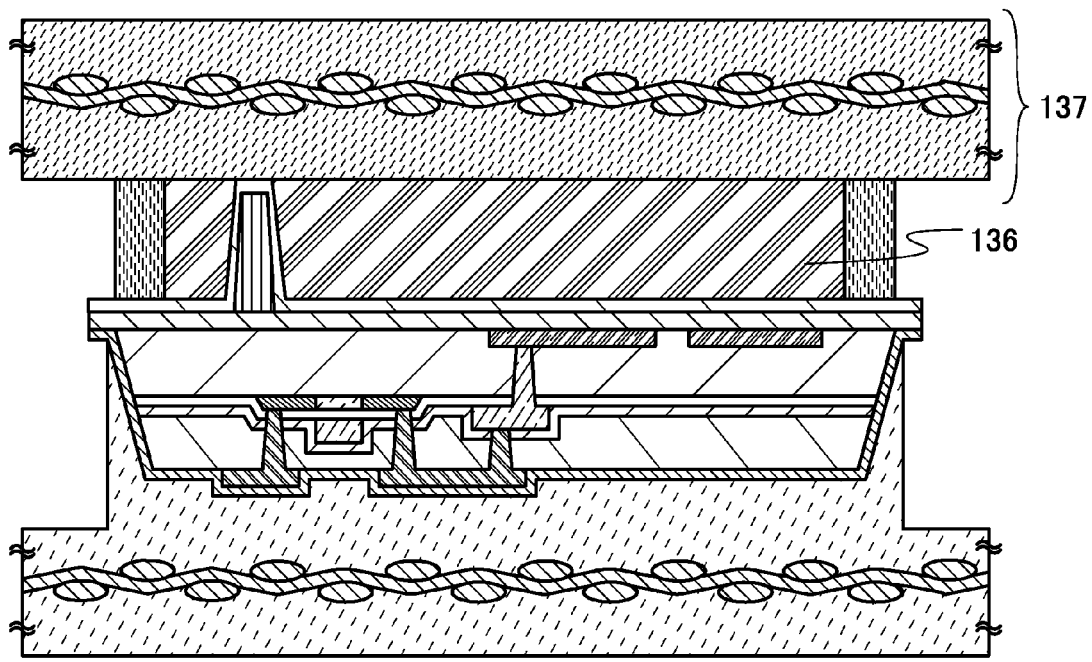

Next, a liquid crystal is discharged to the inside of the seal member 134 as in Embodiment 4. After that, a second structure body is provided over the seal member 134. A second structure body 137 is attached in a reduced pressure atmosphere and the seal member 134 is cured by UV light irradiation to fix the second structure body 137 (see FIG. 12B). By this fixing step, a liquid crystal layer 136 surrounded by the first structure body 132, the second structure body 137, and the seal member 134 is formed.

Figure 13:
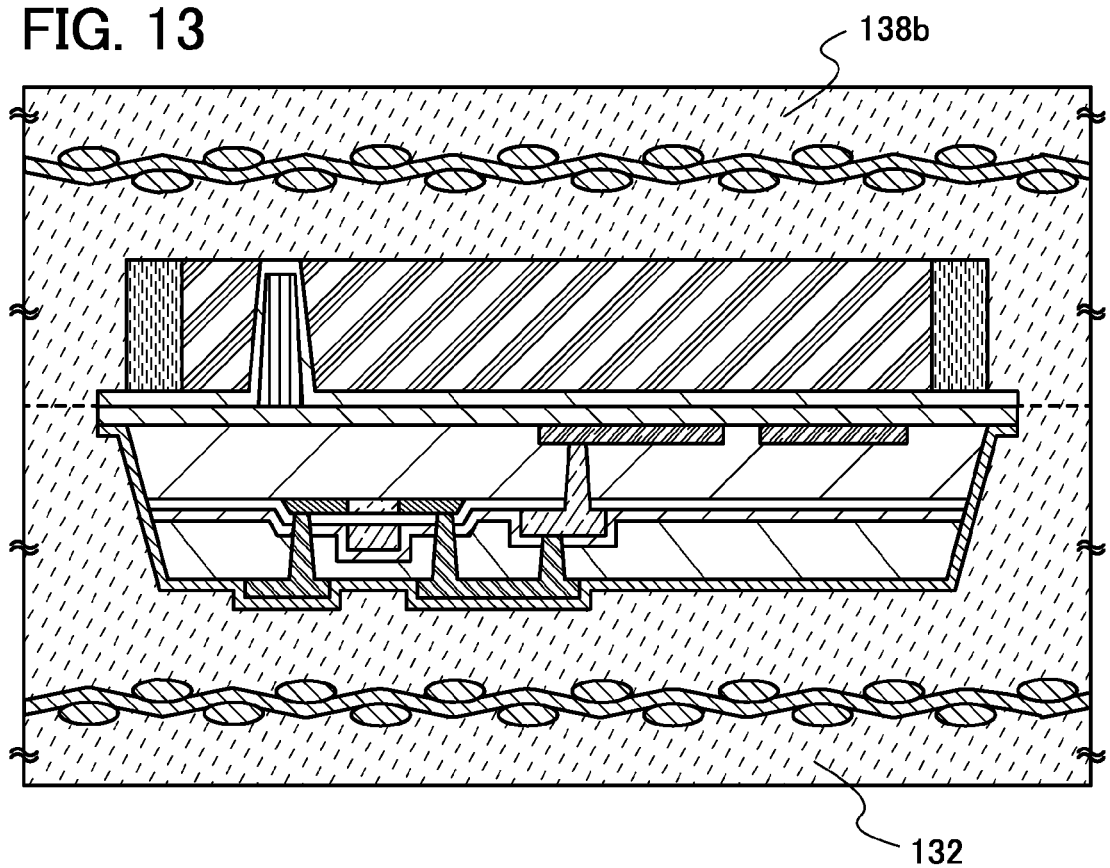
FIG. 13 is a cross-sectional view illustrating a manufacturing process of a liquid crystal display device of the present invention.

Next, the first structure body 132 and the second structure body 137 are heated and subjected to pressure bonding to form a second structure body 138 in which the organic resin is cured. In addition, when the organic resin of the second structure body 138 is cured, the first structure body 132 is fixed to the second structure body 138; thus, a liquid crystal display device having good adhesion between the first structure body and the second structure body is manufactured (see FIG. 13).

Through the above process, a flexible and highly reliable liquid crystal display device which is not easily damaged by external pressure can be manufactured with a smaller number of steps than in Embodiment 4.

(Embodiment 6)

In this embodiment, a method for manufacturing a pixel portion of a liquid crystal display device including a thin film transistor that is formed by a process at a relatively low temperature (lower than 500° C.) (such as a thin film transistor with an amorphous semiconductor layer, a microcrystalline semiconductor layer, or the like, a thin film transistor with an organic semiconductor layer, or a thin film transistor with an oxide semiconductor) is hereinafter described.

Figure 14A:
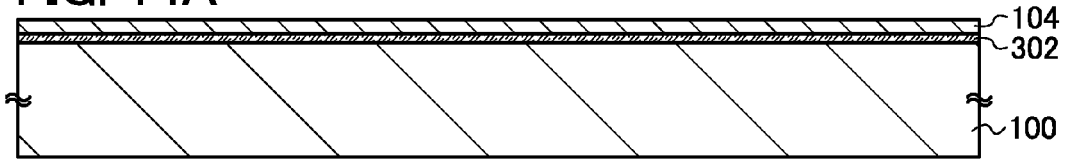
FIGS. 14A to 14E are cross-sectional views illustrating a manufacturing process of a liquid crystal display device of the present invention.

A release layer 302 is formed over a surface of a substrate 100, and then, an insulating layer 104 is formed (see FIG. 14A). The release layer 302 and the insulating layer 104 can be formed successively. When formed successively, the layers are not exposed to the air and thus mixture of an impurity can be prevented.

Note that although a case in which the release layer 302 is provided over an entire area of the substrate 100 is described in this embodiment, the release layer 302 may be selectively removed after being provided over an entire area of the substrate 100, such that a release layer is provided only in a region where needed. In addition, although the release layer 302 is formed in contact with the substrate 100, an insulating layer such as a silicon oxide layer, a silicon oxynitride layer, a silicon nitride layer, or a silicon nitride oxide layer may be formed in contact with the substrate 100, and the release layer 302 may be formed in contact with the insulating layer, if necessary.

The release layer 302 is formed having a single-layer structure or a stacked-layer structure of a layer with a thickness of 30 nm to 200 nm, which is formed using molybdenum (Mo), an alloy material containing molybdenum as its main component, or a compound material containing the element as its main component by a sputtering method, a plasma CVD method, a coating method, a printing method, or the like.

When the release layer 302 has a single-layer structure, a layer containing molybdenum or a mixture including molybdenum is preferably formed. Alternatively, a layer containing oxide or oxynitride of molybdenum or a layer containing oxide or oxynitride of a mixture including molybdenum is formed. Note that a mixture including molybdenum refers to an alloy material containing molybdenum as its main component or a compound material containing the element as its main component. An example includes, but is not limited to, an alloy of tungsten and molybdenum. It may be any material that contains molybdenum as its main component.

When the release layer 302 has a stacked-layer structure, it is preferable that a metal layer be formed as a first layer and a metal oxide layer be formed as a second layer. Typically, as the first-layer metal layer, a layer containing molybdenum or a mixture including molybdenum is formed. As the second layer, a layer containing oxide, nitride, oxynitride, or nitride oxide of molybdenum or a layer containing oxide, nitride, oxynitride, or nitride oxide of a mixture including molybdenum is formed.

When the release layer 302 has a stacked-layer structure in which a metal layer is formed as a first layer and a metal oxide layer is formed as a second layer, the stacked-layer structure may be formed as follows: a layer containing molybdenum is formed as the metal layer, and an insulating layer made of oxide is formed thereover, whereby a layer containing oxide of molybdenum is formed as the metal oxide layer at the interface between the layer containing molybdenum and the insulating layer. Moreover, the metal oxide layer may be formed in such a manner that the surface of the metal layer is subjected to thermal oxidation treatment, oxygen plasma treatment, treatment with a solution having strong oxidizability, such as ozone water, or the like.

Figure 14B:
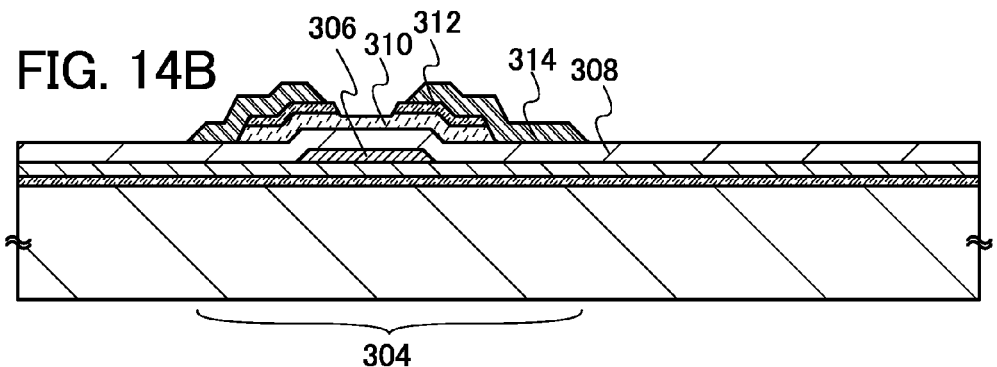

Next, a thin film transistor 304 is formed over the insulating layer 104 (see FIG. 14B). In this embodiment, as the thin film transistor, an inverted staggered thin film transistor having a channel formation region that is formed using an amorphous semiconductor, a microcrystalline semiconductor, an organic semiconductor, or an oxide semiconductor is described.

The thin film transistor 304 has at least a gate electrode 306, a gate insulating layer 308, and a semiconductor layer 310. Over the semiconductor layer 310, impurity semiconductor layers 312 serving as a source region and a drain region may be formed. In addition, wirings 314 are formed in contact with the impurity semiconductor layers 312.

The gate electrode 306 can be formed having a single-layer structure or a stacked-layer structure using a metal material such as chromium, copper, neodymium, or scandium or an alloy material containing any of these metal materials as its main component, as well as the metal given as an example for the gate electrode 112 in Embodiment 4. Alternatively, a semiconductor layer typified by polycrystalline silicon doped with an impurity element such as phosphorus or an AgPdCu alloy may be used. Alternatively, a conductive oxide or a composite oxide formed from indium, gallium, aluminum, zinc, or tin may be used. For example, a transparent gate electrode may be formed using indium tin oxide (ITO).

The gate electrode 306 can be formed by forming a conductive layer over the insulating layer 104 by a sputtering method or a vacuum evaporation method using the aforementioned material, forming a mask over the conductive layer by a photolithography method, an ink-jet method, or the like, and etching the conductive layer using the mask.

Alternatively, the gate electrode 306 can be formed by discharging a conductive nanopaste of silver, gold, copper, or the like onto the substrate by an ink-jet method and baking the conductive nanopaste. Note that in order to improve the adhesion between the gate electrode 306 and the insulating layer 104, a nitride layer of the aforementioned metal material may be provided between the insulating layer 104 and the gate electrode 306. In this embodiment, the gate electrode 306 is formed by forming a conductive layer over the insulating layer 104 and etching the conductive layer using a resist mask that is formed using a photomask.

Note that an end portion of the gate electrode 306 is preferably tapered in order to prevent disconnection at a portion with a difference in height, for a semiconductor layer and wirings are formed over the gate electrode 306 in later steps. To make the end portion of the gate electrode 306 tapered, etching may be performed with a resist mask receding. For example, by mixing an oxygen gas into an etching gas, etching can be performed with a resist mask receding.

In the step of forming the gate electrode 306, a gate wiring (a scan line) can also be formed at the same time. Note that a scan line refers to a wiring for selecting a pixel, and a capacitor wiring refers to a wiring connected to one electrode of a storage capacitor in a pixel. Note that the present invention is not limited thereto, and one or both of a gate wiring and a capacitor wiring may be formed separately from the gate electrode 306.

The gate insulating layer 308 can be formed having a single-layer structure or a stacked-layer structure using silicon oxide, silicon nitride, silicon oxynitride, silicon nitride oxide, hafnium oxide, hafnium aluminum oxide, hafnium silicon oxynitride, or yttria by a CVD method, a sputtering method, a pulsed laser deposition (PLD) method, or the like. When the gate insulating layer 308 is formed at a high frequency (1 GHz or more) using a microwave plasma CVD apparatus, the dielectric strength between the gate electrode and the drain and source electrodes can be improved, so that a highly reliable thin film transistor can be obtained.

The semiconductor layer 310 is a layer formed using a non-single-crystal semiconductor with a thickness of 10 nm to 200 nm, preferably, 20 nm to 150 nm. As a non-single-crystal semiconductor layer, an amorphous semiconductor layer, a microcrystalline semiconductor layer, or the like can be given. As a semiconductor, silicon, germanium, a compound of silicon and germanium, or the like can be given. A feature of this embodiment is to form the semiconductor layer 310 directly over the gate insulating layer 308 at a low temperature lower than 500° C. without performing laser beam irradiation, heat treatment, or the like. With the use of a layer containing at least molybdenum as the release layer 302, a separation process can be easily carried out even when a thin film transistor is formed at a low temperature lower than 500° C.

Note that the semiconductor layer 310 may have a structure in which a microcrystalline semiconductor layer is formed in contact with the gate insulating layer and an amorphous semiconductor layer is stacked thereover. The semiconductor layer 310 may alternatively be formed with a non-single-crystal semiconductor which contains nitrogen or an NH group and includes crystal grains having an inverted conical or pyramidal shape and/or microcrystal grains having a grain size of 1 nm to 10 nm, preferably, 1 nm to 5 nm, in an amorphous structure.

As the semiconductor layer 310, an impurity element imparting one conductivity type, such as phosphorus imparting n-type conductivity, may be added to an amorphous semiconductor or a microcrystalline semiconductor. Alternatively, as the semiconductor layer 310, a metal element which reacts with silicon to form silicide, such as titanium, zirconium, hafnium, vanadium, niobium, tantalum, chromium, molybdenum, tungsten, cobalt, nickel, or platinum, may be added to an amorphous semiconductor or a microcrystalline semiconductor. By addition of an impurity element imparting one conductivity type, a metal element which reacts with silicon to form silicide, or the like, the carrier mobility of a semiconductor layer can be increased. Thus, the field-effect mobility of a thin film transistor having the semiconductor layer as a channel formation region can be increased.

Alternatively, the semiconductor layer 310 can be formed using a metal oxide or an organic semiconductor material. Typical examples of metal oxides include zinc oxide, oxide of zinc gallium indium (indium-gallium-zinc oxide), and the like.

The impurity semiconductor layers 312 serving as a source region and a drain region may be formed in contact with the semiconductor layer 310. The impurity semiconductor layers 312 may be formed using a semiconductor layer to which an impurity element imparting one conductivity type is added. In the case of forming an n-channel thin film transistor, phosphorus may be used as the impurity element imparting one conductivity type; typically, the impurity semiconductor layers 312 are formed using amorphous silicon or microcrystalline silicon which contains phosphorus. In the case of forming a p-channel thin film transistor, boron may be used as the impurity element imparting one conductivity type; typically, the impurity semiconductor layers 312 are formed using amorphous silicon or microcrystalline silicon which contains boron.

When including an impurity element imparting one conductivity type, phosphorus or boron in this embodiment, at a concentration of $1\times10^{19}$ cm$^{-3}$ to $1\times10^{21}$ cm$^{-3}$, the impurity semiconductor layers 312 can make ohmic contact with the wirings 314 and function as a source region and a drain region.

The impurity semiconductor layers 312 serving as a source region and a drain region are formed to have a thickness of 10 nm to 100 nm, preferably, 30 nm to 50 nm. By decreasing the thickness of the impurity semiconductor layers 312, throughput can be improved.

The wirings 314 can be formed in a manner similar to the wirings 118 described in Embodiment 4. For example, the light-transmitting materials listed for the pixel electrode 122a described in Embodiment 4 can be used as appropriate.

Figure 14C:
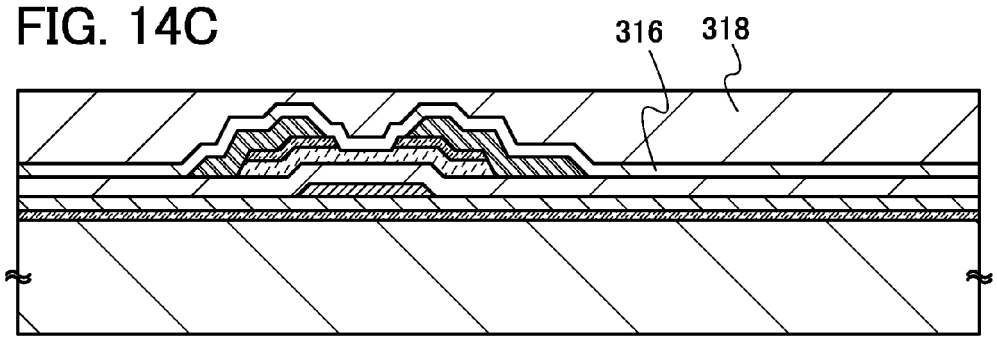

The thin film transistor according to this embodiment can be applied to a switching transistor in a pixel of a display device typified by a liquid crystal display device, like the thin film transistors described in Embodiments 4 and 5. Thus, an insulating layer 316 and an insulating layer 318 are formed to cover the thin film transistor (see FIG. 14C).

Next, an opening portion 323 is formed to reach the source electrode or the drain electrode that is formed by the wiring 314. Note that when the opening portion 323 is formed, the insulating layer 316 and/or the insulating layer 318 provided over an edge portion of the substrate 100 are removed by etching or the like. In this embodiment, it is preferable that at least the insulating layer 318 be removed such that the insulating layer 316 is exposed. Note that in the case of forming a plurality of liquid crystal display devices from one substrate, at least the insulating layer 318 is preferably etched at an edge portion of each region where a liquid crystal display device is to be formed, whereby the elements of each liquid crystal display device are separated from those of the other liquid crystal display devices.

Figure 14D:
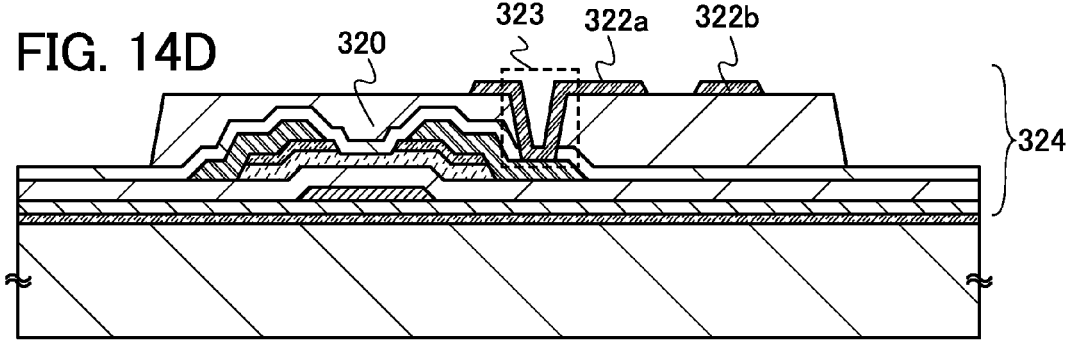

Next, a pixel electrode 322a and a common electrode 322b are provided over the insulating layers 316 and 318 such that the pixel electrode 322a is connected to the source electrode or the drain electrode via the opening portion 323. In this manner, a switching thin film transistor in a pixel of a display device illustrated in FIG. 14D can be manufactured.

Note that the insulating layer 316 can be formed in a manner similar to the gate insulating layer 308. In addition, the insulating layer 316 is preferably formed using silicon nitride that is dense so that the entry of an impurity element which may be a contaminant, such as an organic substance, a metal, or moisture floating in the air, can be prevented. The insulating layer 318 can be formed in a manner similar to the insulating layer 116 described in Embodiment 4. The pixel electrode 322a and the common electrode 322b can be formed in a manner similar to the pixel electrode 122a and the common electrode 122b described in Embodiment 4.

Figure 14E:
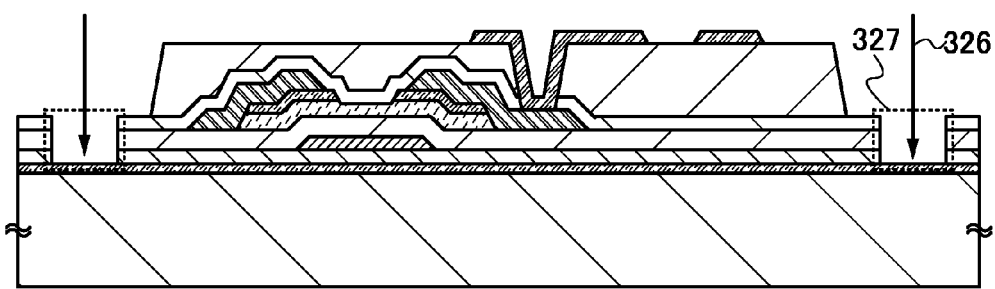

Next, in order to easily separate an element formation layer 324 including the thin film transistor 304 and the like from the substrate 100, a depressed portion 327 is preferably formed by laser beam irradiation before the element formation layer 324 is separated from the substrate 100. In this embodiment, the depressed portion 327 is formed by irradiating the insulating layer 316, the gate insulating layer 308, and the insulating layer 104 that are exposed at the edge portion with a laser beam 326 (see FIG. 14E).

Figure 15A:
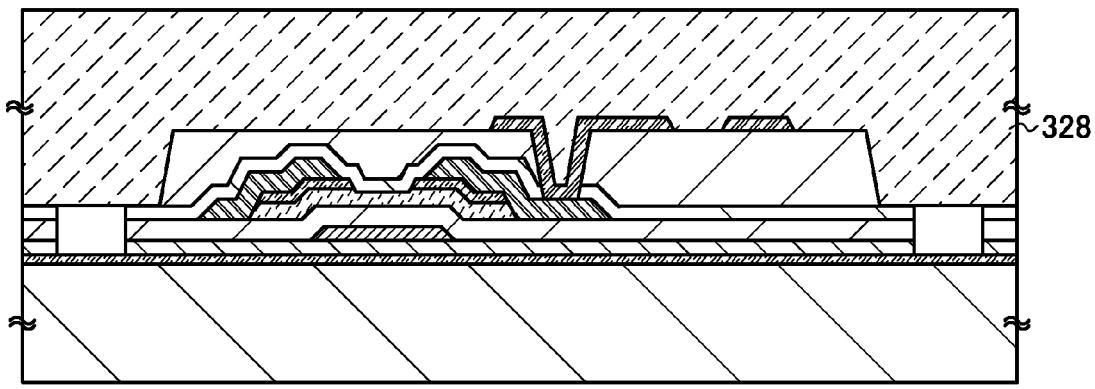
FIGS. 15A to 15C are cross-sectional views illustrating a manufacturing process of a liquid crystal display device of the present invention.

Next, as illustrated in FIG. 15A, an adhesive sheet 328 is attached to the element formation layer 324. As the adhesive sheet 328, a sheet that can be removed with light or heat is employed.

If the adhesive sheet 328 is attached, separation at the release layer 302 can be easily performed. In addition, stress to be applied to the element formation layer 324 before and after separation can be reduced, and damage to the thin film transistor 304 can be suppressed.

Figure 15B:
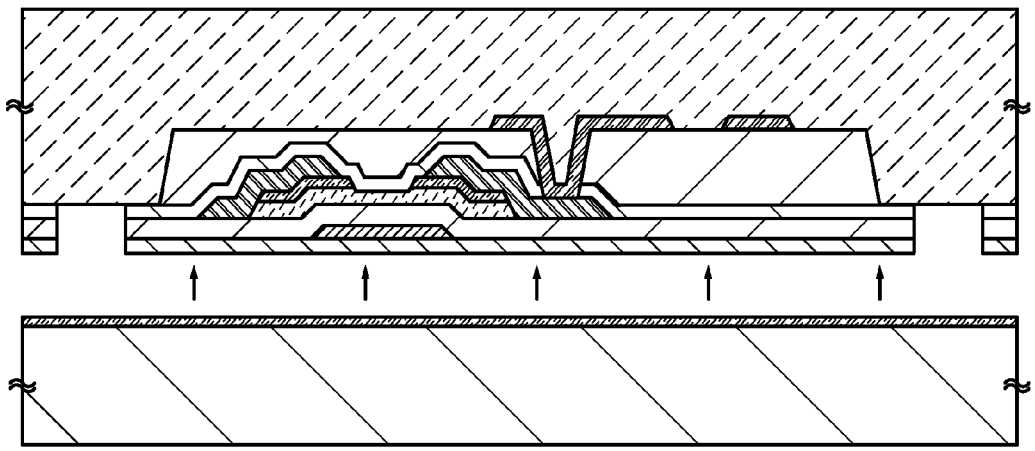

Next, by using the depressed portion 327 as a trigger, the element formation layer 324 is separated from the substrate 100 at the interface between the release layer 302 and the insulating layer 104 serving as a buffer layer (see FIG. 15B). The separation may be performed by, for example, applying mechanical force (by separation with a human hand or a gripper, by separation with a rotating roller, or the like).

Alternatively, the element formation layer 324 may be separated from the release layer 302 by dropping a liquid into the depressed portion 327 and infiltrating the liquid into the interface between the release layer 302 and the insulating layer 104. Still alternatively, the element formation layer 324 can be separated from a substrate having an insulating surface by a method in which a fluoride gas such as $NF_3$, $BrF_3$, or $ClF_3$ is introduced to the depressed portion 327 and the release layer is removed by etching with the use of the fluoride gas.

In this embodiment, a method is employed in which a metal oxide layer is formed as the release layer 302 in contact with the insulating layer 104 and the element formation layer 324 is separated by a physical means. However, the present invention is not limited to this method. A method may be employed in which a light-transmitting substrate is used as the substrate 100, an amorphous silicon layer containing hydrogen is used as the release layer 302, the release layer 302 is irradiated with a laser beam from the substrate 100 side to vaporize hydrogen contained in the amorphous silicon layer so that separation occurs between the substrate 100 and the release layer 302.

Alternatively, a method in which the substrate 100 is removed by being mechanically polished or a method in which the substrate 100 is removed by being dissolved using a solution such as HF can be employed. In this case, the release layer 302 is not necessarily used.

Figure 15C:
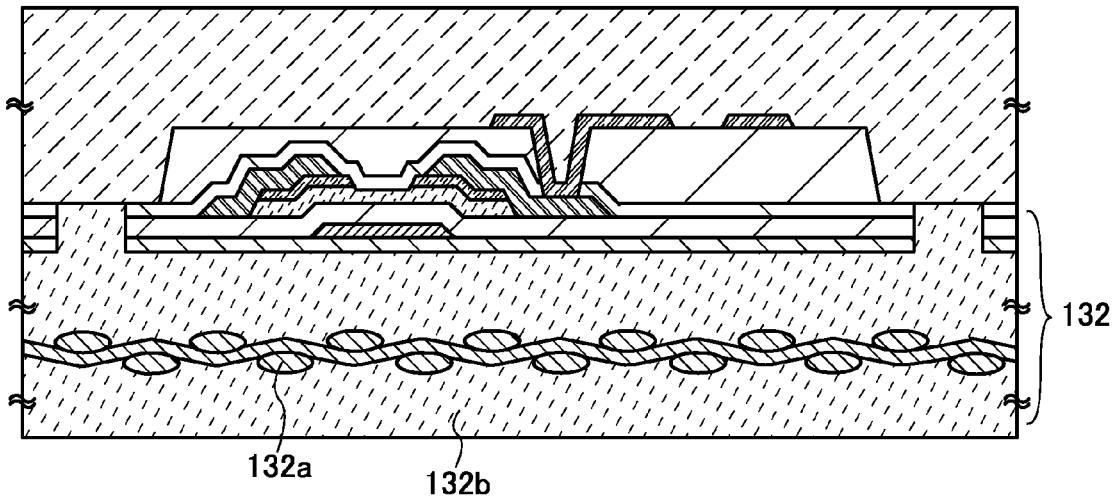

Next, a structure body in which a fibrous body is impregnated with an organic resin is provided over a separation surface of the element formation layer 324 after separation (over a surface of the insulating layer 104 which is exposed by separation), and then, the structure body is heated and subjected to pressure bonding so that the organic resin of the structure body is plasticized or cured. Thus, the element formation layer 324 is provided with a first structure body 132 in which a fibrous body 132a is impregnated with an organic resin 132b (see FIG. 15C). The structure body in which the fibrous body is impregnated with the organic resin can be fixed under an atmospheric pressure or under a reduced pressure. Note that in the case where the organic resin with which the fibrous body is impregnated in the structure body is a plastic organic resin, the structure body in which the fibrous body is impregnated with the organic resin is heated and subjected to pressure bonding and then cooled to room temperature; thus, the organic resin is cured.

Figure 16A:
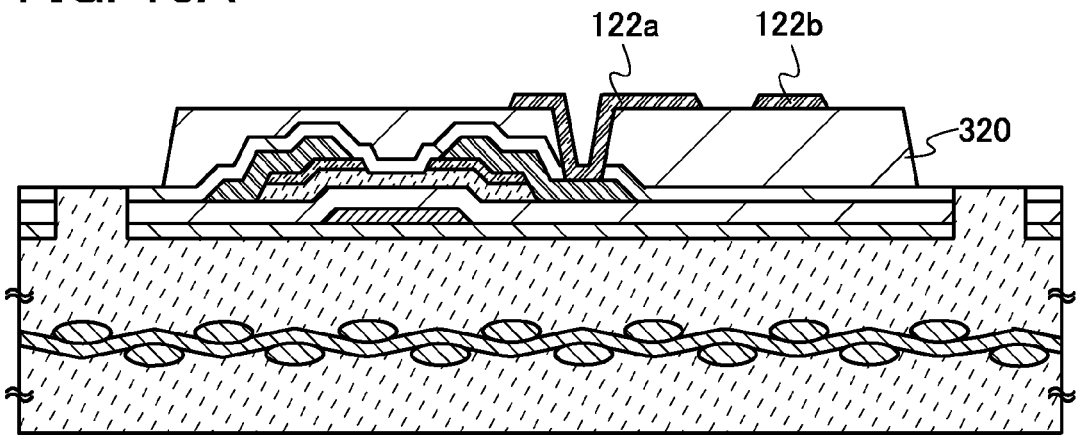
FIGS. 16A and 16B are cross-sectional views illustrating a manufacturing process of a liquid crystal display device of the present invention.

Next, the adhesive sheet 328 is removed from the first structure body 132 (see FIG. 16A).

Figure 16B:
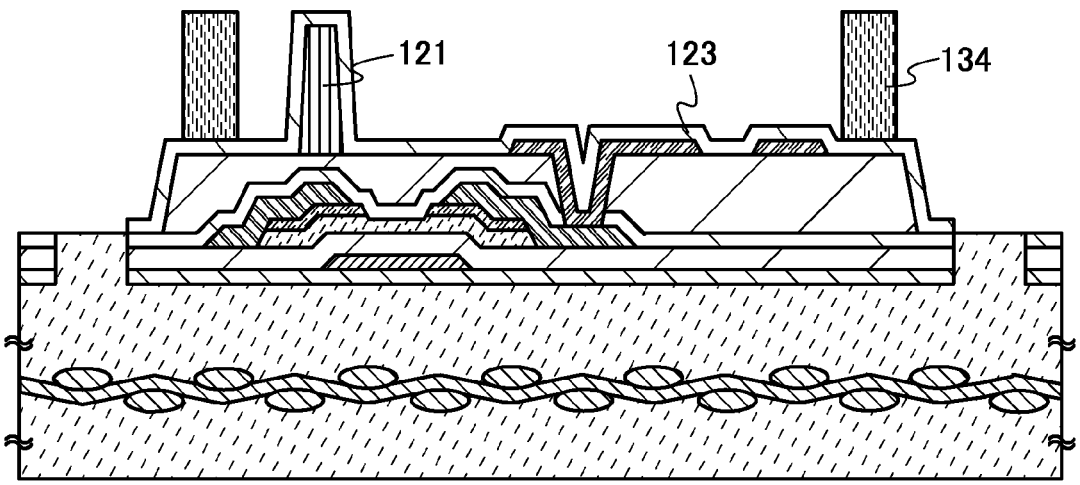

Next, a spacer 121 is formed over an insulating layer 320 as in Embodiment 4. Then, an alignment film 123 is formed over the surface of the spacer 121, the pixel electrode 322a, and the common electrode 322b. Then, a seal member 134 is formed over the alignment film 123 (see FIG. 16B).

Figure 17A:
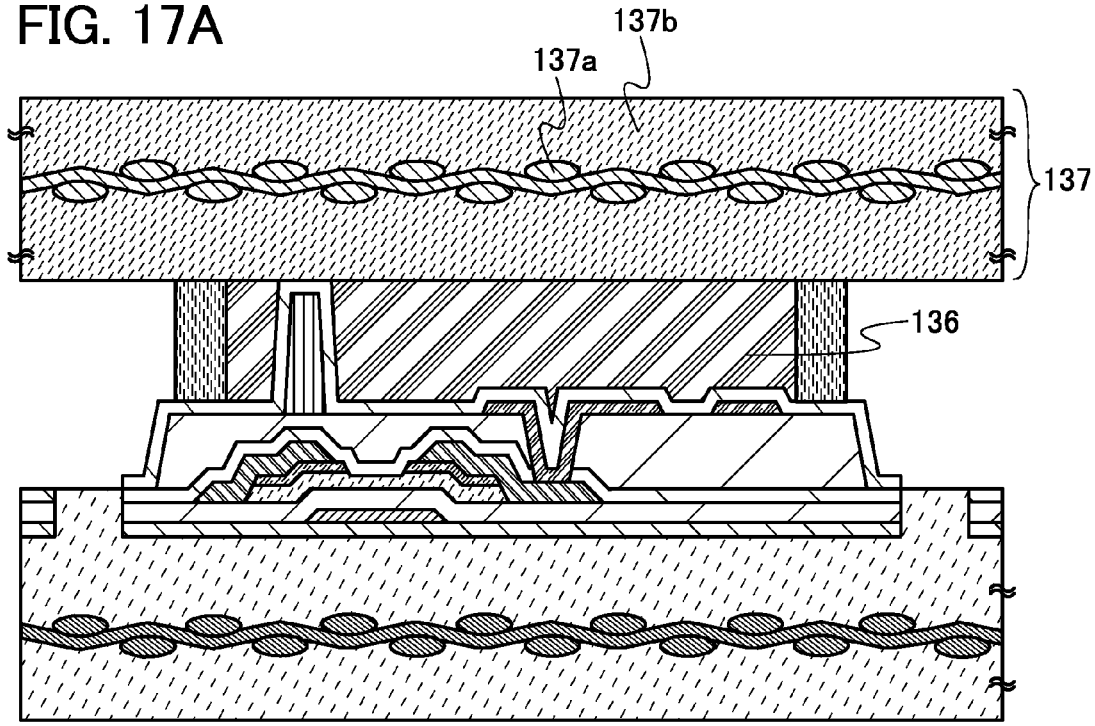
FIGS. 17A and 17B are cross-sectional views illustrating a manufacturing process of a liquid crystal display device of the present invention.
Figure 17B:
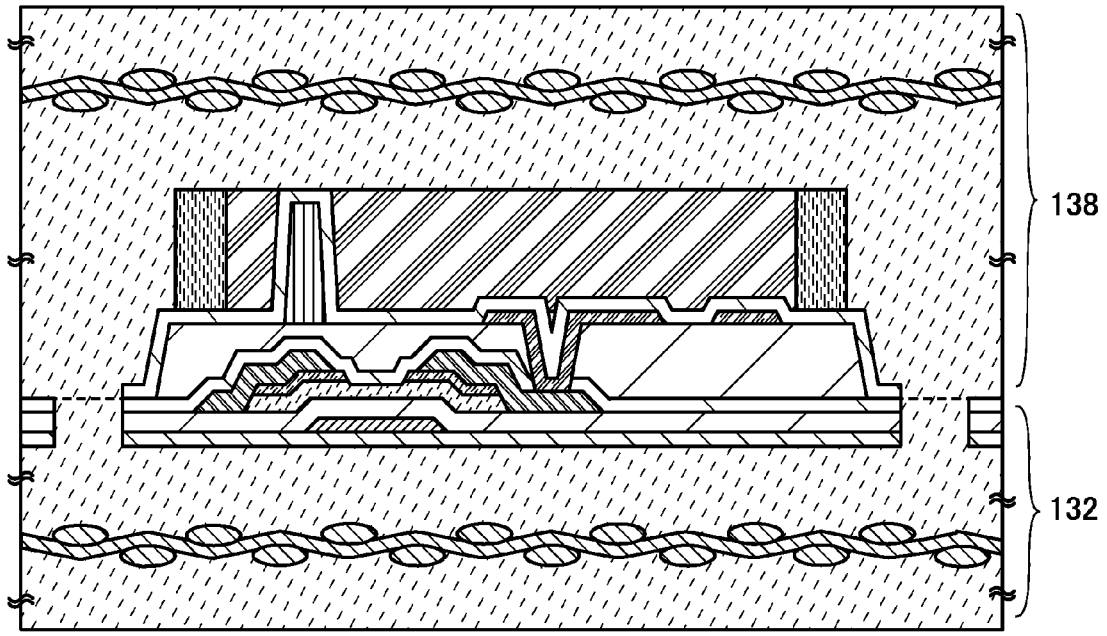

Next, a liquid crystal material is discharged to the inside of the seal member 134 as in Embodiment 4. After that, a second structure body 137 is attached in a reduced pressure atmosphere and the seal member 134 is cured by UV light irradiation to fix the second structure body 137 (see FIG. 17A). By this fixing step, a liquid crystal layer 136 surrounded by the first structure body 132, the second structure body 137, and the seal member 134 is formed (see FIG. 17B).

Next, the first structure body 132 and the second structure body 137 are heated and subjected to pressure bonding to form a second structure body 138 in which the organic resin is cured. In addition, when the organic resin of the second structure body 138 is cured, the first structure body 132 is fixed to the second structure body 138; thus, a liquid crystal display device having good adhesion between the first structure body and the second structure body is manufactured.

In this embodiment, Embodiment 4 is applied as a method for forming the element formation layer 324. Instead, Embodiment 5 can also be applied.

In this embodiment, a layer including at least molybdenum is used as a release layer. Thus, an element formation layer including a thin film transistor which cannot be formed directly over a prepreg and is formed by a low-temperature process at lower than 500° C. can be easily separated from the release layer, and an element substrate can be formed by fixing the element formation layer to a prepreg. In addition, a liquid crystal display device can be manufactured by using the element substrate.

(Embodiment 7)

An object of this embodiment is to provide a method for manufacturing a liquid crystal display device with a smaller number of steps, which is hereinafter described. Specifically, a method for manufacturing a pixel portion of a display device which includes a thin film transistor formed using an oxide semiconductor is hereinafter described.

A first structure body 132 in which a fibrous body 132a is impregnated with an organic resin 132b is used as a substrate. Note that in the first structure body 132, the organic resin 132b with which the fibrous body 132a is impregnated is a cured or semi-cured organic resin.

Before a gate electrode 402 is formed over the first structure body 132 which serves as a substrate, an insulating layer 400 which functions as a base layer may be formed between the first structure body 132 and the gate electrode 402. This insulating layer 400 prevents an impurity such as moisture or alkali metal from diffusing into a TFT element and a display device from the first structure body 132 and prevents a decrease in reliability of a semiconductor element formed in an element formation layer, or the like, and may be provided as a blocking layer as appropriate.

The insulating layer 400 is formed using an insulating material such as silicon oxide, silicon nitride, silicon oxynitride, or silicon nitride oxide. For example, when the insulating layer 400 has a two-layer structure, a silicon nitride oxide layer may be formed as the first insulating layer and a silicon oxynitride layer may be formed as the second insulating layer. Alternatively, a silicon nitride layer may be formed as the first insulating layer and a silicon oxide layer may be formed as the second insulating layer.

Figure 18A:
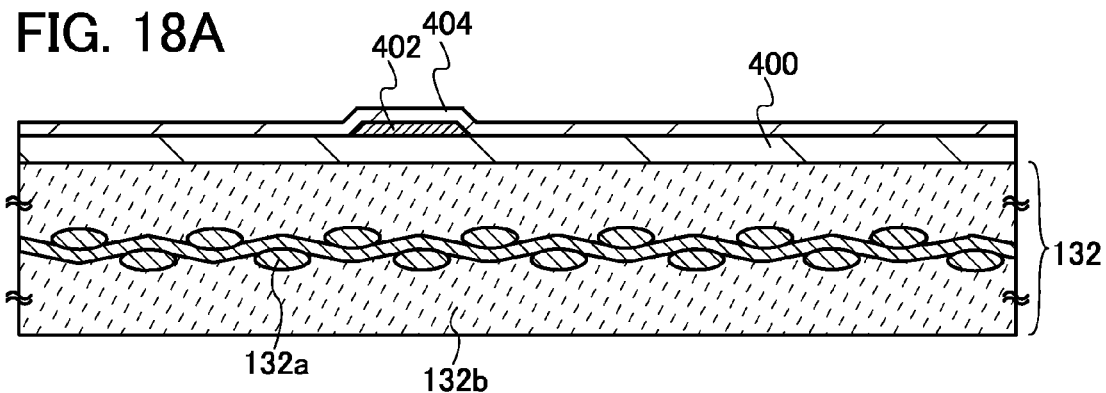
FIGS. 18A to 18D are cross-sectional views illustrating a manufacturing process of a liquid crystal display device of the present invention.

Next, the gate electrode 402 is formed over the first structure body 132, and a gate insulating layer 404 is formed over the gate electrode 402 (see FIG. 18A). The gate electrode 402 and the gate insulating layer 404 are formed using the gate electrode 306 and the gate insulating layer 308 described in Embodiment 6, respectively, as appropriate.

Figure 18B:
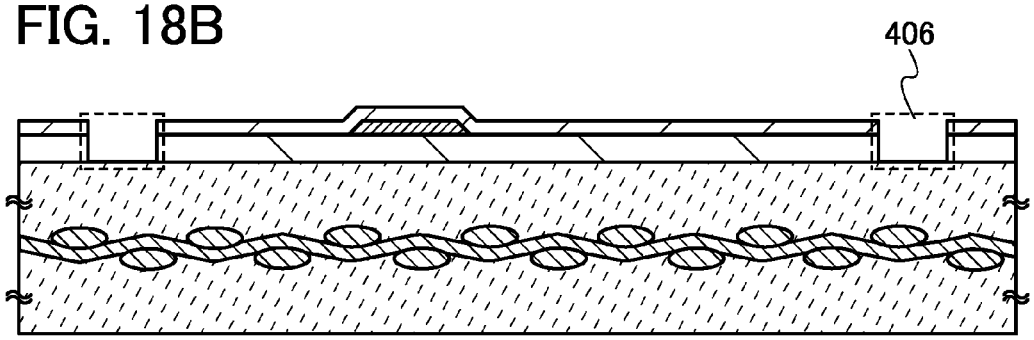

Next, with the use of a resist mask that is formed using a photomask, a contact hole is formed in the gate insulating layer 404 to expose a connection pad of the gate electrode 402. At the same time, a peripheral portion of a liquid crystal display device is removed by dry etching to form a depressed portion 406 as illustrated in FIG. 18B. When the insulating layer 400 which functions as a base layer is provided, the insulating layer 400 as well as the gate insulating layer 404 is processed by dry etching to form the depressed portion 406. By removing an insulating layer and the insulating layer 400 which functions as a base layer in the peripheral portion, thermal fusion of prepregs can be achieved in a later step. For dry etching, a mixed gas of $CHF_3$ is used. However, the present invention is not limited to this example.

A semiconductor layer 408 is formed using an oxide semiconductor layer. For an oxide semiconductor layer, a composite oxide of an element selected from indium, gallium, aluminum, zinc, and tin can be used. As examples thereof, zinc oxide (ZnO), indium oxide containing zinc oxide (IZO), oxide including indium oxide, gallium oxide, and zinc oxide (IGZO), and the like can be given. An oxide semiconductor can be deposited as a film at a temperature lower than the upper temperature limit of a prepreg by sputtering, a pulsed laser deposition (PLD) method, or the like and can thus be formed directly over a prepreg that has a low upper temperature limit.

The semiconductor layer 408 can be deposited by a reactive sputtering method or a pulsed laser deposition (PLD) method. The semiconductor layer may be formed to have a thickness of 10 nm to 200 nm, preferably, 20 nm to 150 nm. It is preferable to control oxygen concentration in a deposition atmosphere because carrier density is increased and characteristics of a thin film transistor are degraded if oxygen vacancies are increased in a film.

Oxide including indium oxide, gallium oxide, and zinc oxide has a high degree of freedom for the relative proportions of the metal elements and functions as a semiconductor over a wide range of mixing ratios. Indium oxide containing zinc oxide of 10 wt. % (IZO), and a material in which indium oxide, gallium oxide, and zinc oxide are mixed together in equimolar amounts (IGZO) can be given as examples.

In this embodiment, a method using IGZO is described as an example of a method of forming the semiconductor layer 408. A semiconductor layer is formed by direct current (DC) sputtering at an output of 500 W using a target which has a diameter of 8 inches and is obtained by sintering an equimolar mixture of indium oxide ($In_2O_3$), gallium oxide ($Ga_2O_3$), and zinc oxide (ZnO). A semiconductor layer with a thickness of 100 nm is formed under conditions where the chamber pressure is 0.4 Pa and the gas flow ratio of $Ar/O_2$ is 10/5 (sccm). It is desired that oxygen partial pressure during deposition be set higher than that under deposition conditions for a transparent conductive layer of indium tin oxide (ITO) or the like so that oxygen vacancies can be reduced.

Figure 18C:
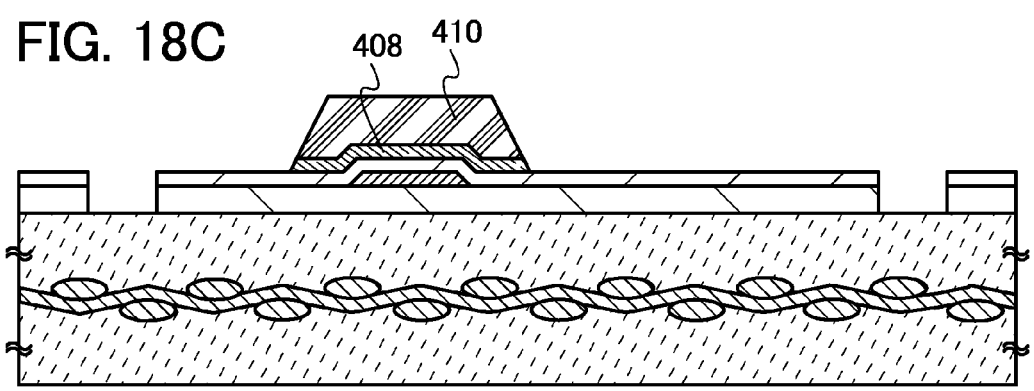

After the semiconductor layer is deposited, with the use of a resist mask which is formed using a photomask, the semiconductor layer is etched using a diluted hydrochloric acid or an organic acid, e.g., a citric acid, to form the semiconductor layer 408 (see FIG. 18C). Then, the photoresist is removed using an organic solvent.

Next, wirings 412 and 414 are formed over the semiconductor layer 408. The wirings 412 and 414 can be formed using a material similar to that of the wirings 314 described in Embodiment 6.

Figure 18D:
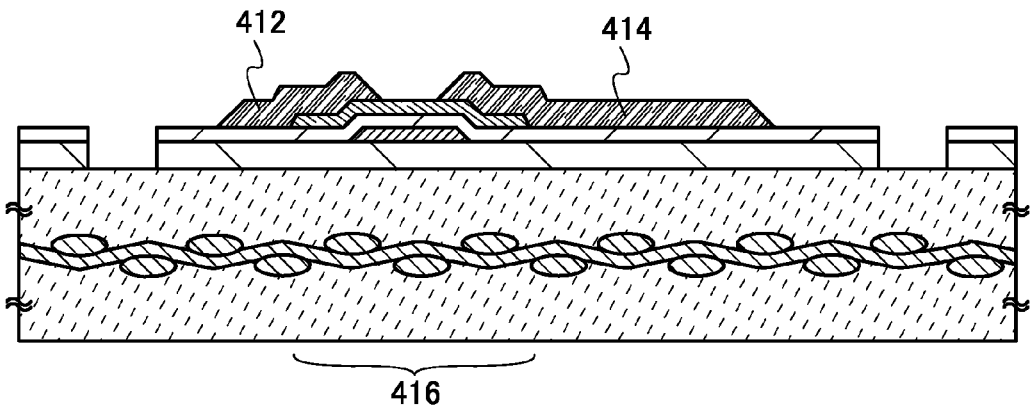

The wirings 412 and 414 are formed such that part of the semiconductor layer 408 is exposed as illustrated in FIG. 18D, by a lift-off method in which after a resist mask is formed over at least the semiconductor layer 408, a conductive layer is formed over the resist mask, the semiconductor layer 408, and the gate insulating layer 404 by a sputtering method or a vacuum evaporation method and then the resist is removed.

Through the above steps, a thin film transistor in which a semiconductor layer is formed using an oxide semiconductor can be manufactured. The thin film transistor according to this embodiment can be applied to a switching thin film transistor in a pixel of a display device typified by a liquid crystal display device, like the thin film transistor described in Embodiment 4.

Next, an insulating layer 418 having opening portions 420 and 422 is formed. The insulating layer 418 can be formed in a manner similar to the insulating layer 316 described in Embodiment 6. When an insulating layer is formed over an entire area of the substrate, the opening portions 420 and 422 can be formed by forming a resist mask by a photolithography method and etching the insulating layer using the mask. Alternatively, the insulating layer 418 having the opening portions 420 and 422 may be formed by a printing method or a droplet discharging method.

Figure 19A:
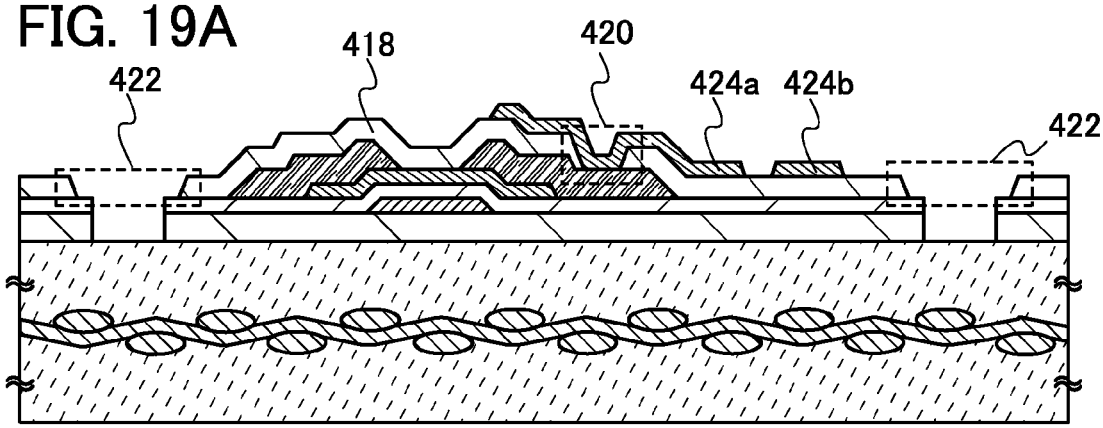
FIGS. 19A and 19B are cross-sectional views illustrating a manufacturing process of a liquid crystal display device of the present invention.

Next, a pixel electrode 424a and a common electrode 424b are provided over the insulating layer 418 such that the pixel electrode 424a is connected to the wiring 414 via the opening portion 420. In this manner, a switching thin film transistor in a pixel of a liquid crystal display device illustrated in FIG. 19A can be manufactured.

Note that as the pixel electrode 424a and the common electrode 424b, the pixel electrode 322a and the common electrode 322b described in Embodiment 6 can be used as appropriate.

Through the above steps, a thin film transistor can be formed over a prepreg. In this embodiment, a thin film transistor can be formed directly over a prepreg without a separation step. Thus, the number of steps to manufacture a flexible element substrate can be reduced.

Figure 19B:
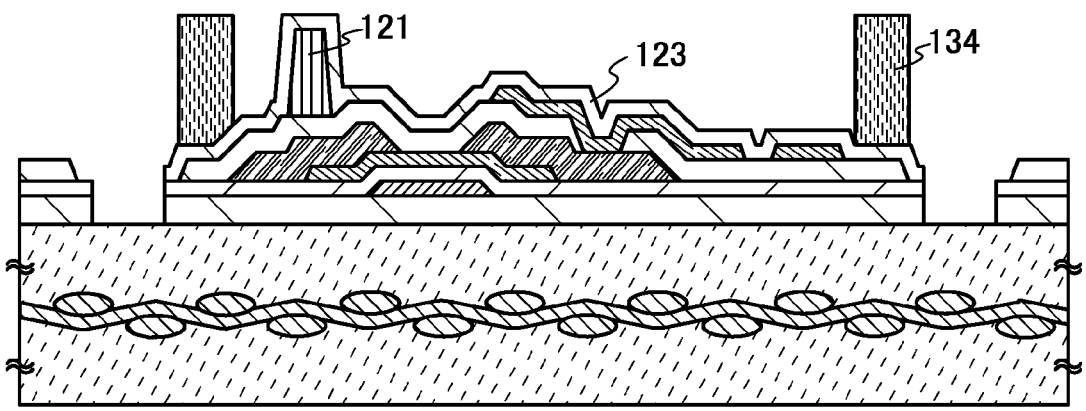

Next, a spacer 121 is formed over the insulating layer 418 as in Embodiment 4. Then, an alignment film 123 is formed over the surface of the spacer 121 and the insulating layer 418. Then, a seal member 134 is formed over the alignment film 123 (see FIG. 19B).

Figure 20A:
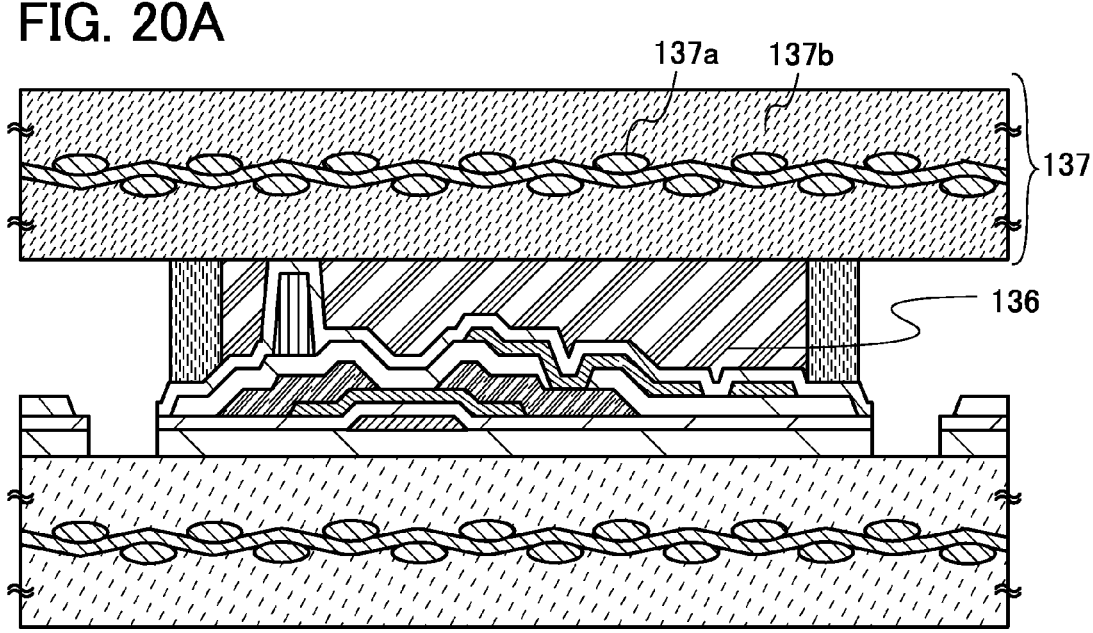
FIGS. 20A and 20B are cross-sectional views illustrating a manufacturing process of a liquid crystal display device of the present invention.

Next, a liquid crystal material is discharged to the inside of the seal member 134 as in Embodiment 4. After that, a second structure body 137 is attached in a reduced pressure atmosphere and the seal member 134 is cured by UV light irradiation to fix the second structure body 137 (see FIG. 20A). By this fixing step, a liquid crystal layer 136 surrounded by the first structure body 132, the second structure body 137, and the seal member 134 is formed.

Figure 20B:
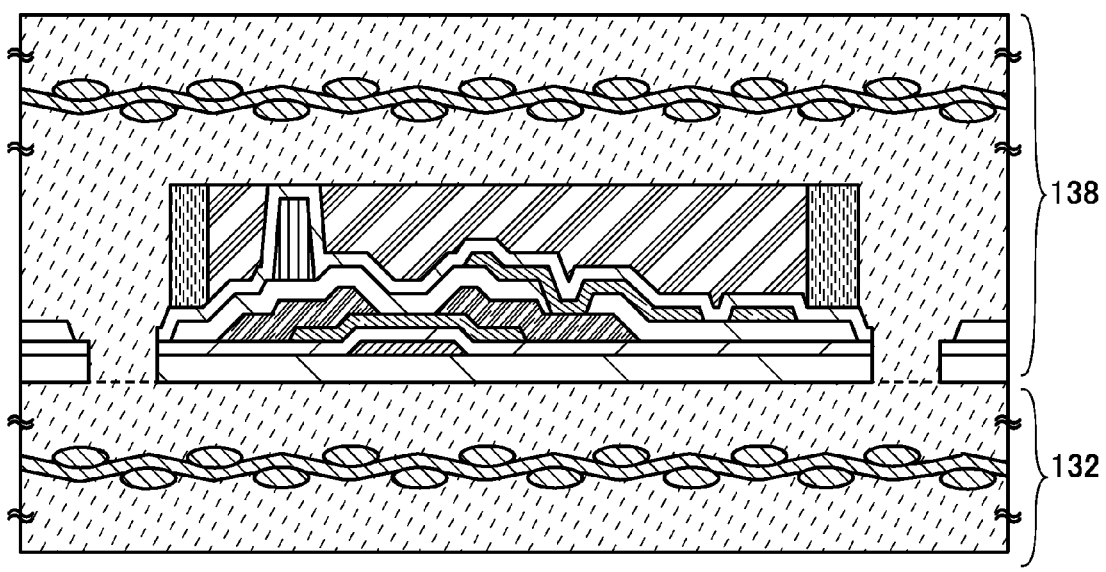

Next, the first structure body 132 and the second structure body 137 are heated and subjected to pressure bonding to form a second structure body 138 in which the organic resin is cured. In addition, when the organic resin of the second structure body 138 is cured, the first structure body 132 is fixed to the second structure body 138; thus, a liquid crystal display device having good adhesion between the first structure body and the second structure body is manufactured (see FIG. 20B).

In this embodiment, a thin film transistor can be formed over a prepreg. Thus, the number of steps to manufacture a flexible element substrate can be reduced. In addition, a liquid crystal display device can be manufactured by using the element substrate.

(Embodiment 8)

In this embodiment, a method for manufacturing the liquid crystal display device described in Embodiment 2 is hereinafter described. Although this embodiment is described with reference to Embodiment 4, the other embodiments can also be applied to this embodiment as appropriate.

Figure 21A:
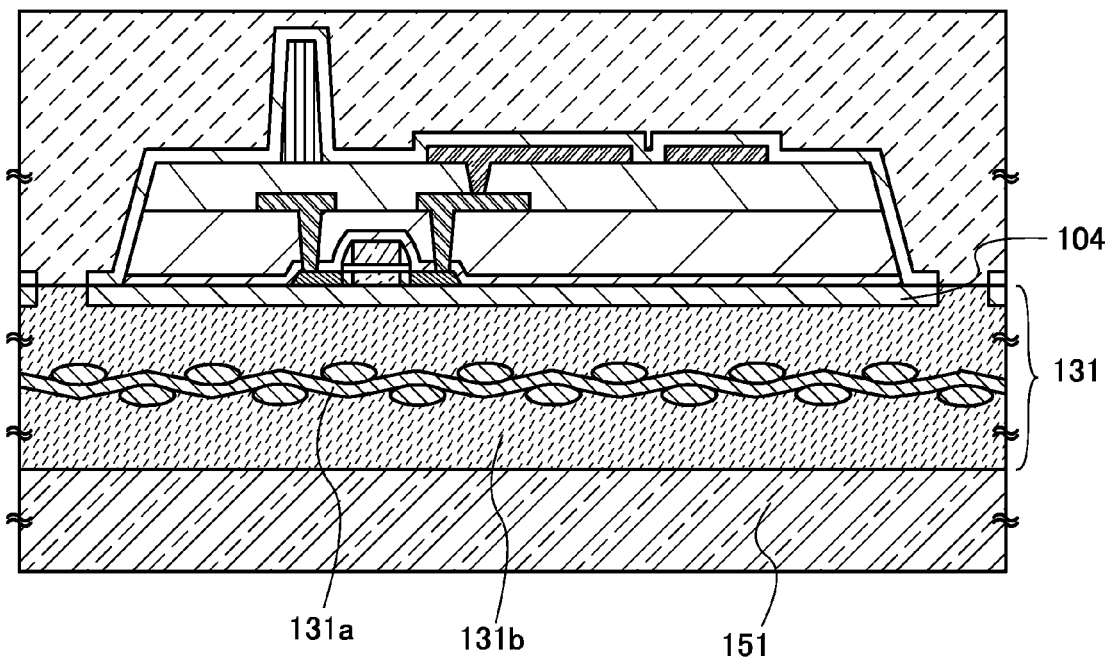
FIGS. 21A and 21B are cross-sectional views illustrating a manufacturing process of a liquid crystal display device of the present invention.
Figure 21B:
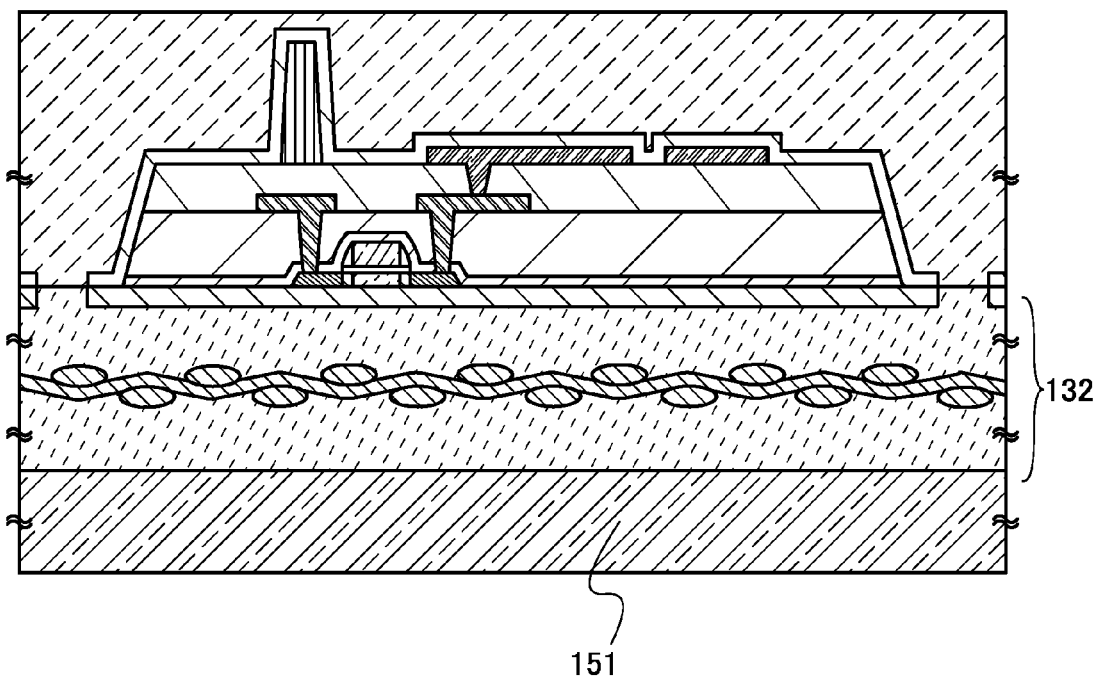

As in Embodiment 4, the steps of FIGS. 6A to 7B are performed. The insulating layer 104 is provided with a first structure body 131 and a first impact relaxation layer 151 (see FIG. 21A). In this embodiment, the first structure body 131 is formed in the following manner: after a fibrous body is impregnated with a varnish in which a matrix resin is diluted with an organic solvent, drying is performed so that the organic solvent is volatilized and the matrix resin is semicured. The resin is cured in a later heating step (see FIG. 21B).

Next, the first structure body 131 is heated and subjected to pressure bonding so that an organic resin 131b included in the first structure body is plasticized or cured. Thus, the first structure body 132 and the first impact relaxation layer 151 are fixed to the insulating layer 104.

Figure 22:
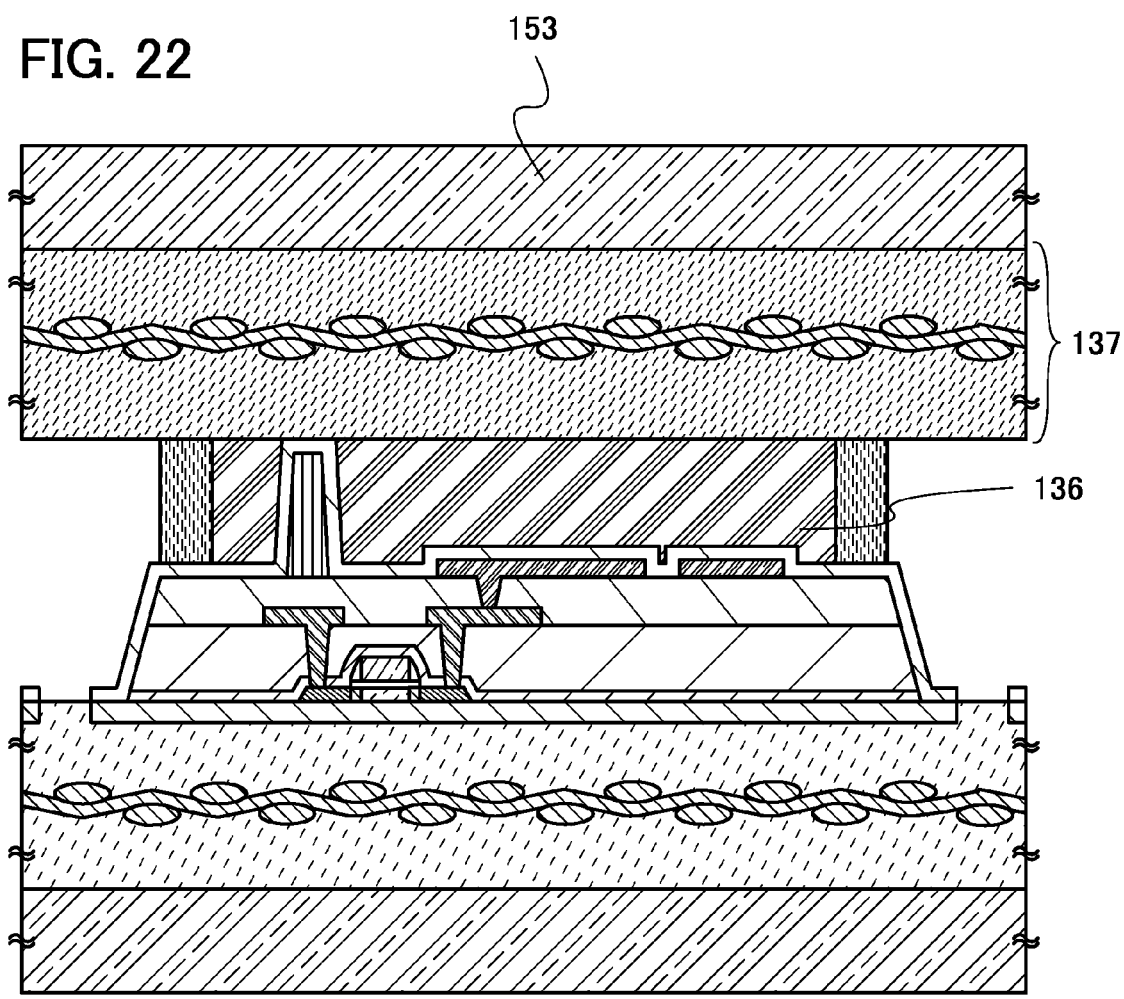
FIG. 22 is a cross-sectional view illustrating a manufacturing process of a liquid crystal display device of the present invention.

Next, after the adhesive film 130 is removed, a seal member 134 is formed as illustrated in FIG. 8A of Embodiment 4. Next, a liquid crystal is discharged to the inside of the seal member 134. After that, a second structure body 137 is provided over the seal member 134, and a second impact relaxation layer 153 is provided over the second structure body 137. The second structure body 137 is attached in a reduced pressure atmosphere and the seal member 134 is cured by UV light irradiation to fix the second structure body 137. By this fixing step, a liquid crystal layer 136 surrounded by the first structure body 132, the second structure body 137, and the seal member 134 is formed (see FIG. 22).

Next, as in Embodiment 4, the first structure body 132 and the second structure body 137 are heated and subjected to pressure bonding to form a second structure body 138 in which the organic resin is cured. In addition, when the organic resin of the second structure body 138 is cured, the first structure body 132 is fixed to the second structure body 138; thus, a liquid crystal display device which has good adhesion between the first structure body and the second structure body and which is not easily damaged by planar pressure or linear pressure as illustrated in FIG. 2 can be manufactured.

(Embodiment 9)

In this embodiment, a method for manufacturing a liquid crystal display device having further better adhesion between a first structure body and a second structure body is hereinafter described. Although this embodiment is described with reference to Embodiment 5, the other embodiments can also be applied to this embodiment as appropriate.

Figure 23A:
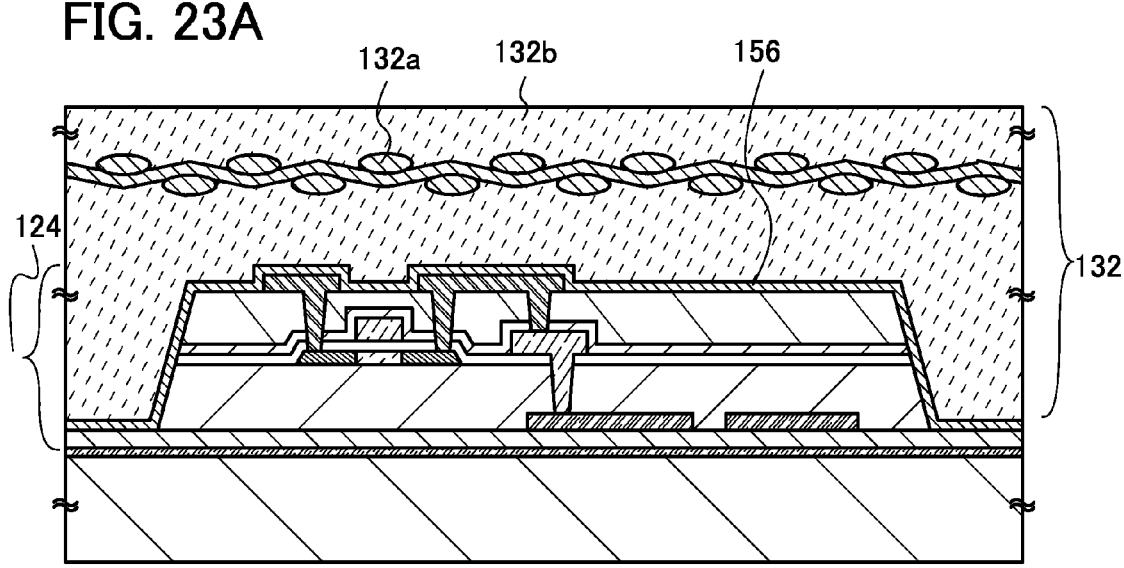
FIGS. 23A and 23B are cross-sectional views illustrating a manufacturing process of a liquid crystal display device of the present invention.

As in Embodiment 5, the steps of FIGS. 10A to 10C are performed, and a first structure body 132 is fixed to the insulating layer 156 as illustrated in FIG. 23A.

Figure 23B:
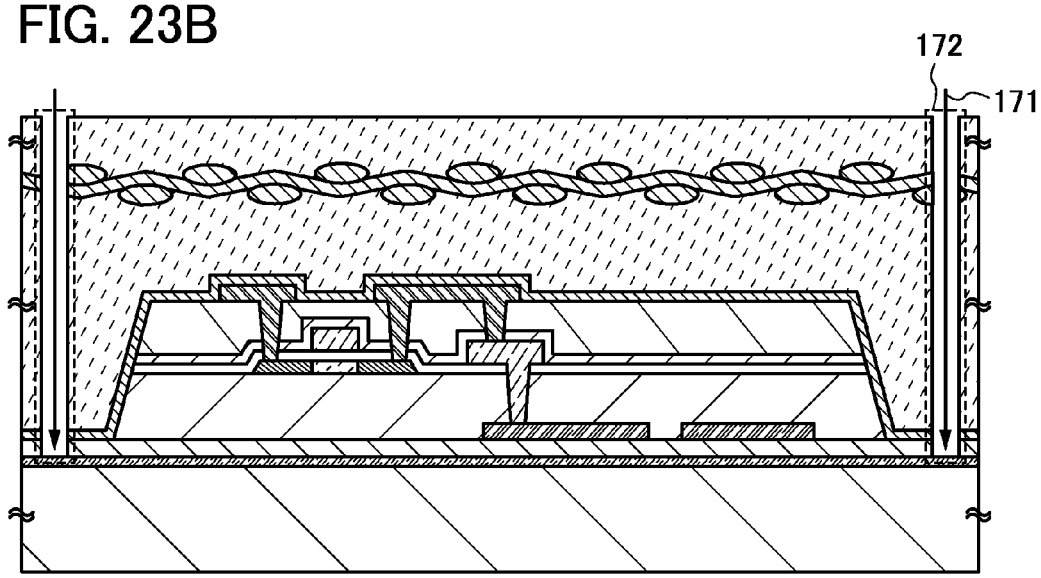

Next, in order to easily separate the element formation layer 124 from the substrate 100, a depressed portion 172 is preferably formed by irradiation with a laser beam 171 before the element formation layer 124 is separated from the substrate 100. In this embodiment, the depressed portion 172 is formed by irradiating the first structure body 132 and the insulating layers 156 and 104 with a laser beam (see FIG. 23B).

Figure 24A:
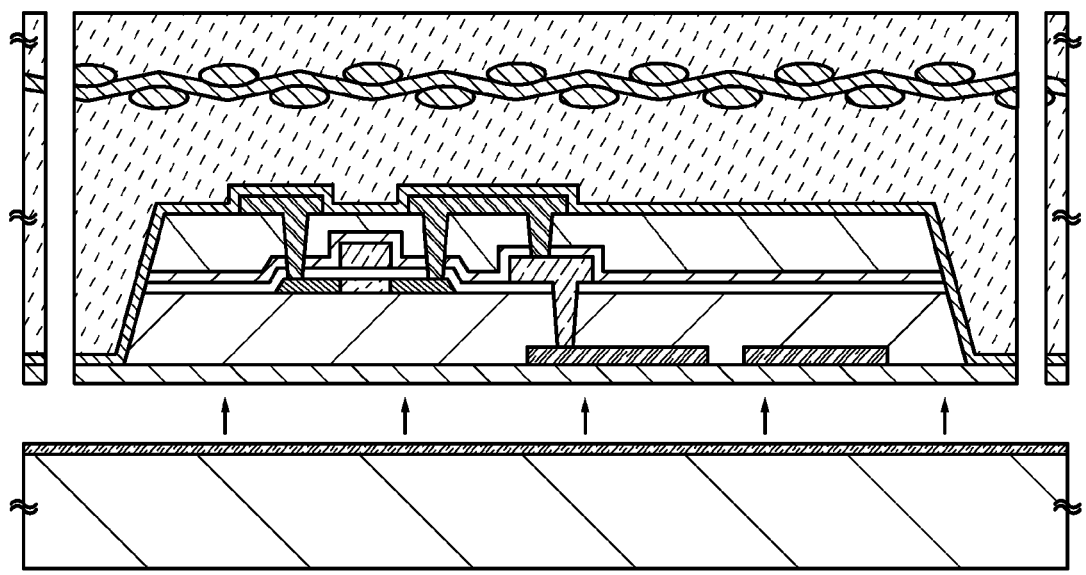
FIGS. 24A and 24B are cross-sectional views illustrating a manufacturing process of a liquid crystal display device of the present invention.

Next, by using the depressed portion 172 as a trigger as in Embodiment 4, the element formation layer 124 is separated from the substrate 100 at the interface between the release layer 102 and the insulating layer 104 serving as a buffer layer (see FIG. 24A).

Figure 24B:
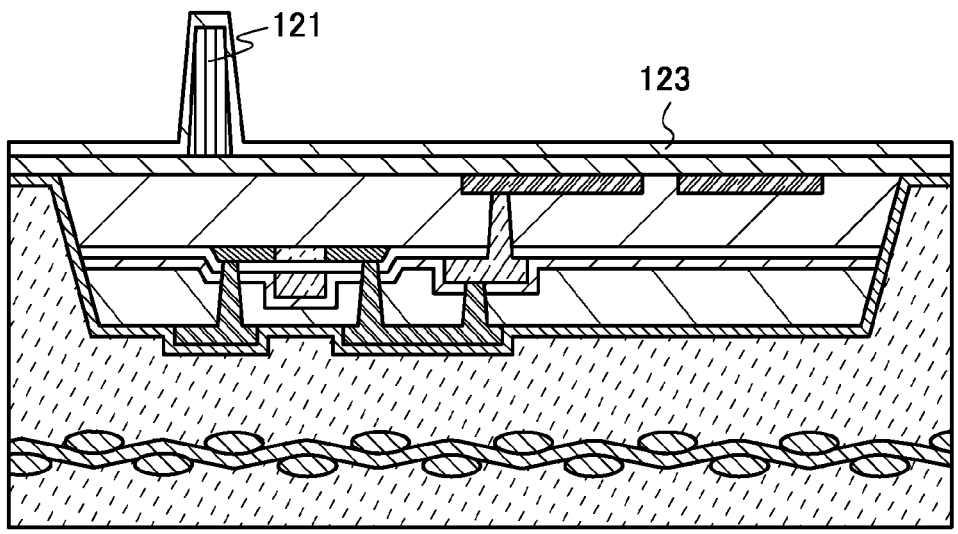

Next, a spacer 121 is formed over the insulating layer 104 as in Embodiment 5. Then, an alignment film 123 is formed over the surface of the spacer 121 and the insulating layer 104 (see FIG. 24B).

Figure 25A:
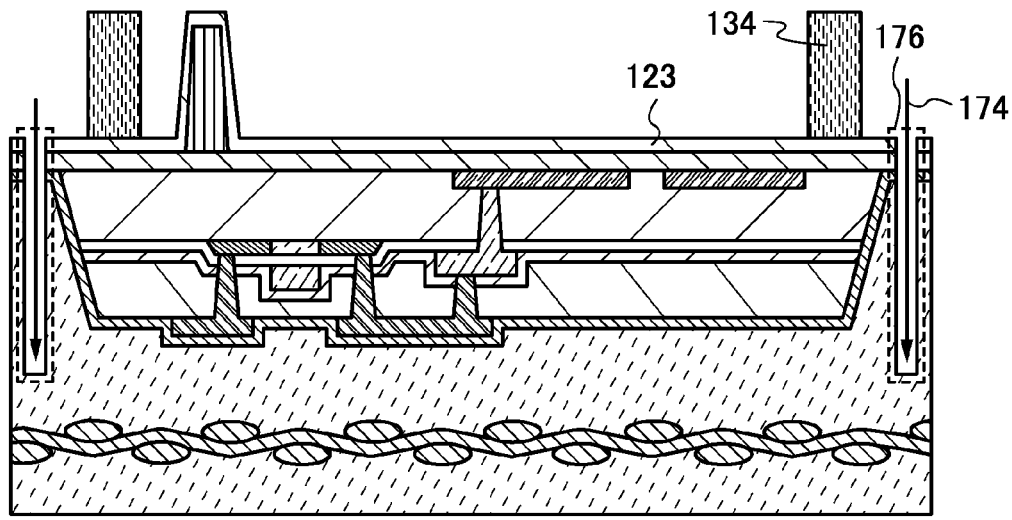
FIGS. 25A and 25B are cross-sectional views illustrating a manufacturing process of a liquid crystal display device of the present invention.

Next, a depressed portion 176 is formed in the alignment film 123 and partway in the first structure body 132. In this embodiment, the depressed portion 176 is formed by irradiation with a UV laser beam 174. Next, a seal member 134 is formed over the alignment film 123 (see FIG. 25A).

Next, a liquid crystal is discharged to the inside of the seal member 134 as in Embodiment 4. After that, a second structure body is provided over the seal member 134. A second structure body 137 is attached in a reduced pressure atmosphere and the seal member 134 is cured by UV light irradiation to fix the second structure body 137. By this fixing step, a liquid crystal layer 136 surrounded by the first structure body 132, the second structure body 137, and the seal member 134 is formed.

Figure 25B:
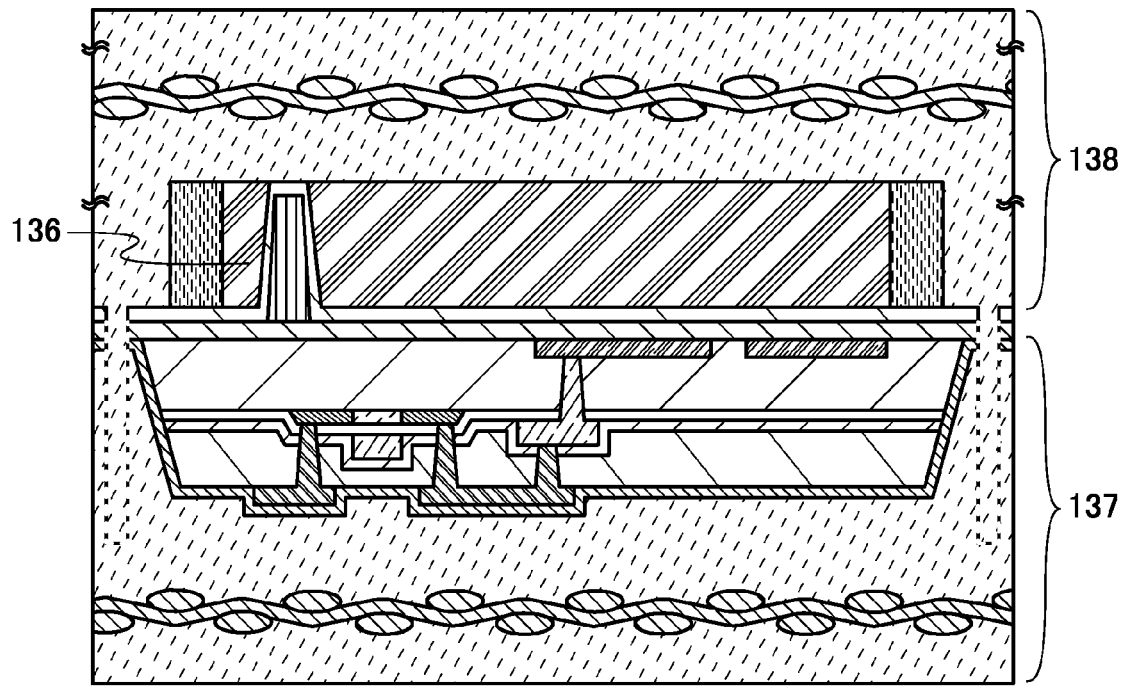

Next, the first structure body 132 and the second structure body are heated and subjected to pressure bonding to form a second structure body 138 in which the organic resin is cured. In addition, when the organic resin of the second structure body 138 is cured, the first structure body 132 is fixed to the second structure body 138; thus, a liquid crystal display device having good adhesion between the first structure body and the second structure body is manufactured (see FIG. 25B). Note that at the time of heating and pressure bonding, the organic resin of the second structure body is cured after filling the depressed portion 176; thus, the adhesion between the first structure body 132 and the second structure body 138 is improved.

Through the above steps, a flexible and highly reliable liquid crystal display device which is not easily damaged by external pressure can be manufactured. In addition, the organic resin of the second structure body 138 is also present in the depressed portion of the first structure body; thus, the adhesion between the first structure body 132 and the second structure body 138 can be further improved.

(Embodiment 10)

In this embodiment, a method for manufacturing a highly reliable liquid crystal display device is hereinafter described. Specifically, a liquid crystal display device which is less likely to be damaged by static electricity as described in Embodiment 3 is hereinafter described. Note that this embodiment can be combined with any of the other embodiments as appropriate.

In the liquid crystal display device described in Embodiment 3, after the first structure body and the second structure body are heated, subjected to pressure bonding, and fixed to each other, a conductive layer is formed over the surface of the first structure body or/and the second structure body by an evaporation method, a sputtering method, an electrolytic plating method, an electroless plating method, a coating method, a printing method, a dipping method, or the like. Note that when formed by a coating method, a printing method, or a dipping method, the conductive layer is preferably subjected to drying and baking to increase conductivity.

Alternatively, in the manufacturing process described in Embodiment 8, after conductive layers are formed over surfaces of the first impact relaxation layer and the second impact relaxation layer, the first impact relaxation layer and the second impact relaxation layer may be provided over a surface of the first structure body and a surface of the second structure body, respectively. This process is hereinafter described.

Figure 26A:
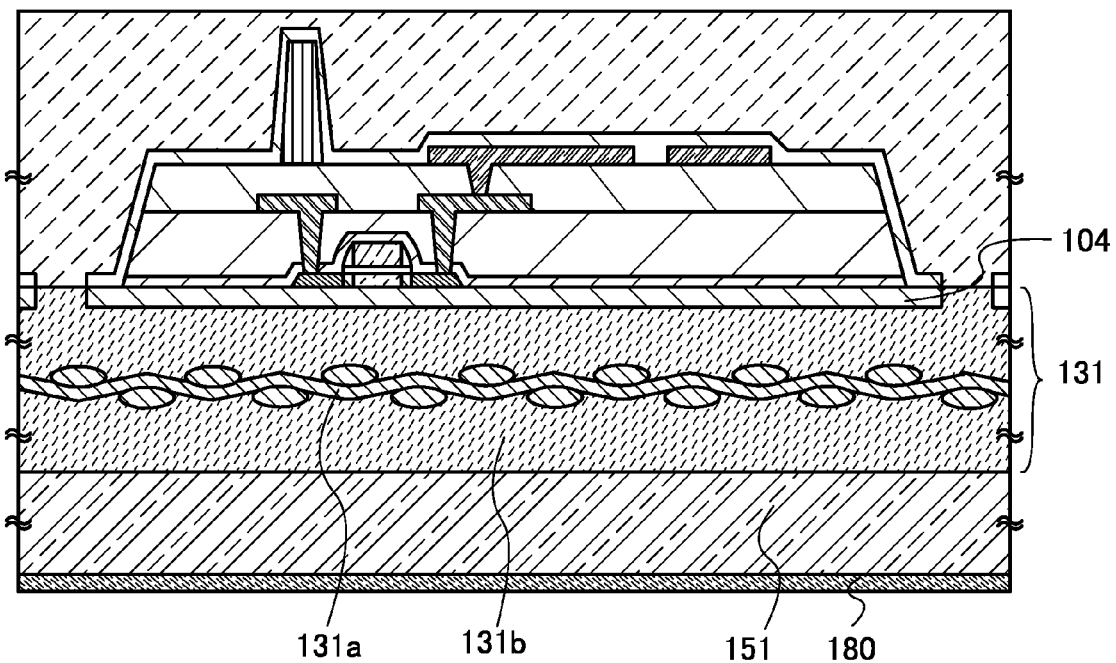
FIGS. 26A and 26B are cross-sectional views illustrating a manufacturing process of a liquid crystal display device of the present invention.

As in Embodiment 4, the steps of FIGS. 6A to 7B are performed. Next, the insulating layer 104 is provided with a first structure body 131 and a first impact relaxation layer 151 which is provided with a conductive layer 180 (see FIG. 26A). In this embodiment, the first structure body 131 is formed in the following manner: after a fibrous body is impregnated with a varnish in which a matrix resin is diluted with an organic solvent, drying is performed so that the organic solvent is volatilized and the matrix resin is semi-cured. The resin is cured in a later heating step. The conductive layer 180 is provided over the first impact relaxation layer 151 on the side opposite to the first structure body 131; alternatively, the conductive layer 180 may be provided between the first structure body 131 and the first impact relaxation layer 151.

The conductive layer is formed over a surface of the first impact relaxation layer 151 by an evaporation method, a sputtering method, an electrolytic plating method, an electroless plating method, a coating method, a printing method, a dipping method, or the like. Note that when formed by a coating method, a printing method, or a dipping method, the conductive layer is preferably subjected to drying and baking to increase conductivity.

Figure 26B:
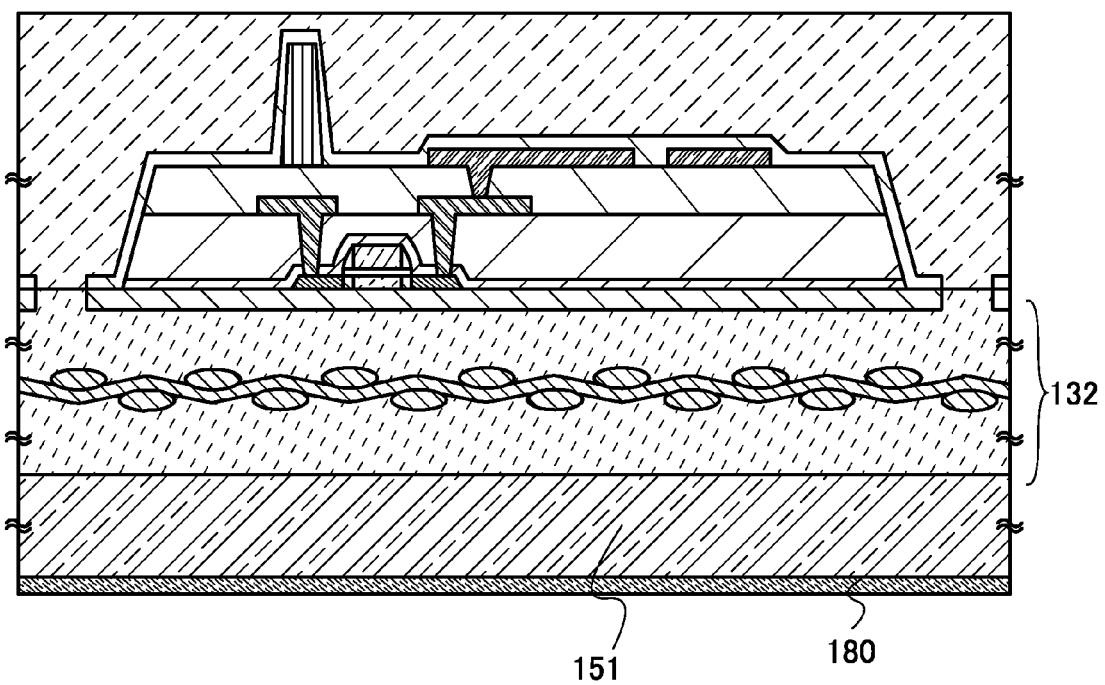

Next, the first structure body 131 is heated and subjected to pressure bonding so that an organic resin 131b of the first structure body is plasticized or cured. Thus, the first structure body 132 and the first impact relaxation layer 151 are fixed to the insulating layer 104 (see FIG. 26B). After that, the adhesive film is removed.

Figure 27:
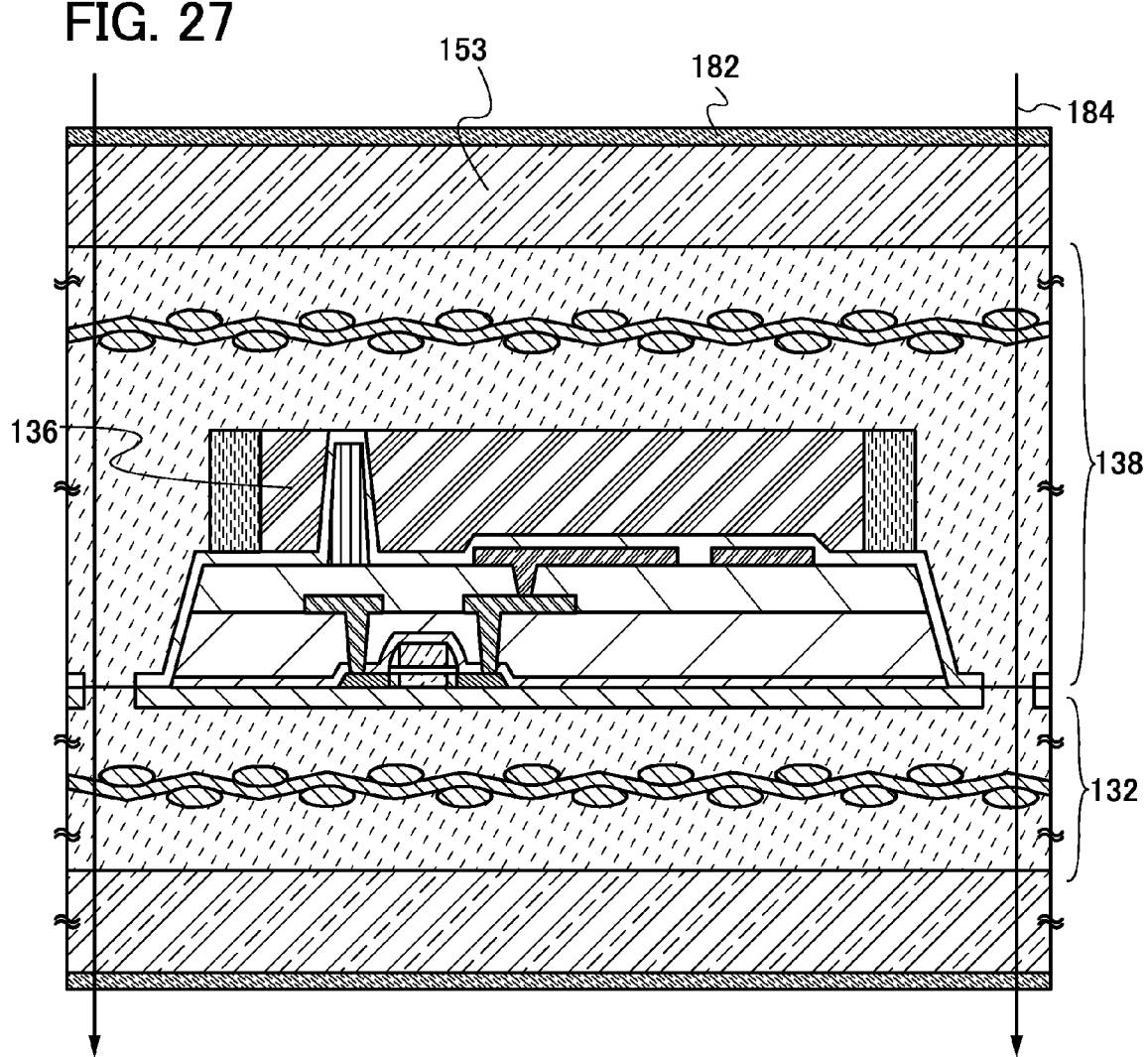
FIG. 27 is a cross-sectional view illustrating a manufacturing process of a liquid crystal display device of the present invention.

Next, a seal member 134 is formed as illustrated in FIG. 8A of Embodiment 4. Next, a liquid crystal material is discharged to the inside of the seal member 134. After that, a second structure body 137 is provided over the seal member 134, and a second impact relaxation layer 153 provided with a conductive layer 182 is provided over the second structure body 137. The second structure body 137 is attached in a reduced pressure atmosphere and the seal member 134 is cured by UV light irradiation to fix the second structure body 137. By this fixing step, a liquid crystal layer 136 surrounded by the first structure body 132, the second structure body 137, and the seal member 134 is formed (see FIG. 27).

Note that in the case of dividing element formation layers and liquid crystal layers formed over a single substrate into a plurality of liquid crystal display devices, a laser cutting method or a cutting member can be used as a dividing method. In this embodiment, a mode of employing a laser cutting method is described.

The first structure body 132, the second structure body 137, the first impact relaxation layer 151, and the second impact relaxation layer 153 are irradiated with a laser beam 184 to melt the first structure body 132, the second structure body 137, the first impact relaxation layer 151, and the second impact relaxation layer 153

There is no particular limitation on the conditions, such as wavelength, intensity, and beam size of the laser beam used for the dividing of the liquid crystal display devices. As the laser beam, it is possible to use, for example, a continuous-wave laser beam emitted from a laser such as an Ar laser, a Kr laser, a $CO_2$ laser, a YAG laser, a $YVO_4$ laser, a YLF laser, a $YAlO_3$ laser, a $GdVO_4$ laser, a $Y_2O_3$ laser, a ruby laser, an alexandrite laser, a Ti:sapphire laser, or a helium-cadmium laser or a pulsed laser beam emitted from a laser such as an Ar laser, a Kr laser, an excimer (ArF, KrF, or XeCl) laser, a $CO_2$ laser, a YAG laser, a $YVO_4$ laser, a YLF laser, a $YAlO_3$ laser, a $GdVO_4$ laser, a $Y_2O_3$ laser, a ruby laser, an alexandrite laser, a Ti:sapphire laser, a copper vapor laser, or a gold vapor laser.

Note that by dividing liquid crystal display devices by a laser cutting method using a laser beam, the resistance between the conductive layer 180 and the conductive layer 182 is decreased, whereby the conductive layer 180 and the conductive layer 182 are electrically connected to each other. Accordingly, the step of dividing the liquid crystal display devices and the step of electrically connecting the conductive layers 180 and 182 can be performed at a time; thus, the number of steps can be reduced.

(Embodiment 11)

In this embodiment, a liquid crystal display device of the present invention is described with reference to a top view and a cross-sectional view.

Figure 28A:
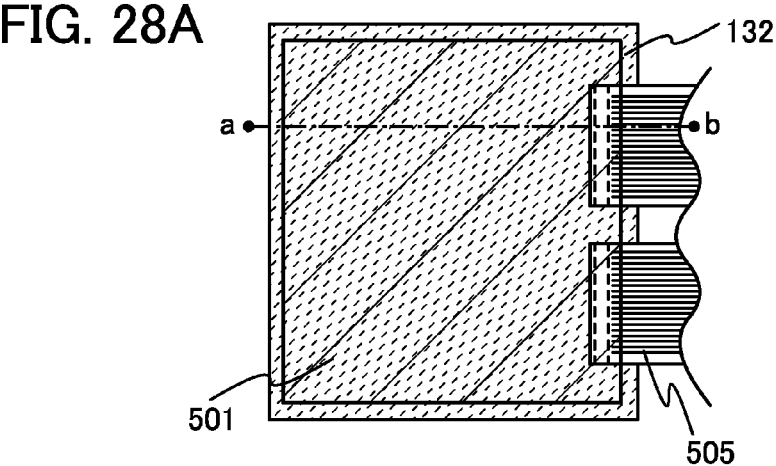
FIGS. 28A and 28B are a top view illustrating a liquid crystal display device of the present invention and a cross-sectional view thereof, respectively.
Figure 28B:
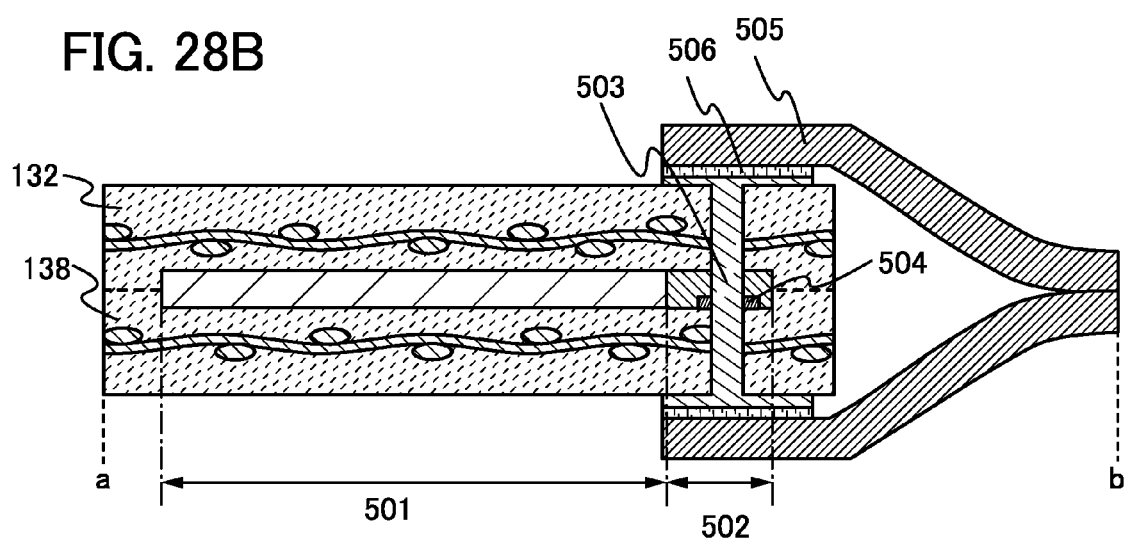

FIG. 28A is a top view of a liquid crystal display device manufactured by any of the manufacturing methods described in the above embodiments. FIG. 28B is a cross-sectional view along line a-b of FIG. 28A. The liquid crystal display device illustrated in FIGS. 28A and 28B is manufactured by any of the methods described in the above embodiments, and includes an element portion 501 and a terminal portion 502. The element portion 501 is fixed by the first structure body 132 and the second structure body 138 in each of which a fibrous body is impregnated with an organic resin. Note that the element portion 501 of this embodiment refers to a pixel portion including an element formation layer, a liquid crystal layer, and a seal member. The terminal portion 502 includes a wiring 504 that receives a video signal, a clock signal, a start signal, a reset signal, and the like from a flexible printed circuit (FPC) 505 serving as an external input terminal. Note that a printed wiring board (PWB) may be attached to the FPC 505 illustrated in FIGS. 28A and 28B. The liquid crystal display device in this specification includes not only a main body of the liquid crystal display device but also an FPC or a PWB attached to the liquid crystal display device.

In FIG. 28B, a through wiring 503 is formed to be electrically connected to the wiring 504 provided in the terminal portion 502. The through wiring 503 can be formed in such a manner that a through hole is formed in the first structure body 132 and the second structure body 138 with a laser, a drill, an awl, or the like, and a conductive resin is provided in the through hole by screen printing, an ink-jet method, or the like and then subjected to baking or reflow. The conductive resin refers to a resin in which a conductive particle with a grain size of several tens of micrometers or less is dissolved or resolved in an organic resin. As the conductive particle, for example, it is possible to use a conductive paste containing a metal element such as copper (Cu), silver (Ag), nickel (Ni), gold (Au), platinum (Pt), palladium (Pd), tantalum (Ta), molybdenum (Mo), or titanium (Ti). As the organic resin contained in the conductive resin, at least one of organic resins that function as a binder, a solvent, a dispersing agent, and a coating material of metal particles can be used. Typically, an organic resin such as an epoxy resin, a phenol resin, or a silicone resin can be used.

The through wiring 503 may be formed without forming the through hole in the first structure body 132 and the second structure body 138. For example, the through wiring 503 can be formed in such a manner that a conductive resin is placed in a predetermined position on the first structure body 132 or the second structure body 138; part of each of the organic resin in the first structure body 132 and the second structure body 138 is dissolved by reacting with an organic resin contained in the conductive resin; and metal particles contained in the conductive resin are infiltrated into the first structure body 132 and the second structure body 138.

The FPC 505 serving as an external input terminal is attached on the through wiring 503 formed in the first structure body 132 and the second structure body 138. Thus, the wiring 504 provided in the terminal portion 502 is electrically connected to the wiring 506 provided in the FPC 505 with the conductive particles contained in the through wiring 503.

Accordingly, the liquid crystal display device to which the FPC 505 is connected can be obtained.

(Embodiment 12)

In each of Embodiments 1 to 11, an active-matrix liquid crystal display device where a liquid crystal element including a semiconductor element and a pixel electrode connected to the semiconductor element is formed in an element formation layer is described. The present invention is not limited to this type, and a passive-matrix liquid crystal element may be formed in an element formation layer of a liquid crystal display device.

(Embodiment 13)

Any of the liquid crystal display devices described in the above embodiments can be incorporated into a display portion of an electronic device.

Examples of such electronic devices include cameras such as video cameras and digital cameras, head-mounted displays (goggle-type displays), car navigation systems, car stereos, personal computers, and portable information terminals (e.g., mobile computers, cellular phones, and e-book readers).

The liquid crystal display devices described in the above embodiments can be applied to advertisement display devices on the streets or information display devices in railway stations or airports. The liquid crystal display devices according to the present invention can be provided in various places due to its thinness and flexibility, and the display devices can display information while being attached to a wall or the like. In addition, the display devices can display a large amount of information because display content can be changed as needed.

This application is based on Japanese Patent Application serial no. 2008-180804 filed with Japan Patent Office on Jul. 10, 2008, the entire contents of which are hereby incorporated by reference.

What is claimed is:

1. A liquid crystal display device comprising:
   a first structure body including a first fibrous body and a first organic resin;
   a second structure body including a second fibrous body and a second organic resin;
   a liquid crystal interposed between the first structure body and the second structure body; and
   a seal member for fixing the first structure body and the second structure body and for enclosing the liquid crystal,
   wherein the first fibrous body and the second fibrous body are impregnated with the first organic resin and the second organic resin, respectively, and
   wherein the first structure body and the second structure body are in contact with each other.

2. The liquid crystal display device according to claim 1, further comprising a conductive layer over a surface of the first structure body or the second structure body.

3. The liquid crystal display device according to claim 2, wherein the conductive layer has a thickness through which light passes.

4. The liquid crystal display device according to claim 1, further comprising a first conductive layer over a surface of the first structure body and a second conductive layer over a surface of the second structure body.

5. The liquid crystal display device according to claim 4, wherein the first conductive layer and the second conductive layer have a thickness through which light passes.

6. The liquid crystal display device according to claim 1, further comprising a first conductive layer over a surface of the first structure body and a second conductive layer over a surface of the second structure body, wherein the first conductive layer and the second conductive layer are electrically connected to each other.

7. The liquid crystal display device according to claim 6, wherein the first conductive layer and the second conductive layer have a thickness through which light passes.

8. The liquid crystal display device according to claim 1, wherein the first structure body and the second structure body have a same thickness.

9. The liquid crystal display device according to claim 1, further comprising a pixel electrode for controlling alignment of the liquid crystal, the pixel electrode being provided on at least one of the first structure body and the second structure body inside the first structure body and the second structure body.

10. A liquid crystal display device comprising:
a first structure body including a first fibrous body and a first organic resin;
a second structure body including a second fibrous body and a second organic resin;
a liquid crystal interposed between the first structure body and the second structure body; and
a seal member interposed between the first structure body and the second structure body for fixing the first structure body and the second structure body and for enclosing the liquid crystal,
wherein the first fibrous body and the second fibrous body are impregnated with the first organic resin and the second organic resin, respectively, and
wherein the first structure body and the second structure body are in contact with each other outside the seal member.

11. The liquid crystal display device according to claim 10, further comprising a conductive layer over a surface of the first structure body or the second structure body.

12. The liquid crystal display device according to claim 11, wherein the conductive layer has a thickness through which light passes.

13. The liquid crystal display device according to claim 10, further comprising a first conductive layer over a surface of the first structure body and a second conductive layer over a surface of the second structure body.

14. The liquid crystal display device according to claim 13, wherein the first conductive layer and the second conductive layer have a thickness through which light passes.

15. The liquid crystal display device according to claim 10, further comprising a first conductive layer over a surface of the first structure body and a second conductive layer over a surface of the second structure body, wherein the first conductive layer and the second conductive layer are electrically connected to each other.

16. The liquid crystal display device according to claim 15, wherein the first conductive layer and the second conductive layer have a thickness through which light passes.

17. The liquid crystal display device according to claim 10, wherein the first structure body and the second structure body have a same thickness.

18. The liquid crystal display device according to claim 10, further comprising a pixel electrode for controlling alignment of the liquid crystal, the pixel electrode being provided on at least one of the first structure body and the second structure body inside the first structure body and the second structure body.

19. A liquid crystal display device comprising:
a first structure body including a first fibrous body and a first organic resin;
a second structure body including a second fibrous body and a second organic resin;
a liquid crystal interposed between the first structure body and the second structure body;
a first impact relaxation layer in contact with the first structure body;
a second impact relaxation layer in contact with the second structure body; and
a seal member interposed between the first structure body and the second structure body for fixing the first structure body and the second structure body and for enclosing the liquid crystal,
wherein the first fibrous body and the second fibrous body are impregnated with the first organic resin and the second organic resin, respectively, and
wherein the first structure body and the second structure body are in contact with each other outside the seal member.

20. The liquid crystal display device according to claim 19, further comprising a conductive layer over a surface of the first structure body or the second structure body.

21. The liquid crystal display device according to claim 20, wherein the conductive layer has a thickness through which light passes.

22. The liquid crystal display device according to claim 19, further comprising a first conductive layer over a surface of the first structure body and a second conductive layer over a surface of the second structure body.

23. The liquid crystal display device according to claim 22, wherein the first conductive layer and the second conductive layer have a thickness through which light passes.

24. The liquid crystal display device according to claim 19, further comprising a first conductive layer over a surface of the first structure body and a second conductive layer over a surface of the second structure body, wherein the first conductive layer and the second conductive layer are electrically connected to each other.

25. The liquid crystal display device according to claim 24, wherein the first conductive layer and the second conductive layer have a thickness through which light passes.

26. The liquid crystal display device according to claim 19, wherein the first structure body and the second structure body have a same thickness.

27. The liquid crystal display device according to claim 19, wherein the first impact relaxation layer and the second impact relaxation layer have a same thickness.

28. The liquid crystal display device according to claim 19, further comprising a pixel electrode for controlling alignment of the liquid crystal, the pixel electrode being provided on at least one of the first structure body and the second structure body inside the first structure body and the second structure body.

* * * * *